(12) United States Patent
Utsumi

(10) Patent No.: US 6,195,677 B1
(45) Date of Patent: *Feb. 27, 2001

(54) DISTRIBUTED NETWORK COMPUTING SYSTEM FOR DATA EXCHANGE/ CONVERSION BETWEEN TERMINALS

(75) Inventor: Masaki Utsumi, Saitama-ken (JP)

(73) Assignee: Kabushiki Kaisha Toshiba, Kawaski (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,675

(22) Filed: Jun. 2, 1998

(30) Foreign Application Priority Data

Jun. 3, 1997 (JP) .................................... 9-160570
Jun. 23, 1997 (JP) .................................... 9-165772
Dec. 17, 1997 (JP) .................................... 9-364181

(51) Int. Cl.[7] .................................... H04K 3/00
(52) U.S. Cl. .................... 709/201; 382/232; 382/181; 709/217; 380/29; 380/37; 380/43; 380/51
(58) Field of Search .................... 709/201, 217; 382/232, 181; 380/29, 37, 43, 51

(56) References Cited

U.S. PATENT DOCUMENTS 5,748,782 * 5/1998 Ferreira et al. ............... 382/232
5,966,451 * 10/1999 Utsumi ................... 380/51

FOREIGN PATENT DOCUMENTS

596648 * 5/1994 (EP) ............... H01F/27/24
103011864 * 11/1998 (JP) ............... G06F/13/00
10326230 * 12/1998 (JP) ............... G06F/13/00

OTHER PUBLICATIONS

Vadhwana, V., "Object Oriented Rule–Based Control on a Personal Computer", IEEE, pp. 6/1–6/4, Mar. 1989.*
Lowgren, Jonas, "The Ignatiu Environment", IEEE, pp. 49–57, Aug. 1992.*
Brutzman et al., "Internetwork infrastructure requirements for virtual environments", 1995 ACM Symposium, pp. 95–104, Dec. 1995.*
Breedlove et al., "Web Programming Unleashed", Sams, Macmillan Computer Pub., excerpts chapter 23, pp. 1–17, Nov. 1996.*
Moran et al. "Multimodal user interfaces in the Open Agent Architecture", ACM 1997 Inter. Conf., pp. 61–68, Jan. 1997.*
Clarke et al., "Data Conversion", IEEE Colloquium, pp. 3/1–3/5, Feb. 1997.*

* cited by examiner

Primary Examiner—Zarni Maung
Assistant Examiner—Jason D. Cardone
(74) Attorney, Agent, or Firm—Finnegan, Henderson, Farabow, Garrett & Dunner, L.L.P.

(57) ABSTRACT

A data exchange unit is arranged in a server. Service data provided as an application service is converted into a predetermined format on the basis of the attribute data of a terminal as a communication partner and is transmitted. With this processing, the application service can be provided while adjusting the relative difference in processing capability terminals. When the service data is converted into a predetermined format on the basis of the attribute of a communication network connected to the terminal and transmitted, the application service can be provided while adjusting the relative difference in communication capability among communication networks. Also, terminal equipment 51 is able to communicate with server computer while keeping the security function.

63 Claims, 42 Drawing Sheets

STRUCTURED DOCUMENT

66 — ⟨ start text ⟩
    A B C

67 — ⟨ centering ⟩

68 — ⟨ font big ⟩ XYZ ⟨ end font big ⟩

⟨ end centering ⟩

69 — ⟨ image ⟩ XXX. GIF ⟨ end image ⟩

⟨ end text ⟩

Fig.16.

DISTRIBUTED NETWORK COMPUTING SYSTEM FOR DATA EXCHANGE/CONVERSION BETWEEN TERMINALS

BACKGROUND OF THE INVENTION

The present invention relates to a distributed network computing system for connecting a plurality of terminals and, more particularly, to a distributed network computing system having a security function for providing an application service such as an inventory control service to various terminals such as PDAs, personal computers (PCs), and portable PCs having different processing capabilities and connected to a plurality of communication networks including a public network, a wired LAN (Local Area Network), and a wireless LAN.

The present invention also relates to data exchange apparatus having a security function.

A centralized processing system is the mainstream of conventional data processing using computers in which a plurality of terminals are connected to one main computer. On the contrary, in a distributed processing system, a plurality of computers are connected with each other to form a network so that computers may share their resources with each other to perform efficient processing. An environment for allowing distributed processing of an application among the computers of different types is called a distributed computing environment.

In the distributed computing environment, an user need not be aware of a location of a program or data. Logically, since the entire network acts as if it were one computer system, the user can utilize desired data or function in the network.

Assume a system for providing an application service such as an inventory control service to each terminal in the network. The user terminals have different processing capabilities which is, hereinafter, called a terminal attribute, the meaning of which includes the capability of the CPU, the display screen size and the memory capacity. To adjust and absorb the difference, a manual processing of data must be performed on the terminal side or on the server side.

Each terminal is connected to different communication networks, such as a public telephone or data network and a wired or wireless LAN (Local Area Network). Therefore, the data transmission rate, the transmission volume, and the transmission quality vary with each communication network as a communication infrastructure.

Generally, assuming that a personal computer (PC) has a high-level processing capability as a general-purpose device, a PDA has an intermediate-level processing capability and other terminals have a low-level processing capability. With respect to the communication infrastructures, the transmission volume and quality of a wired or wireless LAN are maintained at a high level. Those of an ISDN (Integrated Services Digital Network) are maintained at an intermediate level, and those of an analog wired network, or an analog or digital wireless network are maintained at a low level.

In the network environment, the processing capability varies from a terminal to terminal and the communication capability varies among communication infrastructures. Therefore, it is very difficult to uniformly provide an application service to various terminals in such an environment.

Generally, the attribute of each terminal used in the system is determined at a time of system designing, and the application service is provided in accordance with the attribute. For this reason, even when a terminal having a new attribute has been developed, the terminal can hardly be introduced into the system for use.

To provide a service while adjusting the difference in processing capability among the terminals or the difference in communication capability among the communication infrastructures, cumbersome processing must be performed. Accordingly, a large server computer having an adequate capability is required.

An establishment such as a company or a factory must be equipped with an exchange system for performing exchange/connection between extension telephones and between an extension telephone and a subscriber telephone line (main wire). Generally, a private exchange system or private exchange equipment is referred to as a PBX (Private Branch exchange) and, particularly, a digital private exchange system is called as a digital PBX. The digital PBX converts an analog speech signal into a digital signal and processes the converted digital signal. When OA devices such as a personal computer, a word processor, and other types of computers used in the office are connected to the digital PBX, data and speech signals can be uniquely and efficiently processed. In addition, when various network functions are added to the digital PBX, a wide area network can be constructed by an intra office communication network.

When a LAN is constructed for the first time, several computing devices are connected to one Ethernet cable (coaxial cable) in many cases. However, as the network expands and the number of connected devices increases, the physical length of the cable reaches the limit. A router is used as a means for physically and logically expanding the network beyond the limit of the cable.

The router can construct a network having a closed loop. The router determines an optimum route (routing) and allow only necessary packets passes therethrough. The router determines the route by a network number in an internet protocol (network layer) and then determines the route by a node number there by determining the final destination.

Since the internet protocol in the network layer is defined differently by different protocols such as TCP/IP OSI etc., the router basically supports one protocol. In other words, the router can select an only network corresponding to the selected protocol from backbone networks including a plurality of protocols. For this reason, the router can be effectively used to meet a requirement for a decrease in load factor from the Ethernet to the public line due to the speed.

Conventionally, however, no system has been proposed yet to provide the service while adjusting the difference in processing capability among the terminals or the difference in communication capability among the communication infrastructures on a network connection apparatus such as an exchange system or a router.

Moreover, it is necessary to complete a various kinds of security functions under the network computing environment. Conventionally, research and development on encryption technology has been done with respect to security of data. For example, research and development on encryption of data on a communication line has been done conventionally as well as on verification technology. Taking the network computing environment in which terminals such as portable PCs (clients) are used into consideration, any measures specific to such environment must be taken against an accidental leaving or being stolen of the portable PCs. The problems are, however, not been solved by the simple encryption technology on the communication line. It has been, thus, very inconvenient that no effective means have not been provided conventionally.

On the other hand, a system for managing a large quantity of data is necessary. In the WWW (World Wide Web) which is becoming popular on the internet, a structuring language (tag language) called HTML (Hyper Text Markup Language) is used. As a structuring language other than HTML, SGML (Standard Generalized Markup Language) may be widely used along with the spread of CALS (Continuous Acquisition and Lifecycle Support).

To display a document written in the structuring language, a function (browser) of analyzing and displaying the structuring language is required on the terminal side. In other words, data described in the structuring language cannot be provided to a terminal without the browser function.

When data described in the structuring language is directly transmitted on the network, a large quantity of data is transmitted even through a line having a low transmission capability, and this transmission takes a long time. These problems also apply to a component data format such as OLE (Object Linking and Embedding) in addition to HTML.

BRIEF SUMMARY OF THE INVENTION

It is an object of the present invention to provide a distributed network computing system capable of providing, in a network environment with various terminals, an application service corresponding to the processing capability of each terminal, and even when a plurality of communication infrastructures exist, providing an application service corresponding to the communication capability of each communication infrastructure, and a data exchange apparatus, a method and a storage medium each of which has a security function and is used in this system.

It is another object of the present invention to provide a distributed network computing system capable of providing, in a network environment with various terminals, an application service corresponding to the processing capability of each terminal without using any large server computer, and even when a plurality of communication infrastructures exist, providing an application service corresponding to the communication capability of each communication infrastructure, and a data exchange apparatus, a method and a storage medium each of which has a security function and is used in this system.

It is still another object of the present invention to provide a distributed network computing system capable of providing, in a network environment with various terminals, an application service corresponding to the processing capability of each terminal when data described by a component data format such as a structured document is provided as the application service, and even when a plurality of communication infrastructures exist, to provide an application service corresponding to the communication capability of each communication infrastructure, and a data exchange apparatus, a method and a storage medium each of which has a security function and is used in this system.

It is still another object of the present invention to provide a distributed network computing system capable of providing, in a network environment with various terminals, a servicewhile adjusting differences in processing capability among terminals or differences in communication capability among communication infrastructures on a network connecting apparatus such as an exchange system or a router, and a data exchange apparatus, a method and a storage medium each of which has a security function and is used in this system.

It is still another object of the present invention to provide a distributed network computing system with a complete security function, in a network environment with various terminals, and a data exchange apparatus, a method and a storage medium each of which has a security function and is used in this system.

(1) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises terminal attribute data management means for managing terminal attribute data representing a processing capability of the terminal, conversion means for acquiring the terminal attribute data of the terminal as a communication partner from the terminal attribute data management means and converting service data provided as the application service into a specific format on the basis of the terminal attribute data, and communication means for transmitting through the communication network the service data converted by the communication means.

Furthermore, the data exchange unit has a feature that it controls a terminal which is connected to the data exchange unit to be able to read a particular data when the terminal satisfies a prescribed condition and it requests to access the particular data.

According to this arrangement, when a plurality of terminals are present on a network, service data provided by the data processing unit is converted in correspondence with the processing capability of each terminal. In this case, the data exchange process means processing of changing the format of certain data in correspondence with the processing capability of a terminal as a communication partner. For example, in transmitting image data (image), if the partner terminal has no image processing capability, the image data is converted into symbol data and transmitted.

With this processing, a terminal (e.g., a PDA (Personal Digital Assistants)) which is excellent in portability but poor in data processing capability (arithmetic capability) or screen display/user interface providing capability relative to other terminals (e.g., PCs) can be used to constitute a distributed network computing system. The terminal can receive the same service as that for the remaining terminals although the data format is different.

Particularly, when this data exchange process is performed by network connection means (e.g., a line exchange system or a router), the data can be converted into a final format near the user terminal. More specifically, when a network is constituted by sub-networks, the data exchange process can be performed in correspondence with the sub-network.

In addition, when a function of managing terminal attribute data necessary for data exchange is distributed to a second data processing unit (server computer), the processing load on the first data processing unit can be reduced, thus realizing a fail-safe system and security function can be improved.

(2) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises communication infrastructure data management means for managing communication infrastructure data representing a communication capability of the communication network, conversion means for acquiring the communication infrastructure data of the communication network connected to the terminal as a communication partner from the communication infrastructure data management means and converting service data provided as the application service into a specific format on the basis of the communication infrastructure data, and communication means for transmitting through the communication network the service data converted by the communication means.

Furthermore, the data exchange unit has a feature that it controls a terminal which is connected to the data exchange unit to be able to read a particular data when the terminal satisfies a prescribed condition and it requests to access the particular data.

According to this arrangement, when a plurality of communication networks are present on a network, service data provided by the data processing unit is converted in correspondence with the communication capability of each communication network. In this case, the data exchange process means processing of changing the format of certain data in correspondence with the communication capability of a communication network connected to a terminal as a communication partner. For example, if the data transmission capability of the communication network is high, the data is enciphered and transmitted. If the data transmission capability is low, the transmission data size is changed by converting binary data into text data, converting format data such as centering into a blank character, or neglecting the font data, and thereafter, the data is transmitted. When the data transmission capability is low, and the terminal side has an appropriate arithmetic capability, the data may be compressed and transmitted.

With this processing, even in a system having various communication infrastructures, the relative difference in data transmission rate/volume/quality among the communication infrastructures can be absorbed. The terminal can receive the same service as that for the remaining terminals although the data format is different. Further, the terminal can be improved in its security function.

(3) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises terminal attribute data management means for managing terminal attribute data representing a processing capability of the terminal, communication infrastructure data management means for managing communication infrastructure data representing a communication capability of the communication network, conversion means for acquiring the terminal attribute data of the terminal as a communication partner from the terminal attribute data management means and simultaneously acquiring the communication infrastructure data of the communication network connected to the terminal from the communication infrastructure data management means, and converting service data provided as the application service into a specific format on the basis of the terminal attribute data and the communication infrastructure data, and communication means for transmitting through the communication network the service data converted by the communication means.

Furthermore, the data exchange unit has a feature that it controls a terminal which is connected to the data exchange unit to be able to read a particular data when the terminal satisfies a prescribed condition and it requests to access the particular data.

According to this arrangement, when a plurality of terminals and a plurality of communication networks are present on a network, service data provided by the data processing unit is converted in correspondence with the processing capability of each terminal and the communication capability of each communication network. In this case, the data exchange process means processing of changing the format of certain data in correspondence with the processing capability of a terminal as a communication partner and the communication capability of a communication network connected to the terminal.

With this processing, even in a system having various communication infrastructures, the relative difference in data transmission rate/volume/quality among the communication infrastructures can be absorbed. The terminal can receive the same service as that for the remaining terminals although the data format is different. Further, the terminal can be improved in its security function.

(4) According to the present invention, in a distributed network computing system including a first data processing unit for providing an application service, a terminal for receiving the application service from the first data processing unit, and a communication network which connects the first data processing unit and the terminal, communication infrastructure data management means for managing communication infrastructure data representing a communication capability of the communication network is arranged in a second data processing unit connected to the communication network independently of the first data processing unit.

The first data processing unit comprises retrieval means for retrieving the second data processing unit having the communication infrastructure data management means from one or a plurality of second data processing units, conversion means for acquiring the communication infrastructure data corresponding to the terminal as a communication partner from the communication infrastructure data management means and converting service data provided as the application service into a specific format on the basis of the communication infrastructure data in the second data processing unit retrieved by the retrieval means, communication means for transmitting through the communication network the service data converted by the conversion means, and a control means for controlling the terminal which is connected to the data exchange unit to be able to read a particular data when the terminal satisfies a prescribed condition and it requests to access the particular data.

According to this arrangement, when a plurality of communication networks are present on a network, service data provided by the first data processing unit (main server computer for providing the application service) is converted in correspondence with the communication capability of each communication network. In this case, the data exchange process means processing of changing the format of certain data in correspondence with the communication capability of a communication network connected to a terminal as a communication partner.

When an image data is transmitted, it is transmitted to a terminal by converting it into a symbol data if the terminal to which the data is transmitted does not have capability of image processing.

The distributed network computing system, thus, can be constructed using such terminals as personal digital assistants (PDA) which is superior in carrying but inferior in capability of information processing or calculating and of providing display or user interface to such other type of terminals as personal computers (PCs). Terminals, thus, can receive similar services which other type of terminals can receive even if the data format is different from each other.

In addition, when a function of managing communication infrastructure data necessary for data exchange is distributed to the second data processing unit (sub-server computer), the processing load on the first data processing unit can be reduced, thus realizing a fail-safe system. Moreover, a system can be realized which is not affected by hindrances and is improved in security function.

(5) According to the present invention, in a distributed network computing system including a first data processing unit for providing an application service, a terminal for receiving the application service from the first data processing unit, and a communication network which connects the first data processing unit and the terminal, communication infrastructure data management means for managing communication infrastructure data representing a communication capability of the communication network are arranged in a second data processing unit connected to the communication network independently of the first data processing unit.

The first data processing unit comprises retrieval means for retrieving the second data processing unit having the communication infrastructure data management means from one or a plurality of second data processing units, conversion means for acquiring the communication infrastructure data corresponding to the terminal as the communication partner from the communication infrastructure data management means, and converting service data provided as the application service into a specific format on the basis of the communication infrastructure data in the second data processing unit retrieved by the retrieval means, and communication means for transmitting through the communication network the service data converted by the conversion means, and a control means for controlling the terminal which is connected to the data exchange unit to be able to read a particular data when the terminal satisfies a prescribed condition and it requests to access the particular data.

With this arrangement, a service data provided by the first data processing unit which is a main server computer providing application services is converted into a service data having a different format corresponding to a communication capability of each one of plurality of different kind of networks forming a network. The conversion of format of the service data means, in this case, that a format of a data is converted into another format in accordance with the capability of the network to which a terminal on the other side is connected. For example, data is transmitted after it is compressed or encoded if the communication network has a high data transmission capability and data is transmitted after it is converted from a binary data to a text data, after it is changed from such a format data as "centering" into a blank character or after it is changed in size by ignoring a font information and the like if the communication network has a low data transmission capability. In addition, data can be compressed and transmitted to the terminal connected to the communication network having a low data transmission capability if the terminal has a sufficient calculation capability.

Even the distributed network computing system in which various kind of communication infrastructures coexist, relative difference of data transmission speed, quantity or quality among the communication infrastructures can be adjusted.

On the terminal sides, each terminal can receive similar services to those which are received by other terminals even though their format is different from each other.

In addition, when a function of managing communication infrastructure data necessary for data exchange is distributed to the second data processing unit (sub-server computer), the processing load on the first data processing unit can be reduced, thus realizing a fail-safe system. Moreover, a system can be realized which is not affected by hindrances and is improved in security function.

With this arrangement, when a function of managing terminal attribute data or communication infrastructure data necessary for data exchange is distributed to the second data processing unit (sub-server computer), the processing load on the first data processing unit can be reduced, thus realizing a fail-safe system.

(6) According to the present invention, in a distributed network computing system including a first data processing unit for providing an application service, a terminal for receiving the application service from the first data processing unit, and a communication network which connects the first data processing unit and the terminal, terminal attribute data management means for managing terminal attribute data representing a processing capability of the terminal and communication infrastructure data management means for managing communication infrastructure data representing a communication capability of the communication network are arranged in a second data processing unit connected to the communication network independently of the first data processing unit.

The first data processing unit comprises retrieval means for retrieving the second data processing unit having the terminal attribute data management means and the communication infrastructure data management means from one or a plurality of second data processing units, conversion means for acquiring the terminal attribute data of the terminal as a communication partner from the terminal attribute data management means and simultaneously acquiring the communication infrastructure data corresponding to the terminal as the communication partner from the communication infrastructure data management means, and converting service data provided as the application service into a specific format on the basis of the terminal attribute data and the communication infrastructure data in the second data processing unit retrieved by the retrieval means, and communication means for transmitting through the communication network the service data converted by the conversion means, and a control means for controlling the terminal which is connected to the data exchange unit to be able to read a particular data when the terminal satisfies a prescribed condition and it requests to access the particular data.

With this arrangement, a service data provided by the first data processing unit which is a main server computer providing application services is converted into a service data having a different format corresponding to a data processing capability of each terminal a communication capability of each one of plurality of different kind of networks forming a network. The conversion of format of the service data means, in this case, that a format of a data is converted into another format in accordance with the capability of the network to which a terminal on the other side is connected.

The distributed network computing system, thus, can be constructed using such terminals as personal digital assistants (PDA) which is superior in carrying but inferior in capability of information processing or calculating and of providing display or user interface to such other type of terminals as personal computers (PCs). Terminals, thus, can receive similar services which other type of terminals can receive even if the data format is different from each other. With this processing, even in a system having various communication infrastructures, the relative difference in data transmission rate/volume/quality among the communication infrastructures can be absorbed. The terminal can receive the same service as that for the remaining terminals although the data format is different. The conversion of format of the service data means, in this case, that a format of a data is converted into another format in accordance with the capability of the network to which a terminal on the other side is connected.

In addition, when a function of managing communication infrastructure data necessary for data exchange is distributed to the second data processing unit (sub-server computer), the processing load on the first data processing unit can be reduced, thus realizing a fail-safe system. Moreover, a system can be realized which is not affected by hindrances and is improved in security function.

(7) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises terminal attribute data management means for managing terminal attribute data representing a processing capability of the terminal, conversion means for acquiring the terminal attribute data of the terminal as a communication partner from the terminal attribute data management means and converting service data provided as the application service into a specific format on the basis of the terminal attribute data, communication means for transmitting through the communication network the service data converted by the communication means and a control means for controlling the terminal which is connected to the data exchange unit to be able to read a particular data when the terminal satisfies a prescribed condition and it requests to access the particular data.

According to this arrangement, when a plurality of terminals are present on a network, service data provided by the data processing unit is converted in correspondence with the processing capability of each terminal. In this case, the data exchange process means processing of changing the format of certain data in correspondence with the processing capability of a terminal as a communication partner. For example, in transmitting image data (image), if the partner terminal has no image processing capability, the image data is converted into symbol data and is transmitted.

With this processing, a terminal which is excellent in portability but poor in data processing capability (arithmetic capability) or screen display/user interface providing capability relative to other terminals (e.g., PCs) can be used to constitute a distributed network computing system. The terminal can receive the same service as that for the remaining terminals although the data format is different.

Particularly, when this data exchange process is performed by network connection means (e.g., a line exchange system or a router), the data can be converted into a final format near the user terminal. More specifically, when a network is constituted by subnetworks, the data exchange process can be performed in correspondence with the subnetwork.

(8) According to the present invention, in a distributed network computing system including a data processing unit for providing an application service of various application software, a terminal for receiving the application service from the data processing unit, and a communication network which connects the data processing unit and the terminal, a data exchange unit is arranged in the data processing unit.

This data exchange unit comprises communication infrastructure data management means for managing communication infrastructure data representing a communication capability of the communication network, conversion means for acquiring the communication infrastructure data of the communication network connected to the terminal as a communication partner from the communication infrastructure data management means and converting service data provided as the application service into a specific format on the basis of the communication infrastructure data, and communication means for transmitting through the communication network the service data converted by the communication means.

According to this arrangement, when a plurality of communication networks are present on a network, service data provided by the data processing unit is converted in correspondence with the communication capability of each communication network. In this case, the data exchange process means processing of changing the format of certain data in correspondence with the communication capability of a communication network connected to a terminal as a communication partner. For example, if the data transmission capability of the communication network is high, the data is enciphered and transmitted. If the data transmission capability is low, the transmission data size is changed by converting binary data into text data, converting format data such as centering into a blank character, or neglecting the font data, and thereafter, the data is transmitted. When the data transmission capability is low, and the terminal side has an appropriate arithmetic capability, the data may be compressed and transmitted.

With this processing, even in a system having various communication infrastructures, the relative difference in data transmission rate/volume/quality among the communication infrastructures can be absorbed. The terminal can receive the same service as that for the remaining terminals although the data format is different. Further, the terminal can be improved in its security function.

Particularly, when this data exchange process is performed by network connection means (e.g., a line exchange system or a router), the data can be converted into a final format near the user terminal. More specifically, when a network is constituted by subnetworks, the data exchange process can be performed in correspondence with the subnetwork with security function being improved.

(9) According to the present invention, a data exchange unit is arranged in the network connecting means which connects networks with each other in a distributed network computing system including a data processing unit for providing an application service of various application software, a terminal for receiving the application service from the data processing unit, and a communication network which connects the data processing unit and the terminal.

This data exchange unit comprises terminal attribute data management means for managing terminal attribute data representing a processing capability of the terminal, communication infrastructure data management means for managing communication infrastructure data representing a communication capability of the communication network, conversion means for acquiring the terminal attribute data of the terminal as a communication partner from the terminal attribute data management means and simultaneously acquiring the communication infrastructure data of the communication network connected to the terminal from the communication infrastructure data management means, and converting service data provided as the application service into a specific format on the basis of the terminal attribute data and the communication infrastructure data, and communication means for transmitting through the communication network the service data converted by the communication means.

Furthermore, the data exchange unit has a feature that it controls a terminal which is connected to the data exchange unit to be able to read a particular data when the terminal satisfies a prescribed condition and it requests to access the particular data.

According to this arrangement, when a plurality of terminals and a plurality of communication networks are present on a network, service data provided by the data processing unit is converted in correspondence with the processing capability of each terminal and the communication capability of each communication network. In this case, the data exchange process means processing of changing the format of certain data in correspondence with the processing capability of a terminal as a communication partner and the communication capability of a communication network connected to the terminal.

With this processing, a terminal which is excellent in portability but poor in data processing capability (arithmetic capability) or screen display/user interface providing capability relative to other terminals (e.g., PCs) can be used to constitute a distributed network computing system. The terminal can receive the same service as that for the remaining terminals although the data format is different.

Particularly, when this data exchange process is performed by network connection means (e.g., a line exchange system or a router), the data can be converted into a final format near the user terminal. More specifically, when a network is constituted by sub-networks, the data exchange process can be performed in correspondence with the sub-network.

BRIEF DESCRIPTION OF THE SEVERAL VIEWS OF THE DRAWING

FIG. 16 is a view showing an example of the structured document shown in FIG. 15;

DETAILED DESCRIPTION OF THE INVENTION

An embodiment of the present invention will be described below with reference to the accompanying drawing.

Figure 1:
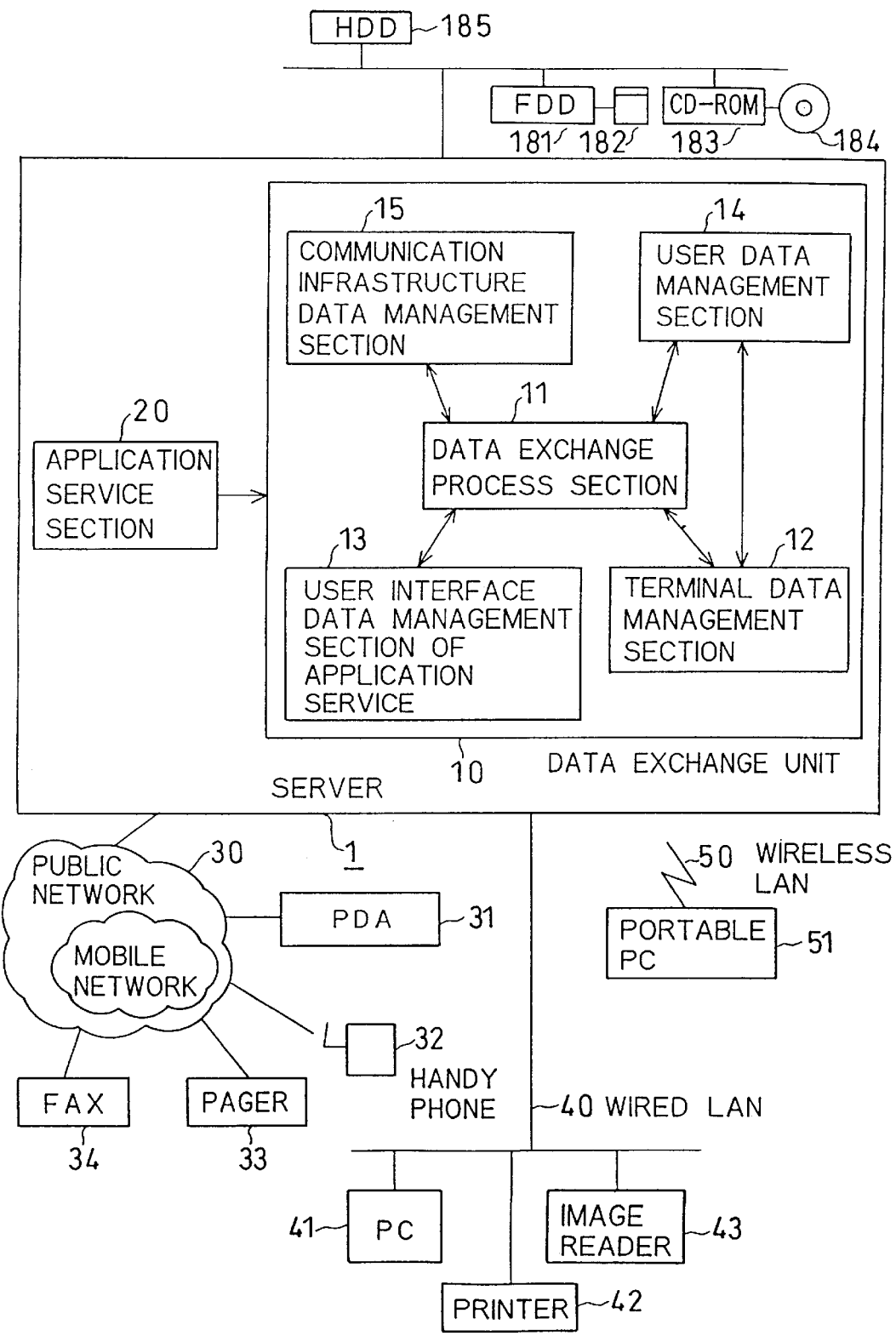
FIG. 1 is a block diagram showing the structure of a distributed network computing system according to an embodiment of the present invention.

FIG. 1 is a block diagram showing the structure of a distributed network computing system according to an embodiment of the present invention. Referring to FIG. 1, reference numeral 1 denotes a server constituted by a general-purpose computer having a high processing capability.

The server 1 is set in an office. The server 1 has an application service section 20 for providing various application services (application software) such as an inventory control service to each terminal. The services provided by the application service section 20 can be utilized by using an image reader 43 or a printer 42 (to be described later) as an I/O unit.

The server 1 is connected to three communication networks (to be referred to as communication infrastructures hereinafter) having different communication capabilities, i.e., a public network 30, a wired LAN (Local Area Network) 40, and a wireless LAN 50.

The public network 30 is connected to a personal digital assistants (PDS) 31, a handy phone 32, a pager 33, a facsimile apparatus (FAX) 34. The public network 30 is an analog or digital communication network. The data transmission volume of an analog communication network is generally smaller than that of a digital communication network. The PDA 31 is connected to the server 1 through a mobile communication network contained in the public network 30. The quality of mobile communication is low not only because the data transmission volume is small but also because line disconnection or a data transmission error readily occurs due to the mobility. In this embodiment, the PDA 31 gives prominence to the portability. Accordingly, the screen size/control function is low, and only text data can be used. The processing capability of the CPU is lower than that of a personal computer. In addition, the PDA 31 has no external storage unit.

The wired LAN 40 is connected to a personal computer (to be referred to as a PC hereinafter) 41, the printer 42, and the image reader 43. The wired LAN 40 generally has a large transmission data volume and a stable line quality relative to radio communication such as a handy phone service. A current distributed network application service oriented to a general office is often designed in correspondence with the wired LAN 40.

The printer 42 and the image reader 43 are set as output/input devices in the office building. For, e.g., an inventory control service, an inventory slip is read by the image reader 43, the readout data is sent to the server 1 through the wired LAN 40, and the spreadsheet result is output from the printer 42.

A portable PC 51 is connected to the wireless LAN 50. The wireless LAN 50 has almost the same processing capability as that of the wired LAN 40. However, the processing capability of the portable PC 51 connected to the wireless LAN 50 is lower than that of the PC 41 connected to the wired LAN 40.

As described above, in the network environment, the processing capability changes in units of terminals, and the communication capability also changes in units of communication infrastructures.

In this embodiment, a data exchange unit 10 is arranged in the server 1 such that the attributes (the difference in processing capability and the difference in communication capability) of various terminals and communication infrastructures on the network are absorbed.

The data exchange unit 10 is constituted by a data exchange process section 11, a terminal data management section 12, a user interface data management section 13 of application service, a user data management section 14, and a communication infrastructure data management section 15.

Further, the server 1 is connected to a floppy disk drive (FDD) 181, a hard disk drive (HDD) 185, opto-electronic disk memory drive (CD-ROM Drive) 183 by means of bus. The programs shown by the flowcharts in FIGS. 7, 8, 10–14, 17–31 as well as FIG. 33 and FIG. 34 can be stored in diskette 182 of FDD 181, magnetic disk of HDD 185 and CD 184 of CD-ROM Device 183.

The structures of various sections of the data exchange unit 10 will be described below with reference to FIG. 2 to 8.

Figure 2:
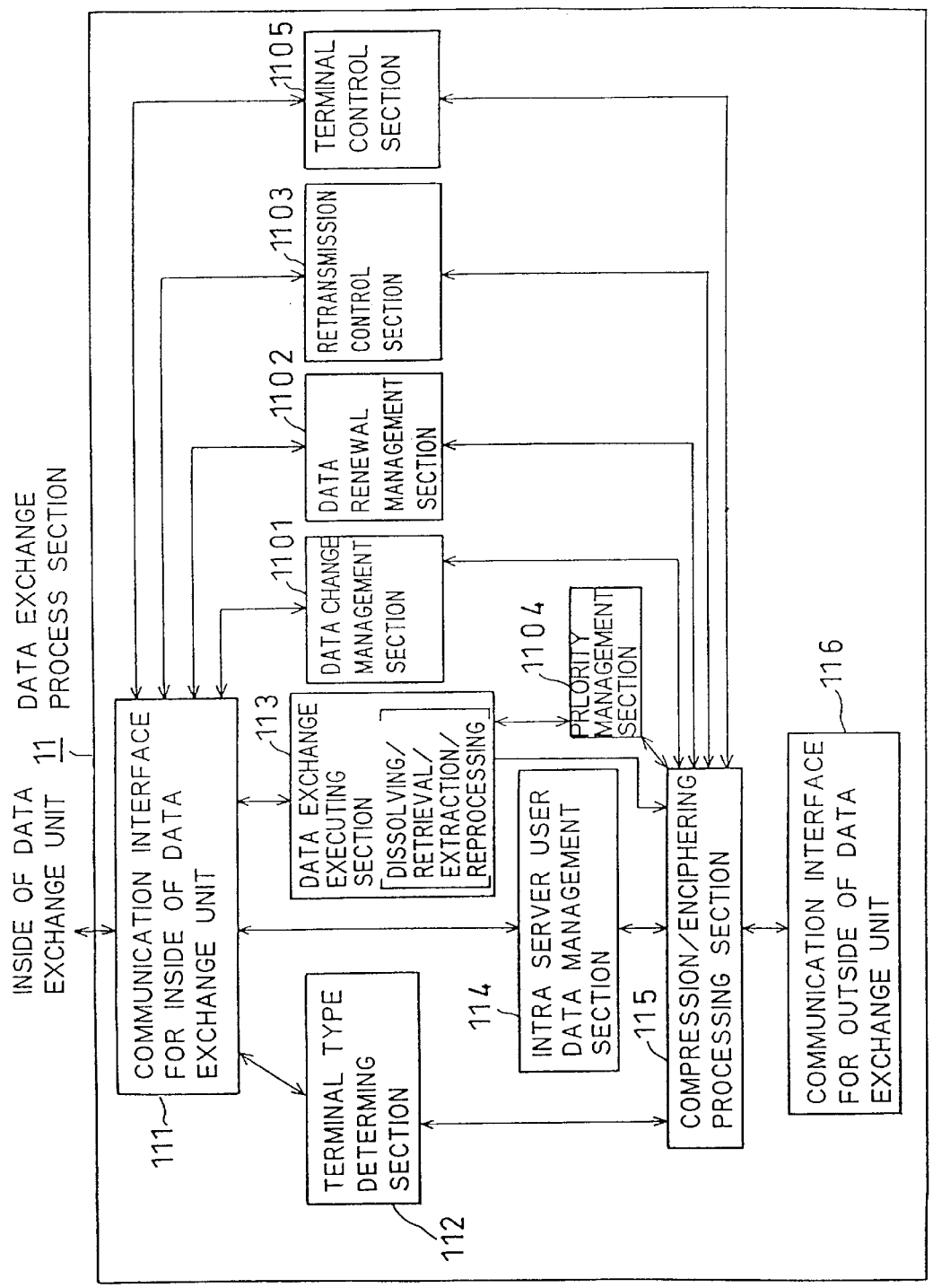
FIG. 2 is a block diagram showing the internal structure of a data exchange process section in a data exchange apparatus.

FIG. 2 is a block diagram showing the internal structure of the data exchange process section 11. The data exchange process section 11 performs a series of processing operations to convert data as an application service into another data in correspondence with the attribute of each terminal or communication infrastructure. The data exchange process section 11 is constituted by a communication interface 111 for inside of data exchange unit, a terminal type determining section 112, a data exchange executing section 113, an intra server user data management section 114, a compression/enciphering processing section 115, a communication interface 116 for outside of data exchange unit, a data change management section 1101, a data renewal management section 1102, a retransmission management section, a priority management section 1104 and, a terminal control section 1105.

The communication interface 111 for inside of data exchange unit is an interface for communication with another element in the data exchange unit 10. The terminal type determining section 112 determines the type of a user terminal (e.g., a large-screen desktop PC, a portable small-screen sub-notebook PC, a PDA). The data exchange executing section 113 executes an actual data exchange process (dissolving, retrieval, extraction, and reprocessing of data). The intra server user data management section 114 manages user data registered in the server 1. The compression/enciphering processing section 115 compresses or enciphers communication data in accordance with the determination result of the terminal type determining section 112 in communication with an external device outside the data exchange unit 10. The communication interface 116 for outside of data exchange unit is an interface for communication with an external device outside the data exchange unit 10.

A data change management section serves to inform a terminal equipment which relates to the data, of a data change, when the data stored in the server 1 has been changed, and has a function to take a countermeasure for the data change. A data renewal management section 1102 is connected to an inside communication interface of a data exchange unit and a compression/enciphering processing section 115, and performs control and processing to transmit the data renewal information on the document data/user data stored at the server 1 by using structured language and the image data converted to symbol data as well as to perform the control of transmission of the other above-mentioned data to outside. The retransmission control section 1103, together with a retransmission/disconnection treatment section 153, performs the retransmission control of the data, when the data transmission to terminal equipment is failed. In other words, the retransmission control section 1103 is so constructed as to set the interval for retransmission after several minutes in case that the line for the receiver is busy, as well as to shorten the transmission time by reprocessing of data or by making the data size compact by compressing under the control of a data exchange execution section 113 and/or a compression/enciphering processing section 115 in case that retransmission shall be made due to a packet failure in packet communication. A priority management section performs the control and execution of the transmission means based upon the determination of the priority rate of the transmission. Furthermore, a data exchange process section 11 is equipped with a terminal control section 1105, which functions to make a continuation of the service possible by supervising the status of the terminals, even if trouble takes place on the side of the terminals.

Figure 3:
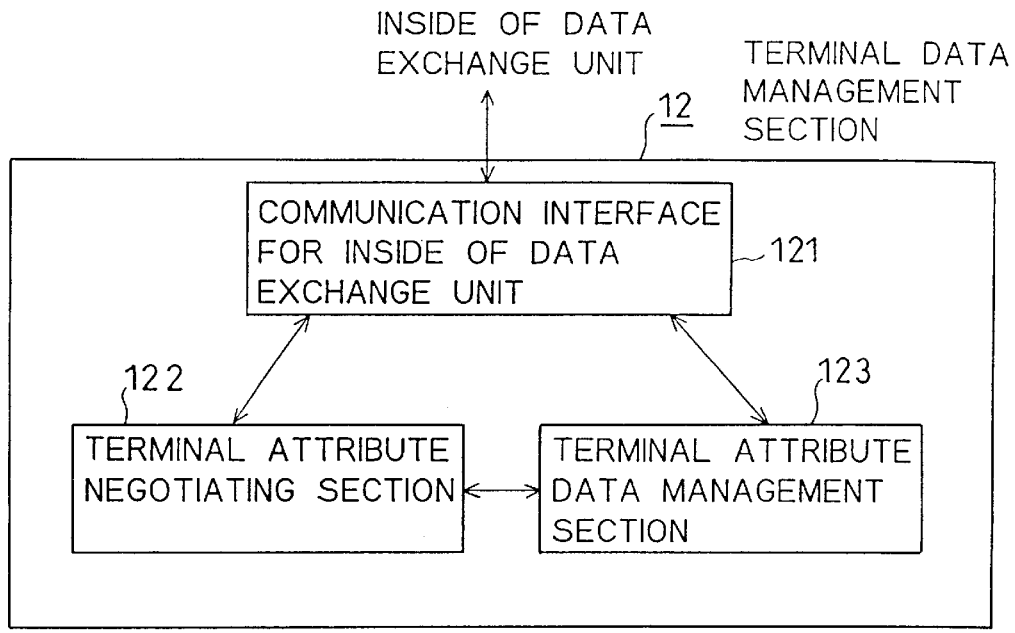
FIG. 3 is a block diagram showing the internal structure of a terminal data management section in the data exchange apparatus.

FIG. 3 is a block diagram showing the internal structure of the terminal data management section 12. The terminal data management section 12 manages attribute data representing the processing capability such as a CPU capability, a display capability, and a memory capacity of each terminal connected to the server 1. The terminal data management section 12 is constituted by a communication interface 121 for inside of data exchange unit, a terminal attribute negotiating section 122, and a terminal attribute data management section 123.

The communication interface 121 for inside of data exchange unit is an interface for communication with another element in the data exchange unit 10. The terminal attribute negotiating section 122 is an interface for various communications, i.e., negotiations about the terminal attribute between the terminal data management section 12 and the terminal. The terminal attribute data management section 123 manages/operates a terminal attribute table in which terminal attribute data of each terminal is registered.

Figure 4:
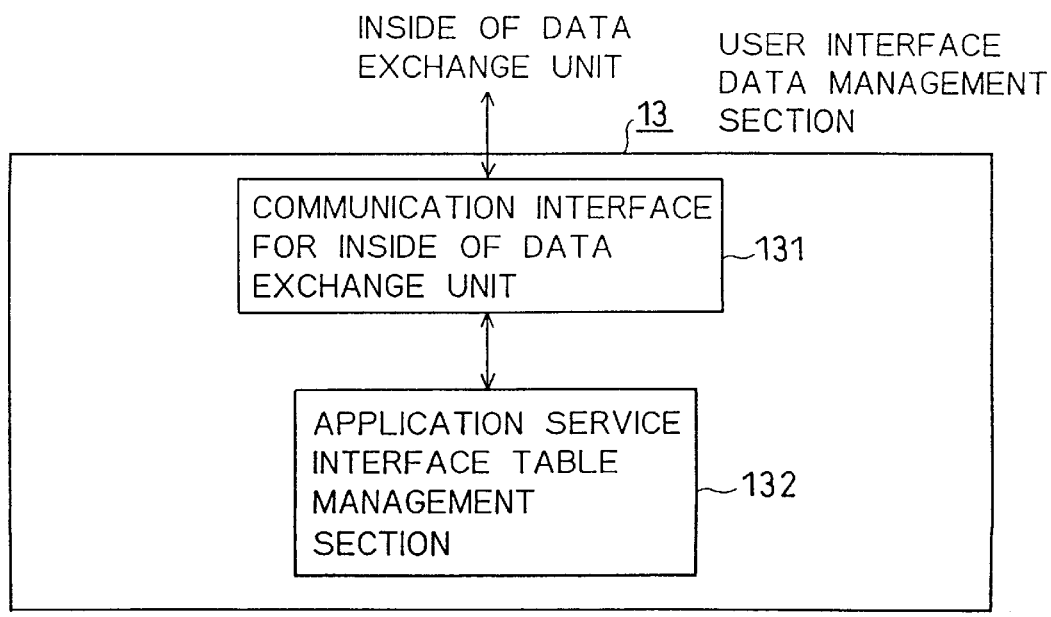
FIG. 4 is a block diagram showing the internal structure of a user interface data management section in the data exchange apparatus.

FIG. 4 is a block diagram showing the internal structure of the user interface data management section 13. When the user utilizes the application service, the method of operating the application service changes depending on the terminal, e.g., an icon or a button is operated, or a command is input on the terminal. The user interface data management section 13 manages user interface data representing an operation method unique to each terminal for the application service. The user interface data management section 13 is constituted by a communication interface 131 for inside of data exchange unit and an application service interface table management section 132.

The communication interface 131 for inside of data exchange unit is an interface for communication with another element in the data exchange unit 10. The application service interface table management section 132 manages data (e.g., an operating method for each terminal) associated with the user interface of each application service.

Figure 5:
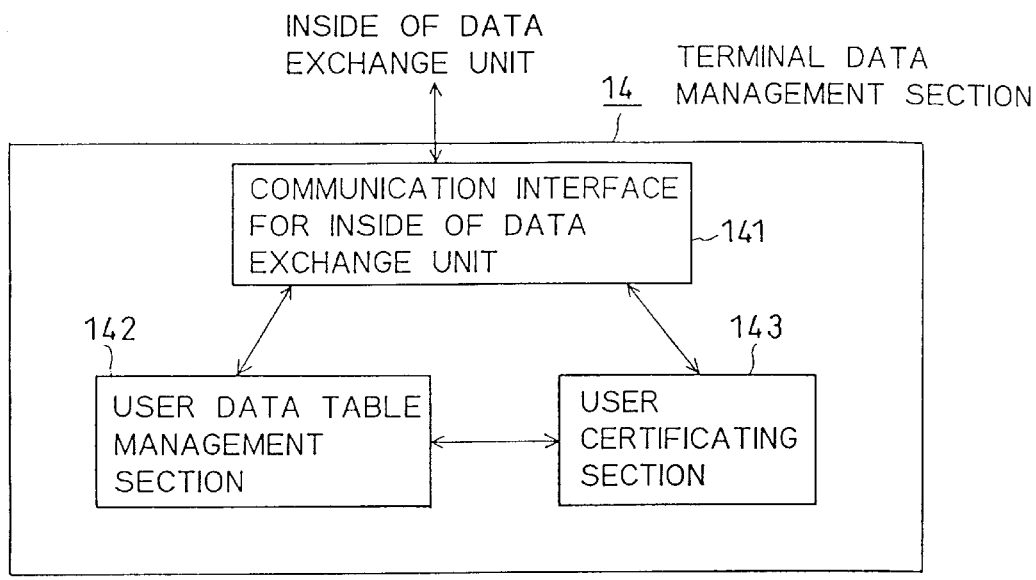
FIG. 5 is a block diagram showing the internal structure of a user data management section in the data exchange apparatus.

FIG. 5 is a block diagram showing the internal structure of the user data management section 14. In use of an application service, the preference for, e.g., screen display changes depending on the user. For example, a display object such as a graph is arbitrarily moved to a position with a better view on the terminal. The user data management section 14 manages user data representing an operation method unique to each user, including the preference for screen display in use of the application service (in this case, the user data is registered in the server in advance). The user data management section 14 is constituted by a communication interface 141 for inside of data exchange unit, a user data table management section 142, and a user certification section 143.

The communication interface 141 is an interface for communication with another element in the data exchange unit 10. The user data table management section 142 manages associated data including the user name, the user and the terminal name, the address, and the type of communication infrastructure. The user certification section 143 operates when a user certification is required in the data exchange unit 10.

Figure 6:
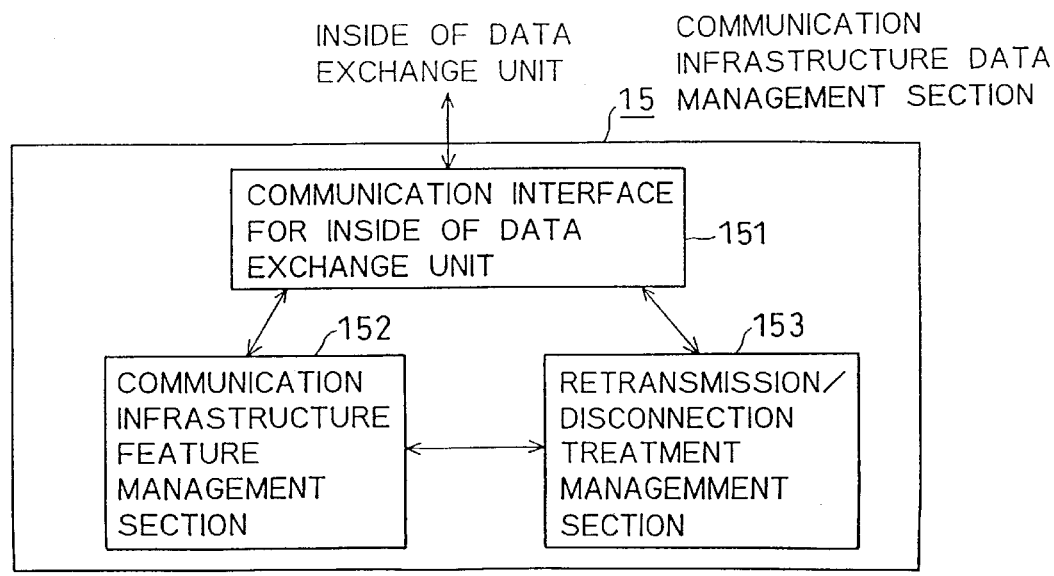
FIG. 6 is a block diagram showing the internal structure of a communication infrastructure data management section in the data exchange apparatus.

FIG. 6 is a block diagram showing the internal structure of the communication infrastructure data management section 15. The communication infrastructure data management section 15 manages attribute data representing the communication capability such as the data transmission rate, the transmission volume, and the quality of each communication network. The communication infrastructure data management section 15 is constituted by a communication interface 151 for inside of data exchange unit, a communication infrastructure feature management section 152, and a retransmission/disconnection treatment management section 153.

The communication interface 151 is an interface for communication with another element in the data exchange unit 10. The communication infrastructure feature management section 152 manages feature data including the transmission quality and the transmission rate of the communication infrastructure. The retransmission/disconnection treatment management section 153 has a function of performing a retransmission/disconnection treatment in correspondence with the communication infrastructure in use.

The operation of this embodiment will be described below.

A general processing operation of an application service, e.g., an inventory control service without using the data exchange unit 10 will be described first.

Figure 7:
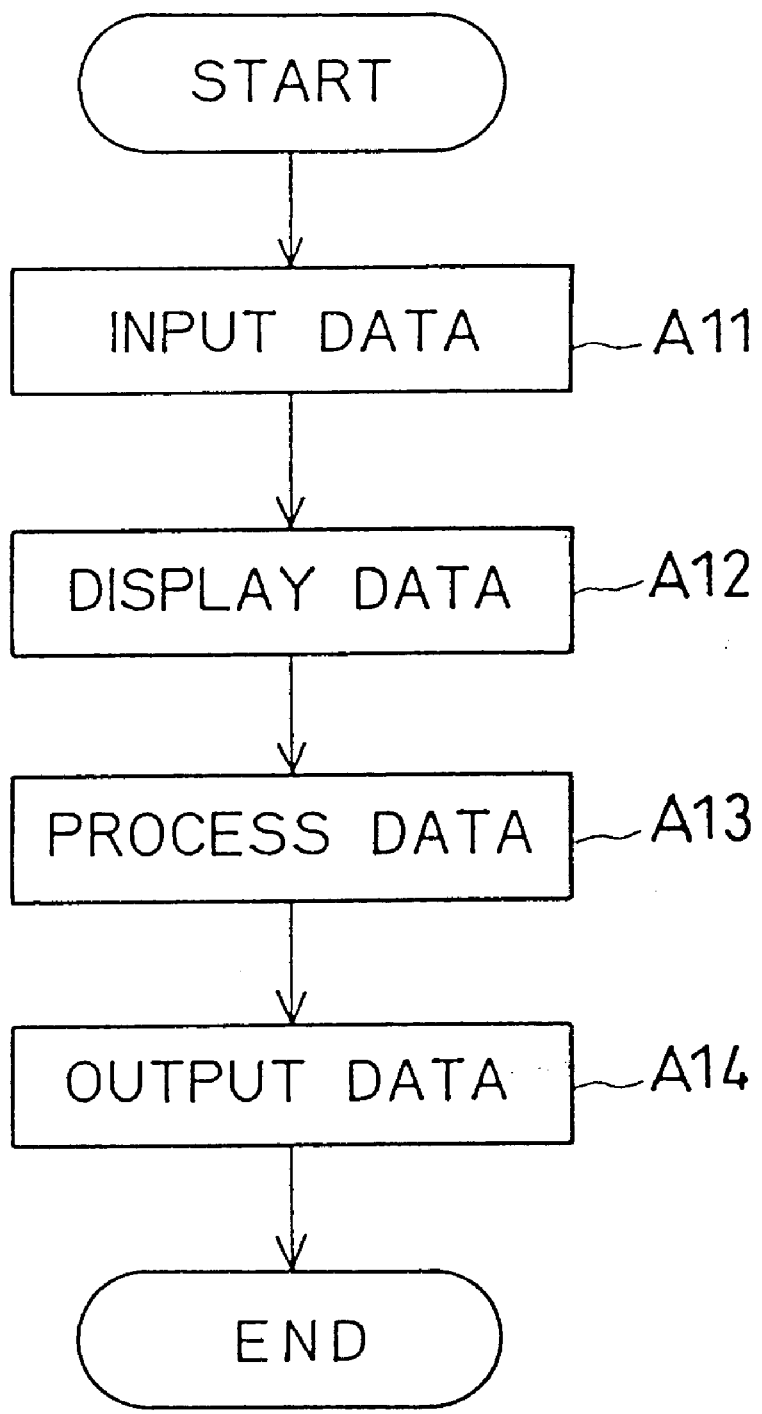
FIG. 7 is a flow chart showing a general application service processing operation.

FIG. 7 is a flow chart showing a general application service processing operation. The server 1 receives data from the image reader 43 through the wired LAN 40 and transfers data of, e.g., an inventory slip to the application service section 20 (step A11). In the server 1, the application service section 20 extracts a necessary inventory amount from the slip data read by the image reader 43, and displays the contents on the display screen of, e.g., the PC 41 for the user of the PC 41 (step A12).

With this display, the user processes the data, e.g., updates the inventory amount to the latest data, using the PC 41 connected to the server 1 (step A13). Upon receiving the corrected data from the user, the application service section 20 outputs the latest inventory slip reflecting the correction result to the printer 42 (step A14). With this processing, the user can obtain the latest inventory slip from the output result of the printer 42.

Such a general application service assumes that the user can use the PC 41, the printer 42, and the image reader 43 in the vicinity. In the example shown in FIG. 1, the PC 41, the printer 42, and the image reader 43 are connected to the server 1 through the wired LAN 40 in the office.

A case wherein the application service is provided to the user of the PDA 31 or portable PC 51 outside the office will be described next.

Figure 8:
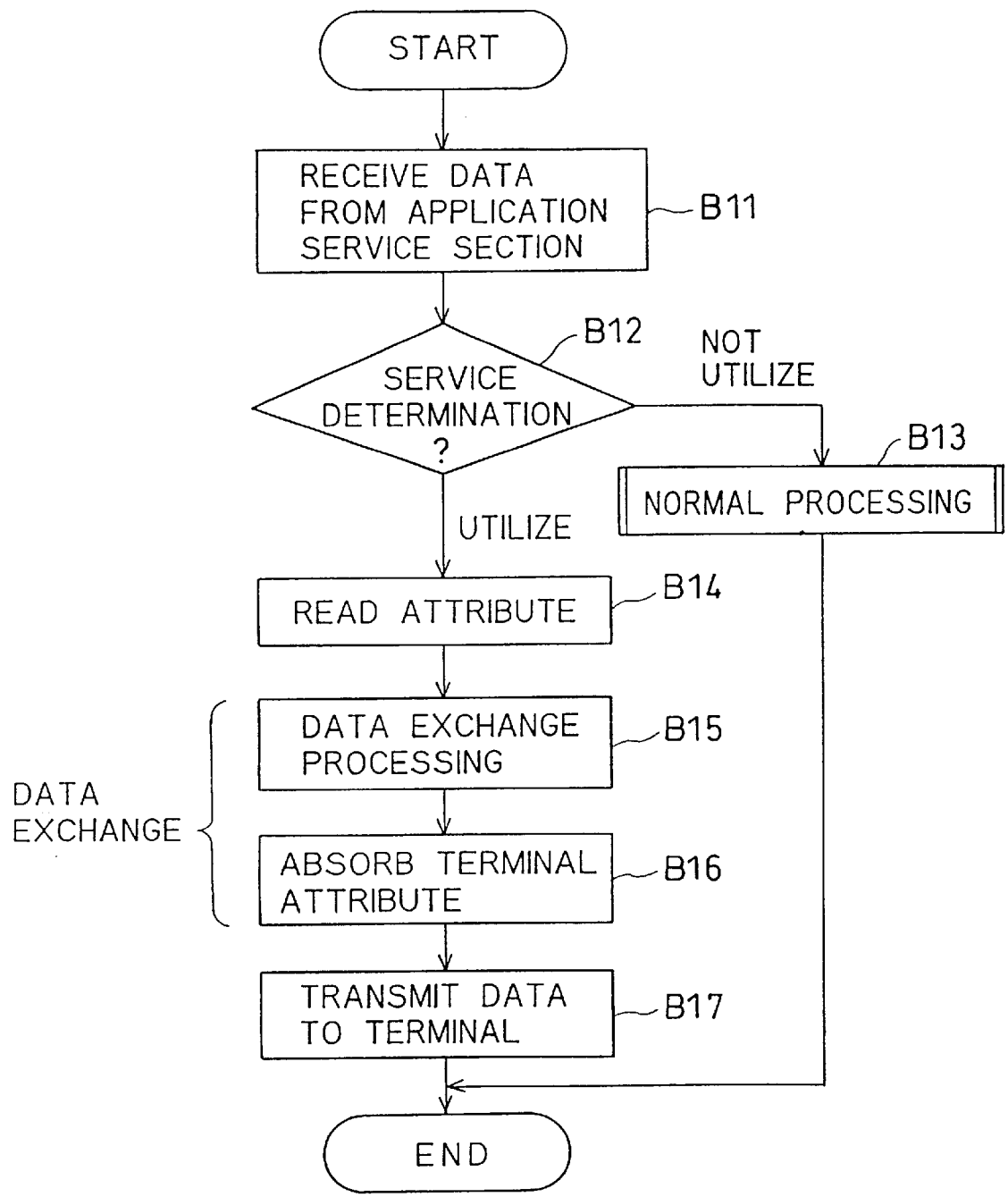
FIG. 8 is a flow chart showing an application service processing operation using the data exchange apparatus.

FIG. 8 is a flow chart showing an application service processing operation using the data exchange unit 10. The data exchange unit 10 is set next to the external interface of the application service section 20 in the server 1.

When a request is output from a terminal, the data exchange unit 10 receives the data of the terminal from the application service section 20 (step B11). When the terminal as a transmission destination is the PC 41 in the office, the data exchange unit 10 need not be used (to "not to be utilized" at step B12).

The server 1 executes normal processing described in FIG. (step B13).

When the transmission destination is the PDA 31 or portable PC 51 outside the office, a routine for executing the data exchange process by the data exchange unit 10 starts (to "to be utilized" at step B12).

The data exchange unit 10 acquires terminal attribute data of the terminal from the terminal data management section 12 (step B14) and performs the data exchange process for the data received from the application service section 20 on the basis of the terminal attribute data (steps B15 and B16). In this case, the data exchange process means processing of absorbing the terminal attribute by converting the format of certain data in correspondence with the processing capability of the terminal.

For example, when image data (image) is to be transmitted to a terminal without image processing capability, the image data is converted into symbol data and sent. With this processing, the terminal can receive the same service as that for the remaining terminals although the data format is different. After the data exchange process corresponding to the terminal attribute is performed, the data exchange unit 10 sends the converted data to the terminal as service data (step B17).

The operation of reading the terminal attribute from the terminal data management section 12 will be described below. The terminal attribute includes a screen size, screen control data, and data type which can be displayed on the screen.

Two techniques are available to read the terminal attribute.

(A) The terminal attribute table is prepared in the terminal data management section 12.

(B) The terminal attribute data is acquired from the terminal.

In this embodiment, the former technique (A) is used when the terminal is the PDA 31. The latter technique (B) is used when the terminal is the portable PC 51. Selection of the technique (A) or (B) is determined by the terminal attribute data management section 123 upon obtaining the correspondence among the user name, the terminal address, and the communication infrastructure from the user data table management section 142 in the user data management section 14. When the terminal side has a sufficient CPU capability, and the quality of the communication line is high, the latter technique (B) is employed to negotiate with the terminal side for the terminal attribute.

Figure 9:
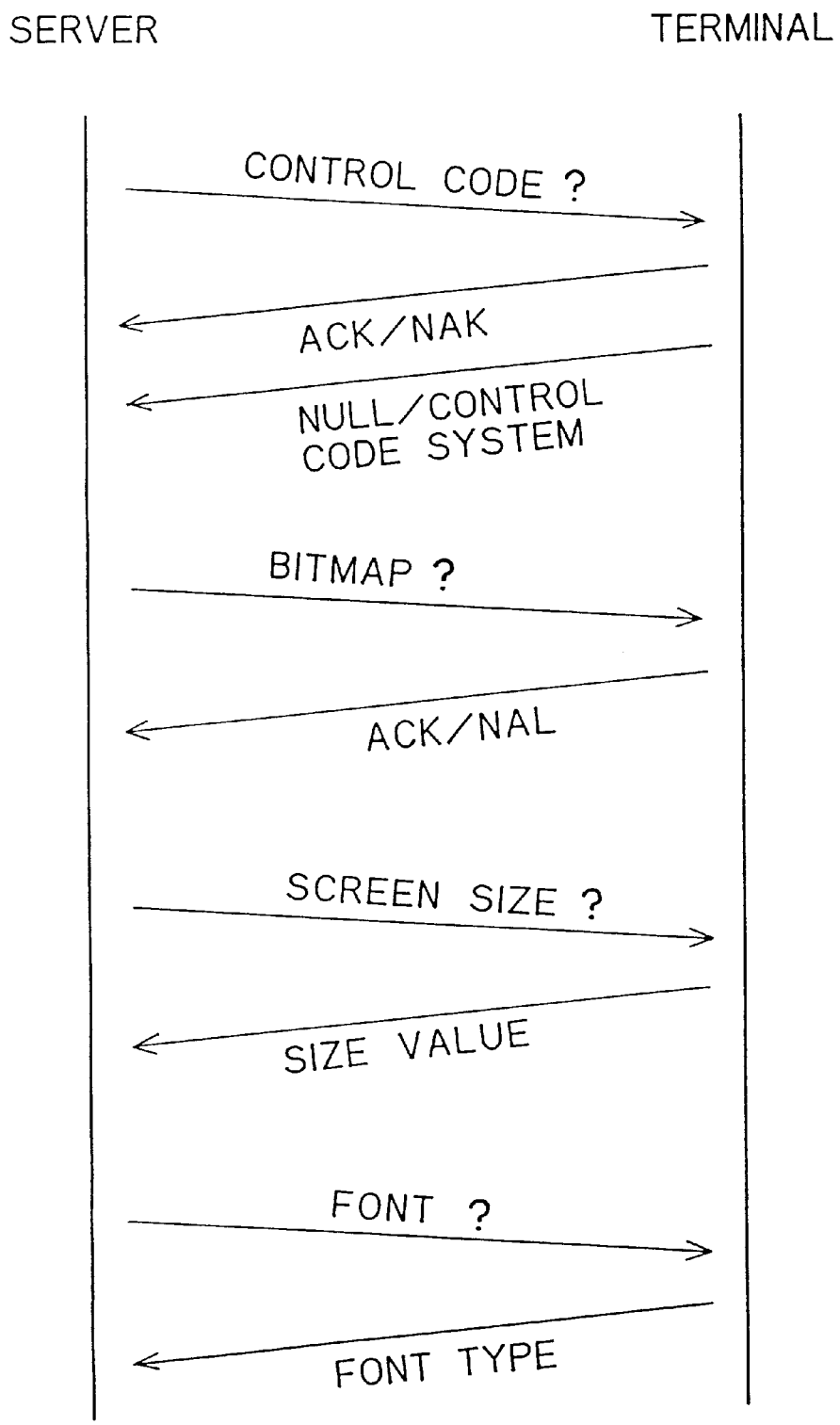
FIG. 9 is a view showing a protocol sequence for determining a terminal attribute.

For the technique (B), a protocol for determining the terminal attribute is defined between the terminal and the server (data exchange unit 10). FIG. 9 shows the concept of the protocol sequence. As shown in this protocol sequence, the terminal and the server (data exchange unit 10) confirm the control code system (the line feed code, the tab, and the like), the bitmap, the screen size, the usable font type (including the corresponding language), and the like.

The data exchange method will be described next. The data exchange process is executed when the terminal side has no display capability, or the communication infrastructure has no sufficient data transmission capability, and the server must quantitatively/qualitatively change the data.

More specifically, the data exchange process includes the following process operations.

Conversion from binary data to text data

Conversion from image data to symbol data

Conversion from icon data to symbol data

Conversion from speech data to text data

Conversion from a color image to a monochromatic image

Conversion from binary data to text data will be described. In a document forming application, i.e., word processor software used in a PC or the like, prepared document data is often stored as binary data. This is because not only the text data but also various accessory data including the document format and the font must be stored.

Generally, the size of the binary data is larger than that of simple text data. To display the binary data, not only the text display capability but also various image display capabilities are required on the terminal side. In addition, the screen size of the terminal is often designed to be small in consideration of the portability. For this reason, the document data on the server side must be processed first and displayed in many cases.

To solve this problem, the data exchange process is effectively performed. That is, the binary data is converted into text data and sent to the terminal. With this processing, the terminal can perform processing corresponding to its processing capability. The data exchange process operation at this time is shown in FIG. 10.

Figure 10:
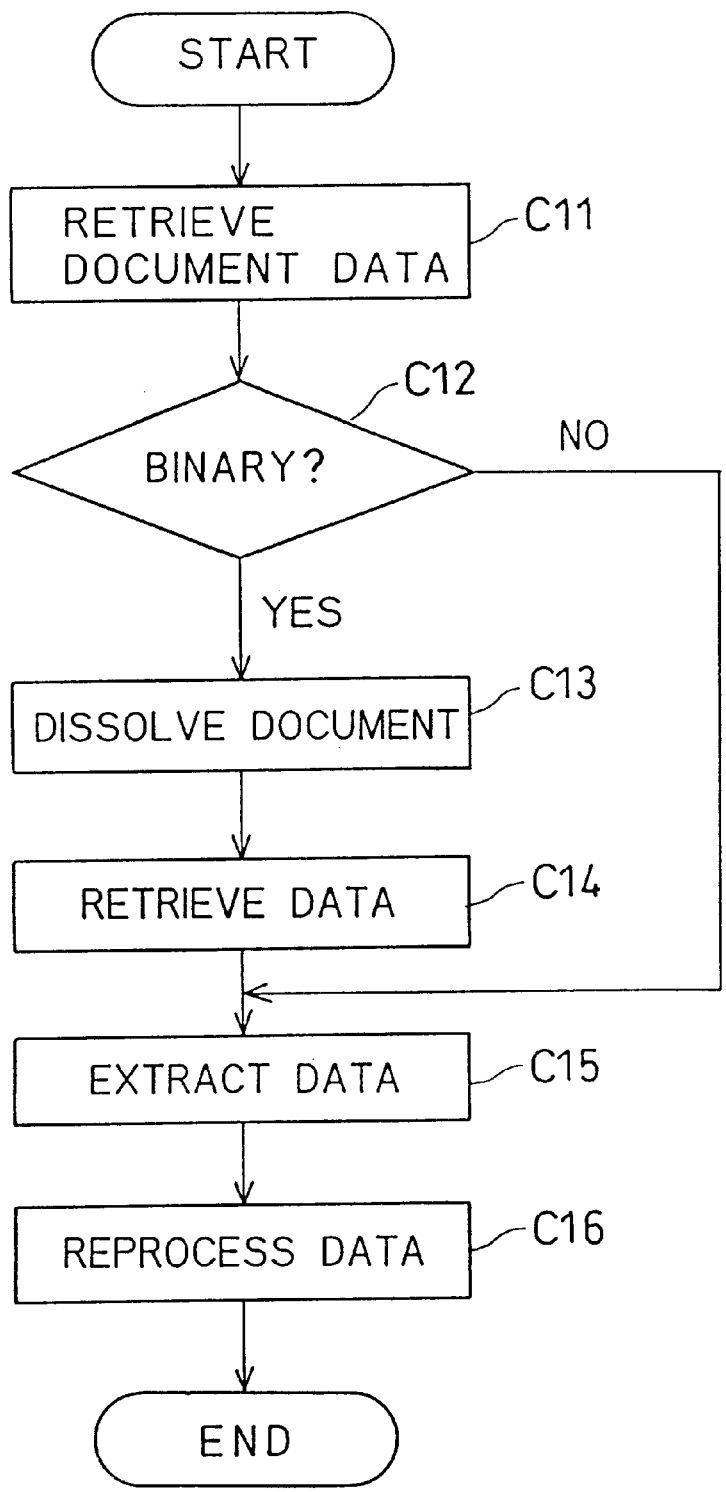
FIG. 10 is a flow chart showing a data exchange process operation corresponding to the terminal attribute.

FIG. 10 is a flow chart showing the data exchange process operation corresponding to the terminal attribute. Word-processor software will be exemplified as the application service. The intra server user data management section 114 in the data exchange unit 10 retrieves document data and checks the format of the stored document data (step C11).

If the document data is binary data (Yes in step C12), the data exchange executing section 113 in the data exchange unit 10 dissolves the binary document data into components such as a text, a format, and a font (step C13). Necessary data is retrieved and extracted from the components (steps C14 and C15), thereby reprocessing the data to a data format corresponding to the terminal screen (step C16). The reprocessed data, i.e., the word processor software service data which has undergone the data exchange process is provided to the terminal through the communication interface 116 for outside of data exchange unit.

This also applies to the remaining data exchange process operations. For example, when the terminal has no image processing capability, an image data portion is converted into symbol data, or an icon is converted into symbol data. When the terminal has no speech processing capability, speech data is converted into text data. With this processing, the service can be provided in correspondence with the processing capability of the terminal.

As described above, when a plurality of terminals are present on the network, service data provided as an application service is converted into a format corresponding to the processing capability of each terminal. With this processing, a terminal (e.g., a PDA) which is excellent in portability but poor in data processing capability (arithmetic capability) or screen display/user interface providing capability relative to other terminals (e.g., PCs) can be used to constitute a distributed network computing system. The terminal can receive the same service as that for the remaining terminals although the data format is different.

Such a data exchange process may be executed in accordance with the operation method of each terminal independently of the processing capability of the terminal itself.

More specifically, when the user utilizes the application service, the method of operating the application service changes depending on the terminal, e.g., an icon or a button is operated, or a command is input on the terminal. When the operation method of each terminal is registered in the user interface data management section 13 in advance as user interface data, and the data exchange process is performed in units of terminals on the basis of the user interface data, the service can always be provided in correspondence with the operation method of each terminal.

Alternatively, the data exchange process may be executed in accordance with the preference of the terminal user. In use of the application service, the preference for the display position changes depending on the user. For example, a graph is moved to the central position, or a text is displayed at the original position. When such preference for screen display (screen display preference data) is registered in the user data management section 14 in advance as user data, and the data exchange process is performed in units of users on the basis of the user data, the service can always be provided in correspondence with the display position of the user's preference.

A data exchange process corresponding to a communication infrastructure will be described next. The data exchange unit 10 grasps data associated with the communication infrastructure used by the terminal user through the communication infrastructure feature management section 152 in the communication infrastructure data management section 15 or the user data table management section 142 in the user data management section 14. Data retransmission processing control is also performed on the basis of this data. The data exchange process operation at this time is shown in FIG. 11.

Figure 11:
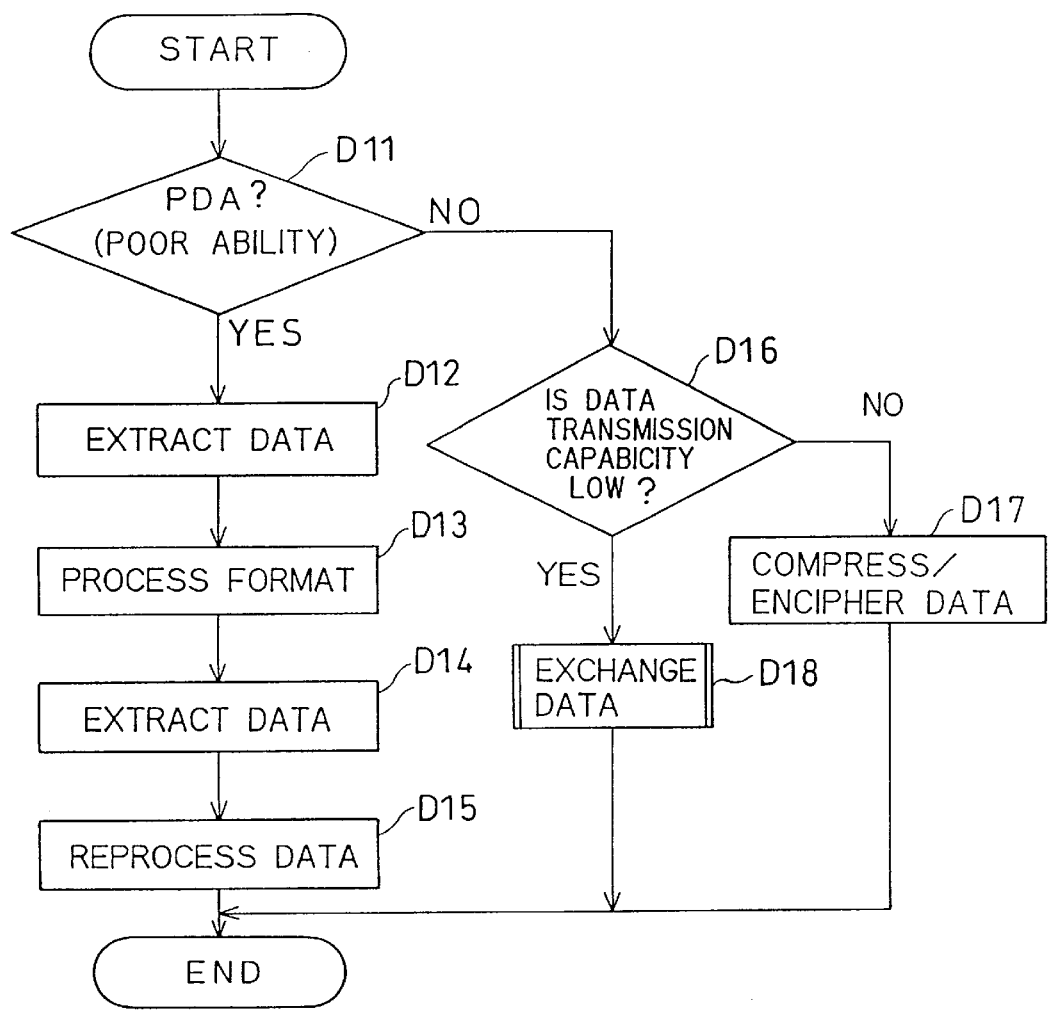
FIG. 11 is a flow chart showing a data exchange process operation corresponding to a communication infrastructure.

FIG. 11 is a flow chart showing the data exchange process operation corresponding to the communication infrastructure. When the user uses the portable PC 51, the CPU capability of the terminal can be determined as high (No in step D11). If the data transmission capability of the communication infrastructure is high (No in step D16), the data exchange process section 11 in the data exchange unit 10 compresses/enciphers data using the compression/enciphering processing section 115 as needed and transmits the data (step D17). If the data transmission capability (transmission speed, line quality (transmission error), etc.) of the communication infrastructure is low (Yes in step D16), the data exchange process is performed to convert binary data into text data, convert format data such as centering into a blank character, or ignore format data. With this processing, the transmission data size is changed, and thereafter, the data is transmitted (step D18).

When the PDA 31 with a low CPU capability is used (Yes in step D11), the data exchange process is performed independently of the communication infrastructure, as in FIG. 10 (steps D12 to D15).

As described above, the processing capability of the terminal is checked first. If the capability is high, the communication capability of the communication infrastructure is checked, and the data exchange process corresponding to the communication capability is performed. On the other hand, assume that the terminal has a low processing capability. In this case, even when the communication infrastructure has a high communication capability, the terminal itself cannot cope with the transmitted data. Therefore, the data exchange process corresponding to the processing capability of the terminal is performed.

With this processing, even in a system having various communication infrastructures, the relative difference in data transmission rate/volume/quality among the communication infrastructures can be absorbed. Therefore, the terminal can receive the same service as that for the remaining terminals although the data format changes.

Meantime, in embodiments of this patent, the explanation has been made assuming that PCs, portable PCs, portable terminal equipment, pagers, facsimile equipment, portable personal telephones, printers etc. are used as terminal equipment, any other type servers that can be connected to the network are acceptable. Furthermore, in the data exchange method mentioned in the above, programming data which describe the processing means may be stored in the memory, which is actuated in the server 1.

The above-described data exchange process can be realized using a recording medium on which program data describing the processing method is recorded. More specifically, the method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

Data enciphering processing will be described below. In use of the application service outside the office, enciphering of data is important to ensure the security of the application service. In this case, the terminal must have a capability of deciphering, so the enciphered data cannot be transmitted to all terminals. In addition, since enciphering increases the data volume, the communication infrastructure must have a high data transmission capability. The processing operation at this time is shown in FIG. 12.

Figure 12:
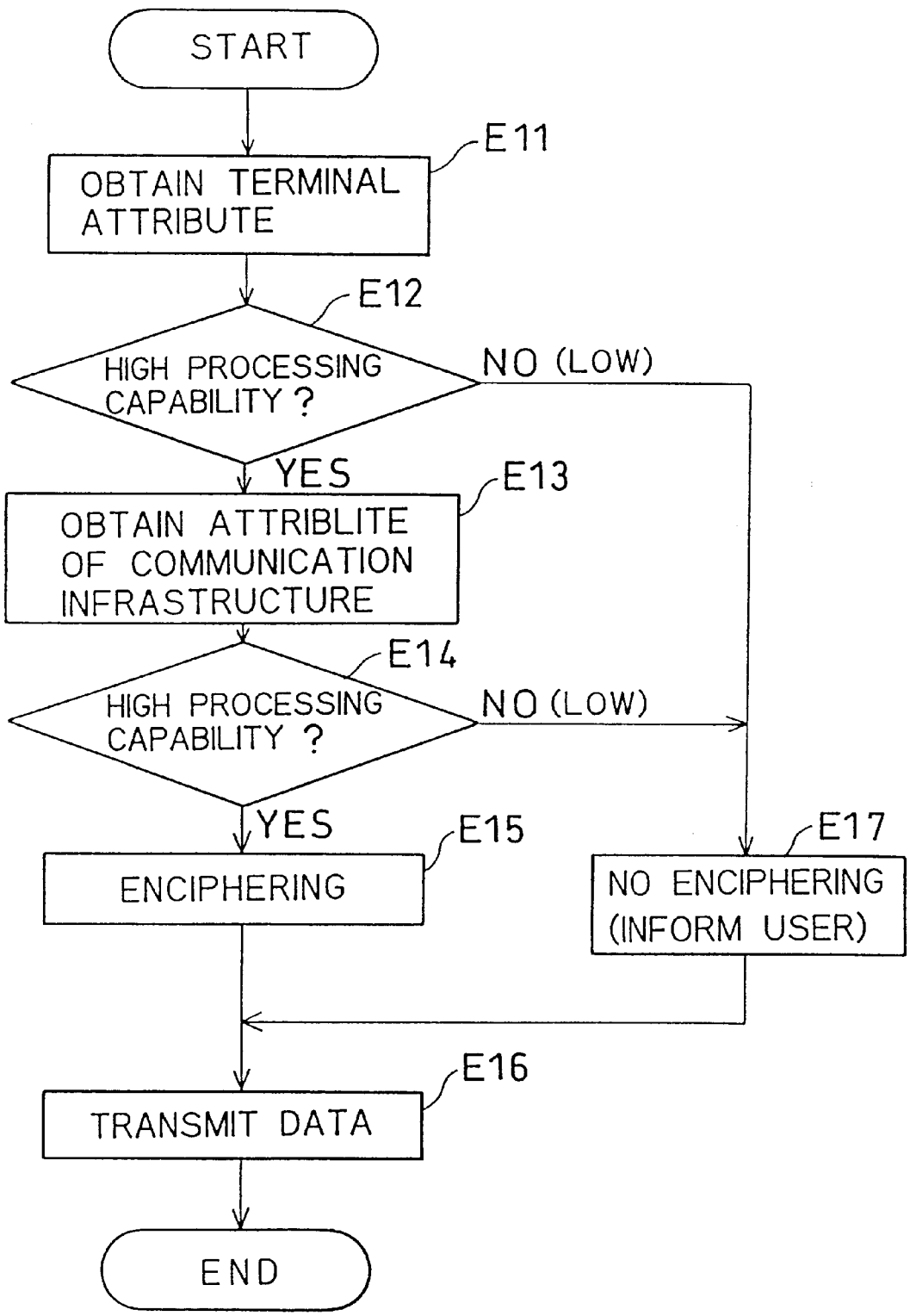
FIG. 12 is a flow chart showing a data enciphering processing operation.

FIG. 12 is a flow chart showing the data enciphering processing operation. In providing an application service of various application software by the application service section 20, the data exchange unit 10 obtains the attribute data of a terminal as a communication partner from the terminal data management section 12 (step E11), and determines the processing capability of the terminal on the basis of the attribute data (step E12).

If it is determined that the terminal has a high processing capability and a capability of deciphering enciphered data (Yes in step E12), the data exchange unit 10 obtains, from the communication infrastructure data management section 15, data of the communication infrastructure to which the terminal is connected (step E13), and determines the communication capability on the basis of the communication infrastructure data (step E14). If the communication capability is high (Yes in step E14), the data exchange unit 10 enciphers the application service data by the data exchange process section 11 (step E15), and transmits the enciphered service data to the terminal (step E16). The terminal deciphers the enciphered data and then uses the service.

If the terminal has a low processing capability and no capability of deciphering the enciphered data (No instep E12), the data exchange unit 10 directly transmits the application service data (step E16) without enciphering the data (step E17). At this time, the user may be informed of a message representing that no enciphering is performed. Alternatively, if the terminal has no capability of deciphering the enciphered data (No in step E12), the terminal side may be requested to determine whether transmission is enabled before data transmission, and transmission processing may be performed in accordance with the response.

If the terminal has a high processing capability, and the communication network connected to the terminal has a low communication capability (No in step E14), the data exchange unit 10 directly transmits the application service data (step E16) without enciphering the data (step E17). If the communication network has a low communication capability (No in step E14), the terminal side may be requested to determine whether transmission is enabled before data transmission, and transmission processing may be performed in accordance with the response.

Meantime, regarding the enciphering process, the option for the enciphering may be left to the user, even if the terminal equipment is of high level capable to process cipher code.

There are various levels of data enciphering ranging from simple scrambling to advanced enciphering processing. The load on the terminal or communication infrastructure also changes depending on the enciphering level. The level of enciphering can be appropriately changed in correspondence with the processing capability of the terminal or the communication capability of the communication infrastructure.

With the data enciphering function, the security of the application service can be ensured even outside the office. In this case, enciphering can be appropriately performed by determining the type of available enciphering or the enciphered data volume which can be transmitted by the communication infrastructure in use on the basis of the terminal attribute or communication infrastructure attribute.

Data compression processing will be described next. Data compression is effective in transmission of data in a large quantity, e.g., image data. In this case, a capability of expanding compressed data is required on the terminal side, as in the above-described data enciphering processing. The communication capability of the communication infrastructure need not be considered because compressed data can be transmitted although it takes a long time. The processing operation at this time is shown in FIG. 13.

Figure 13:
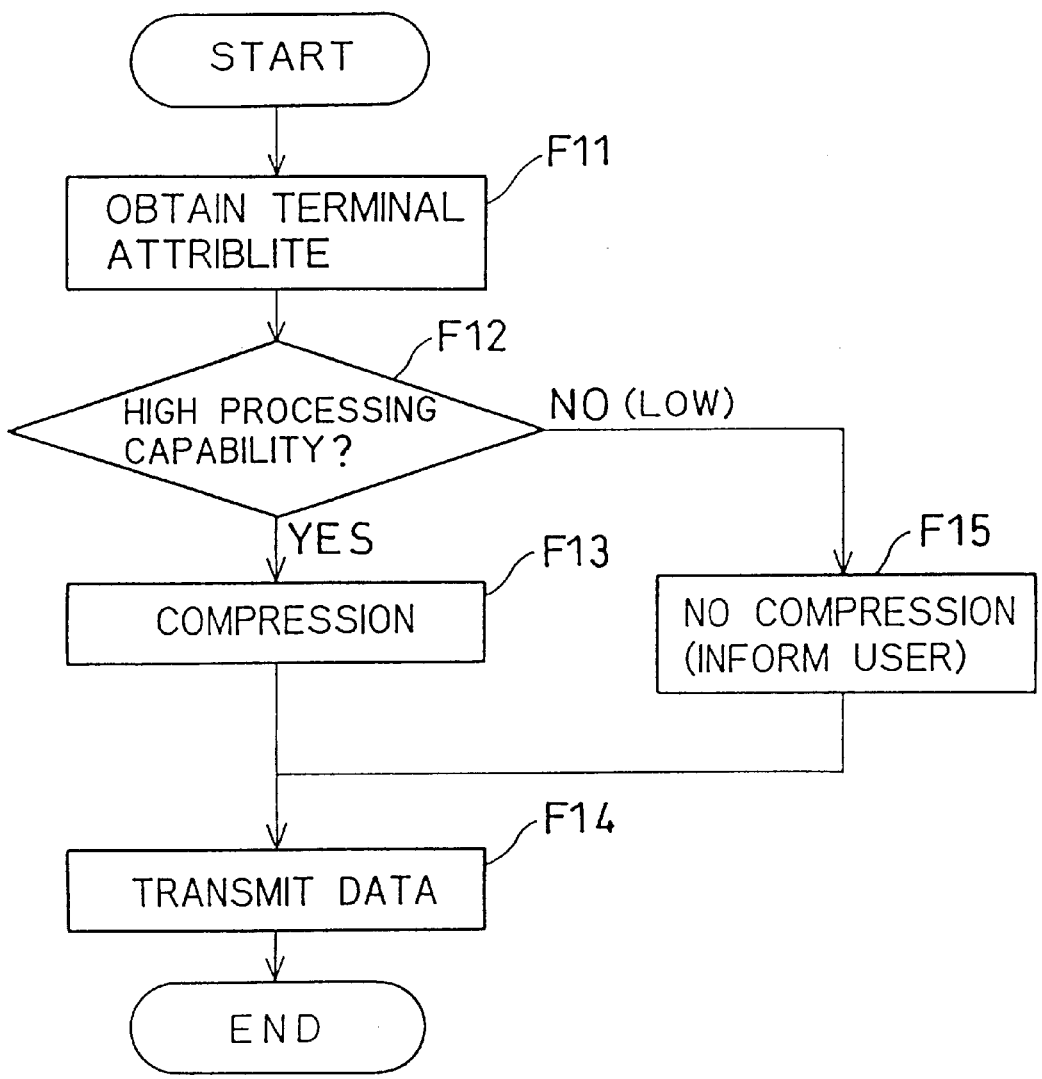
FIG. 13 is a flow chart showing a data compression processing operation.

FIG. 13 is a flow chart showing the data compression processing operation. In providing the application service by the application service section 20, the data exchange unit 10 obtains the attribute data of a terminal as a communication partner from the terminal data management section 12 (step F11), and determines the processing capability of the terminal on the basis of the attribute data (step F12).

If it is determined that the terminal has a high processing capability and a capability of expanding the compressed data (Yes in step F12), the data exchange unit 10 compresses the application service data by the data exchange process section 11 (step F13), and transmits the compressed service data to the terminal (step F14). The terminal expands the compressed data and then uses the service.

If the terminal has a low processing capability and no capability of expanding the compressed data (No in step F12), the data exchange unit 10 directly transmits the application service data (step F14) without compressing the data (step F15). At this time, the user may be informed of a message representing that no compression is performed.

With the data compression function, data transmission can be efficiently performed. In this case, compression can be appropriately performed by determining the type of available data compression on the basis of the terminal attribute.

In the example shown in FIG. 13, it is determined whether data compression is enabled only on the basis of the processing capability of the terminal. However, whether data compression is enabled may be determined on the basis of not only the processing capability of the terminal but also the communication capability of the communication network connected to the terminal.

The level of compression can be appropriately changed in correspondence with the processing capability of the terminal or the communication capability of the communication infrastructure.

Utilization of the application service using an I/O unit will be described next. I/O units mean units other than a computer and correspond to the handy phone 32, the pager 33, the FAX 34, the printer 42, and the image reader 43 in the example shown in FIG. 1.

Figure 14:
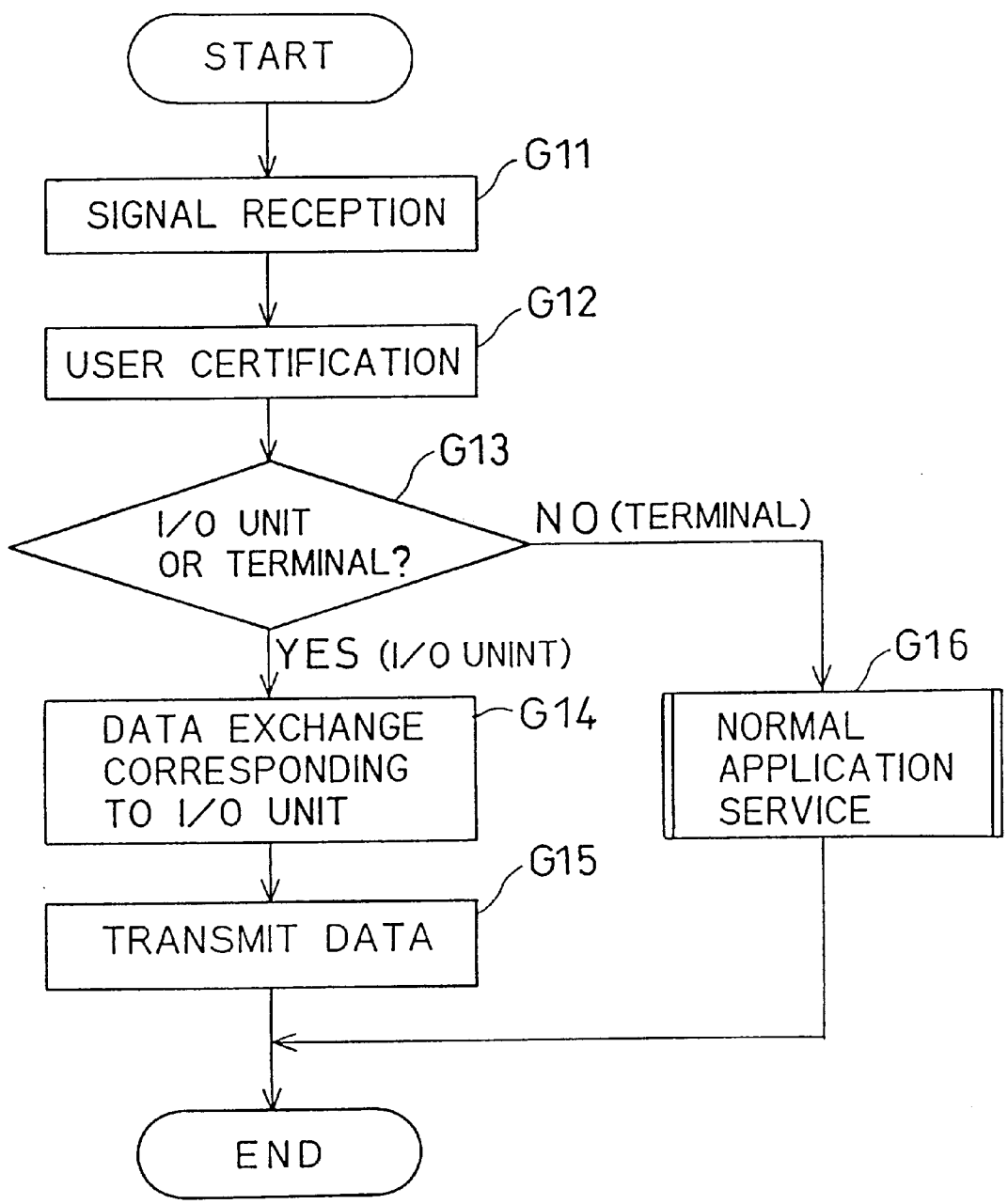
FIG. 14 is a flow chart showing a processing operation in utilization of the application service using an I/O unit.

FIG. 14 is a flow chart showing a processing operation in utilization of the application service using an I/O unit. Upon receiving a signal representing utilization of the application service from the user (step G11), the data exchange unit 10 certifies the user through the user data management section 14 (step G12), and determines the type of unit of the user (step G13).

If the user is using an I/O unit (Yes in step G13), the data exchange unit 10 performs the data exchange process corresponding to the I/O unit (step G14), and transmits the converted service data (step G15).

More specifically, when the I/O unit is the handy phone 32, the data exchange unit 10 converts, e.g., text data into speech data using the speech processing function, and provides the service as a voice message.

For the pager 33, text data is converted into message data corresponding to a predetermined number of characters and transmitted. For the FAX 34, text data is converted into image data and transmitted. In this way, the service is provided within the specific limitation corresponding to each I/O unit.

If the unit of the user is not an I/O unit but a terminal having a CPU capability (No in step G13), the data exchange unit 10 executes a normal application service (step G16). That is, the data exchange unit 10 performs the data exchange process corresponding to the processing capability of each terminal and provides the service.

With the data exchange process corresponding to the I/O unit, even when the user uses a FAX or the like, the application service can be provided in correspondence with the FAX.

The service data from the server can also be subjected to the data exchange process corresponding to both the attribute of the I/O unit and the attribute of the communication infrastructure.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

Hereinafter, the cases, wherein data service as application service by means of a structured language such as HTML (Hyper text markup language) and SGML (Standard generalized mark up language) is described, will be explained. For the reference, HTML is a structured language that is used for WWW (world wide web) that has come to wide use. SGML is a structured language, which is expected to be brought to wide use in future in parallel with the spread of CALS (continuous acquisition and lifecycle support).

Generally speaking, as one of the management methods of document data including multimedia data, a method by means of structured language is contemplated. In this case, each component, which comprising document data such as text data, image data, animation data, program is managed by tag and reading device (browser) is to indicate document data on the screen based on the tag. Accordingly, when the service data described by means of tag language is presented, one can know, what kind of part is provided by documentation data presented as service data, if one analyzes the tag on the side of server.

Therefore, before actually processing the data transmission, the structured document is analyzed based on tag data and the attribute of respective parts such as data size, additional data (data which cannot be indicated by tag data only) will be grasped, and data exchange device will be installed in the server for grasping the type corresponding to the attribute of terminal equipment and communication infrastructure. In this case, the tags for data exchange are inserted into the structured document produced from the data exchange device.

Such being the case, by managing the data by means of structured document, the management of the data becomes easy and also the analysis of the document parts becomes easy at the data exchange operation. If the data exchange system is constructed based on the regulation for the structured language, which is wide spread such as HTML, the change of the system to the wide spread WWW system and its influence can be minimized.

Figure 15:
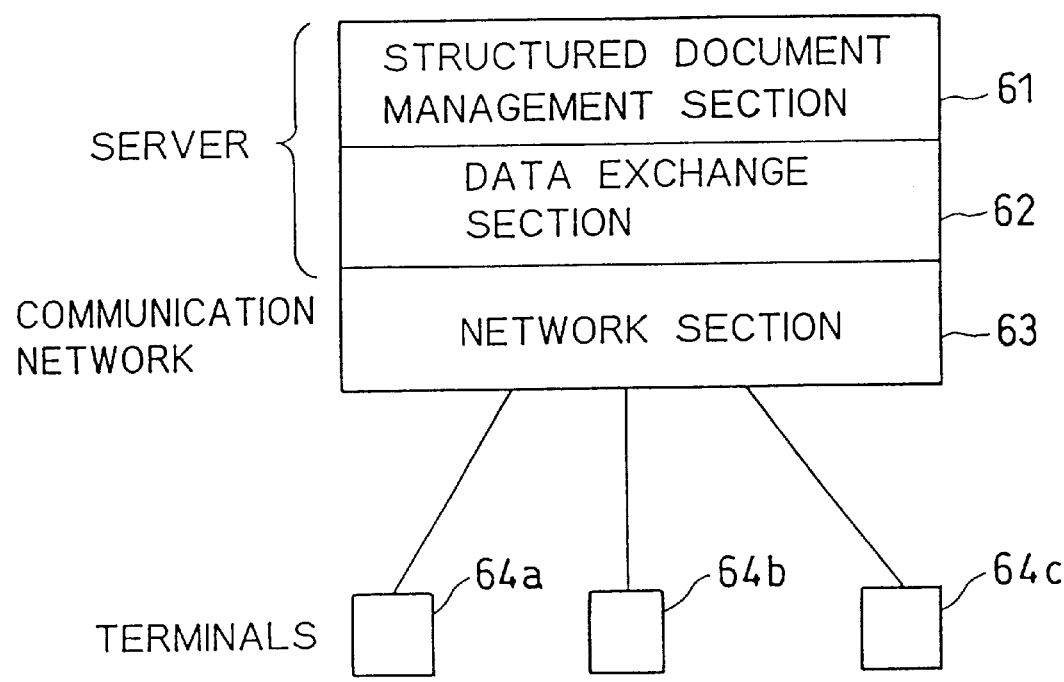
FIG. 15 is a view showing the concept of an entire system including an application service on the assumption of a structured document.
Figure 20:
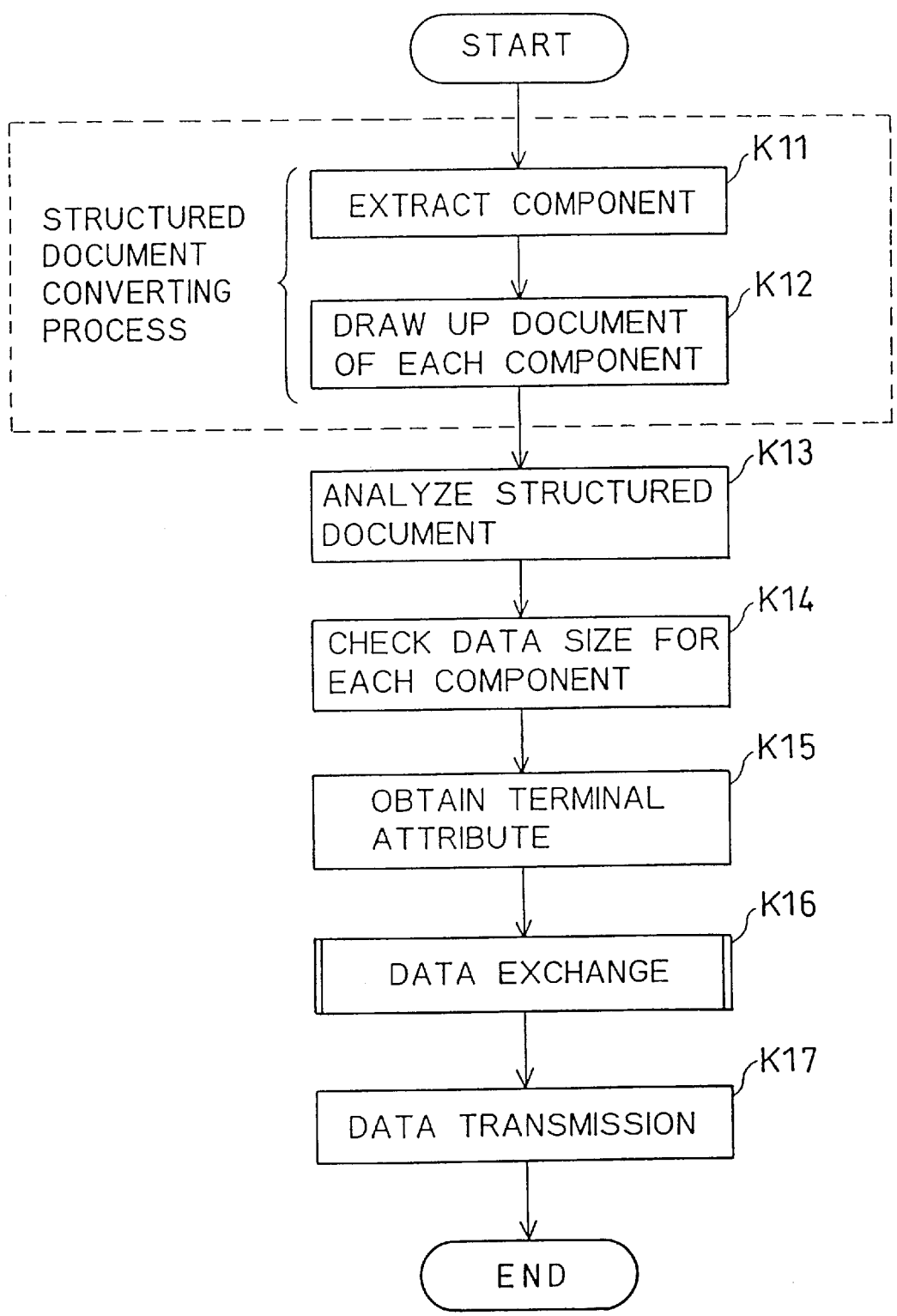
FIG. 20 is a flow chart showing a processing operation for service data other than the structured document format.

FIG. 15 is a view showing the concept of an entire system including an application service on the assumption of a structured document. Referring to FIG. 15, reference numeral 61 denotes a structured document management section for managing service data provided as an application service of various application software in a structured document format. The structured document management section 61 is arranged in an application service section 20 shown in FIG. 1. In this embodiment, the application service section 20 manages service data which has been described in the structured document format in advance. However, the service data may be described in a non structured document format (FIG. 20).

Reference numeral 162 denotes a data exchange section for performing the data exchange process corresponding to a terminal attribute or a communication infrastructure attribute. The data exchange section 162 corresponds to a data exchange unit 10 shown in FIG. 1. Reference numeral 163 denotes a network section corresponding to various communication networks for connecting the server and terminals. The network section 163 corresponds to the public network 30, the wired LAN 40, and the wireless LAN 50 shown in FIG. 1. Reference numerals 64a to 64c denote terminals which receive the service from the server and correspond to, e.g., a PC (Personal Computer), an NC (Network Computer), or a PDA (Personal Digital Assistants). The terminals 64a to 64c are connected to different communication infrastructures and have different processing capabilities. The terminals 64a to 164c correspond to the PDA 31, the PC 41, or the portable PC 51 shown in FIG. 1.

Figure 21:
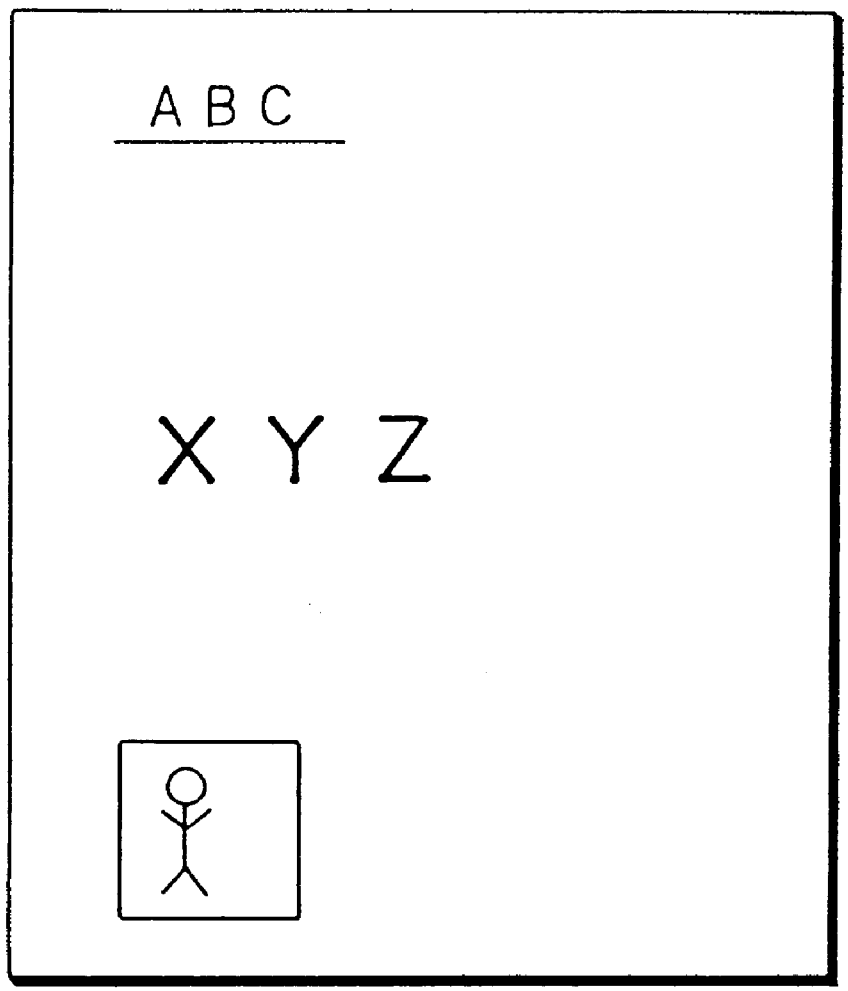
FIG. 21 is a view showing an example an actual display of the structured document shown in FIG. 16.

With this structure, the application services of various application software are managed in the structured document format (e.g., an HTML document) by the structured document management section 61. FIG. 16 shows an example of the structured document for displaying a display as shown in FIG. 21.

Referring to FIG. 16, a tag 66 indicates that text data follows. A tag 67 represents document format data, and in this case, defines centering. A tag 68 represents font data, and in this case, defines a large font. A tag 69 indicates image data (a file name of a file in which image data is stored).

The data exchange section 162 analyzes this structured document and checks the types and data sizes of components constituting the document on the basis of the tag data inserted into the document. In transmitting each component data, the data exchange section 162 checks the processing capability of the terminal or the communication capability of the communication infrastructure and performs the data exchange process in correspondence with the capability.

If it is determined that the data transmission capability of the communication infrastructure is low, the transmission data volume is reduced by performing the data exchange process (or data compression) for a document component in a large data volume. If it is determined on the basis of the terminal attribute that the terminal as a communication partner has no document display capability (for a terminal without any browser), the data is converted into a format that the terminal can be displayed and transmitted.

In the data exchange process, the data is converted such that the document is displayed in correspondence with the user's preference (data exchange process based on user data).

The processing operation will be described next in detail.

An operation performed when service data in the structured document format is managed by the application service section 20 will be described below. An operation performed when the application service section 20 manages service data in the non-structured document format will be described later with reference to FIG. 20. Processing corresponding to the terminal attribute will be described first.

Figure 17:
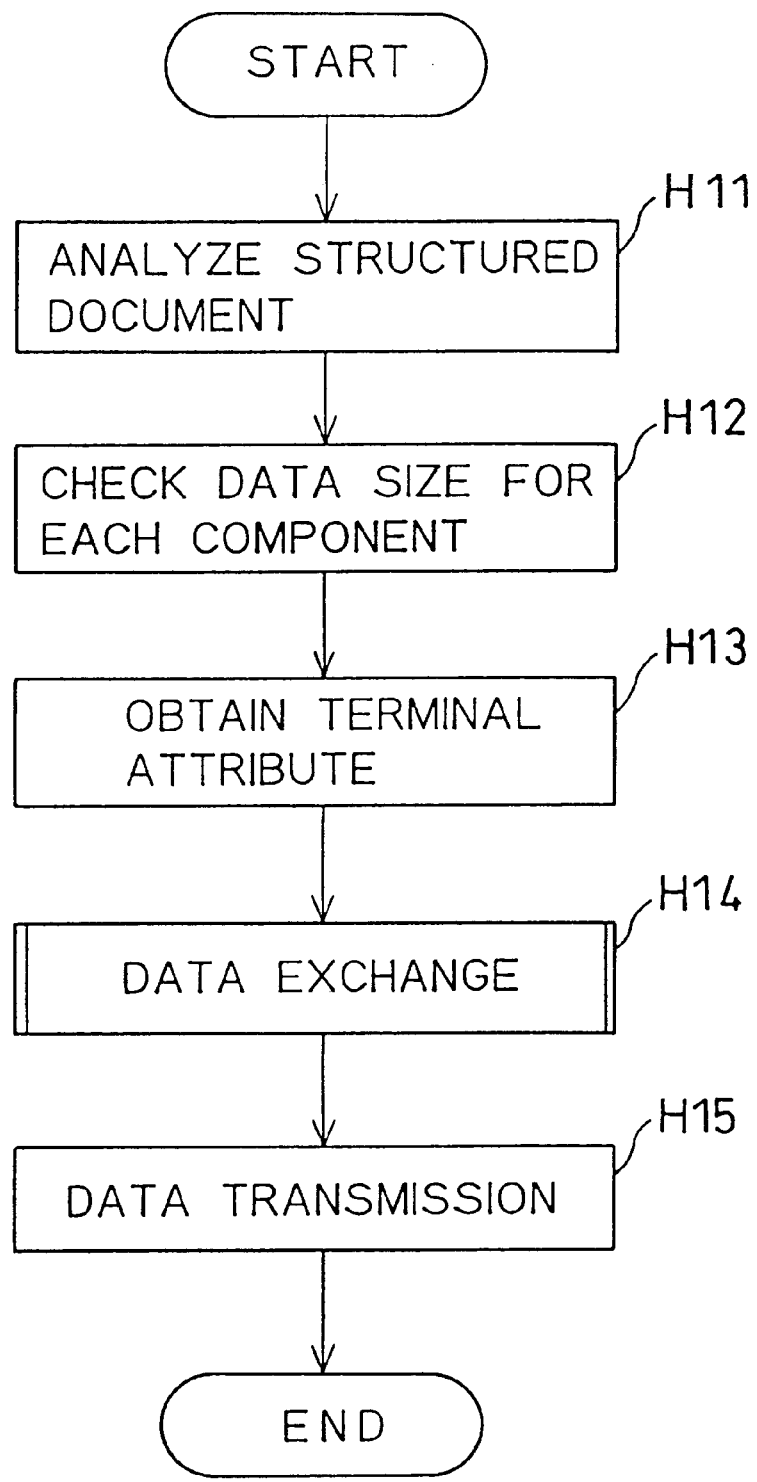
FIG. 17 is a flow chart showing a processing operation corresponding to a terminal attribute in use of the structured document.

FIG. 17 is a flow chart showing a processing operation corresponding to a terminal attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step H11). In this case, each component of the structured document is defined by a syntax represented by tag data. The data exchange unit 10 checks the types and data sizes of the components constituting the document on the basis of the tag data (step H12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the terminal as the communication partner from a terminal data management section 12 and checks the processing capability (step H13). If it is determined that the terminal has a low processing capability and no capability of displaying the structured document, the data exchange unit 10 converts each component data of the structured document into a format that the terminal can display (step H14).

More specifically, for a terminal having a low image control function (terminal without any browser function), image data and, more particularly, moving image data provided as the service data is converted into symbol data (image data which is simplified by some technique) and sent. Document format data is converted into a blank character or a line feed code. A character type is neglected because the terminal cannot handle it. A program such as "Java" or "ActiveX" running on the client (terminal) side is neglected because the terminal cannot handle it. At this time, the user is informed of a message representing that the program cannot be handled.

In this manner, the data exchange process corresponding to the processing capability of the terminal is performed. The data exchange unit 10 transmits the converted service data through a communication network connected to the terminal (step H15). With this processing, even when a terminal without the capability of displaying the structured document is used, the service data can be converted into a format suitable for the terminal and provided.

Processing corresponding to the communication infrastructure attribute will be described below. For the data exchange process corresponding to the communication infrastructure attribute, only the data size of each component is important.

Figure 18:
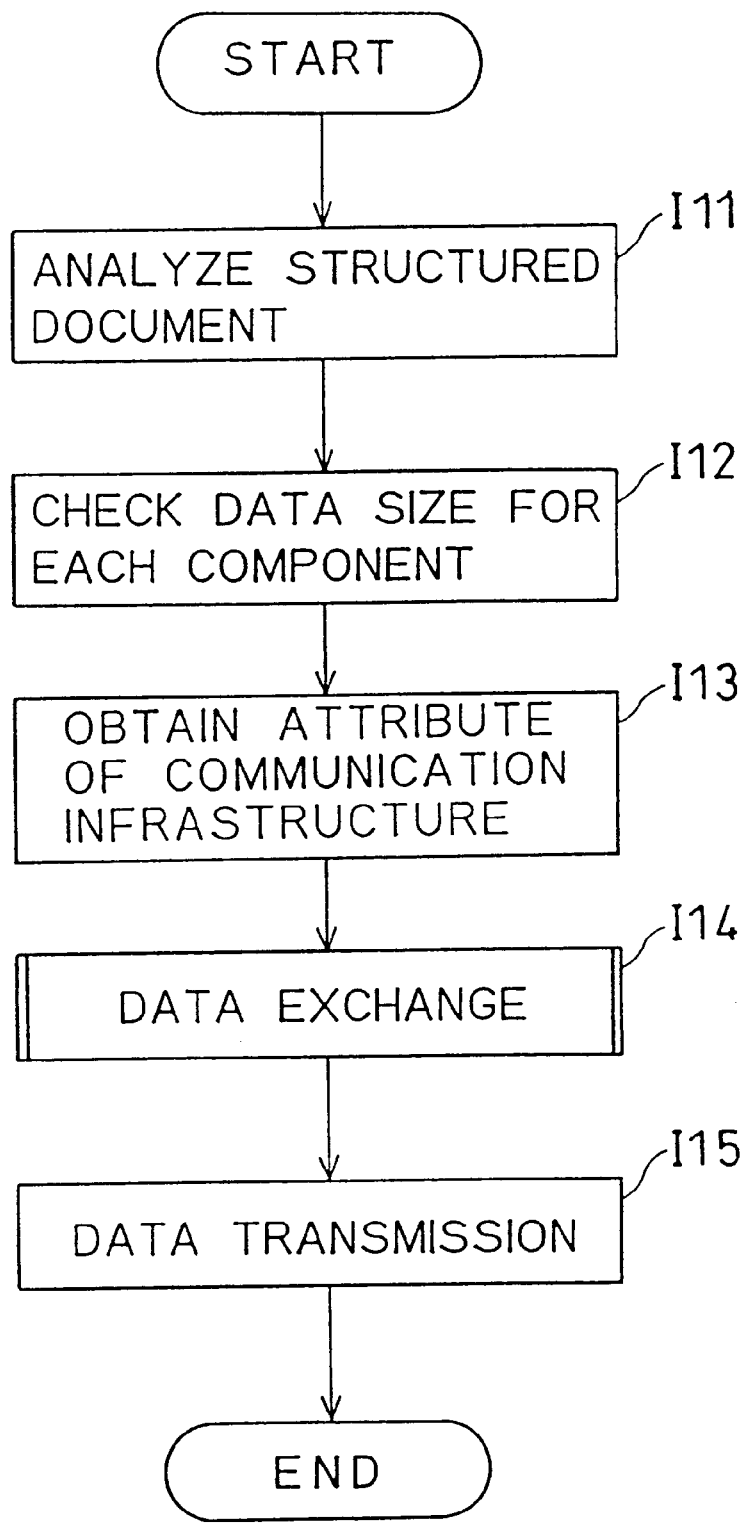
FIG. 18 is a flow chart showing a processing operation corresponding to a communication infrastructure attribute in use of the structured document.

FIG. 18 is a flow chart showing a processing operation corresponding to a communication infrastructure attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step I11). In this case, each component of the structured document is defined by a syntax represented by tag data. The data exchange unit 10 checks the types and data sizes of the components constituting the document on the basis of the tag data (step I12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the communication infrastructure connected to the terminal as the communication partner from a communication infrastructure data management section 15 and checks the communication capability (step I13). If it is determined that the communication infrastructure has a low data transmission capability, the data exchange unit 10 converts each component data of the structured document into a format corresponding to the data transmission capability of the communication infrastructure (step I14).

More specifically, for a communication infrastructure such as a PHS (Personal Handy phone System) data communication network having a low data transmission capability, image data and, more particularly, moving image data provided as the service data is converted to reduce the data volume by time-lapse reproduction or the like and sent.

In this manner, the data exchange process corresponding to the data transmission capability of the communication infrastructure is performed. The data exchange unit 10 transmits the converted service data through the communication network connected to the terminal (step I15). With this processing, even when a communication infrastructure with a low data transmission capability is used, the service data can be converted into a format suitable for the communication infrastructure and provided. Processing corresponding to the terminal attribute and the communication infrastructure attribute will be described next.

Figure 19:
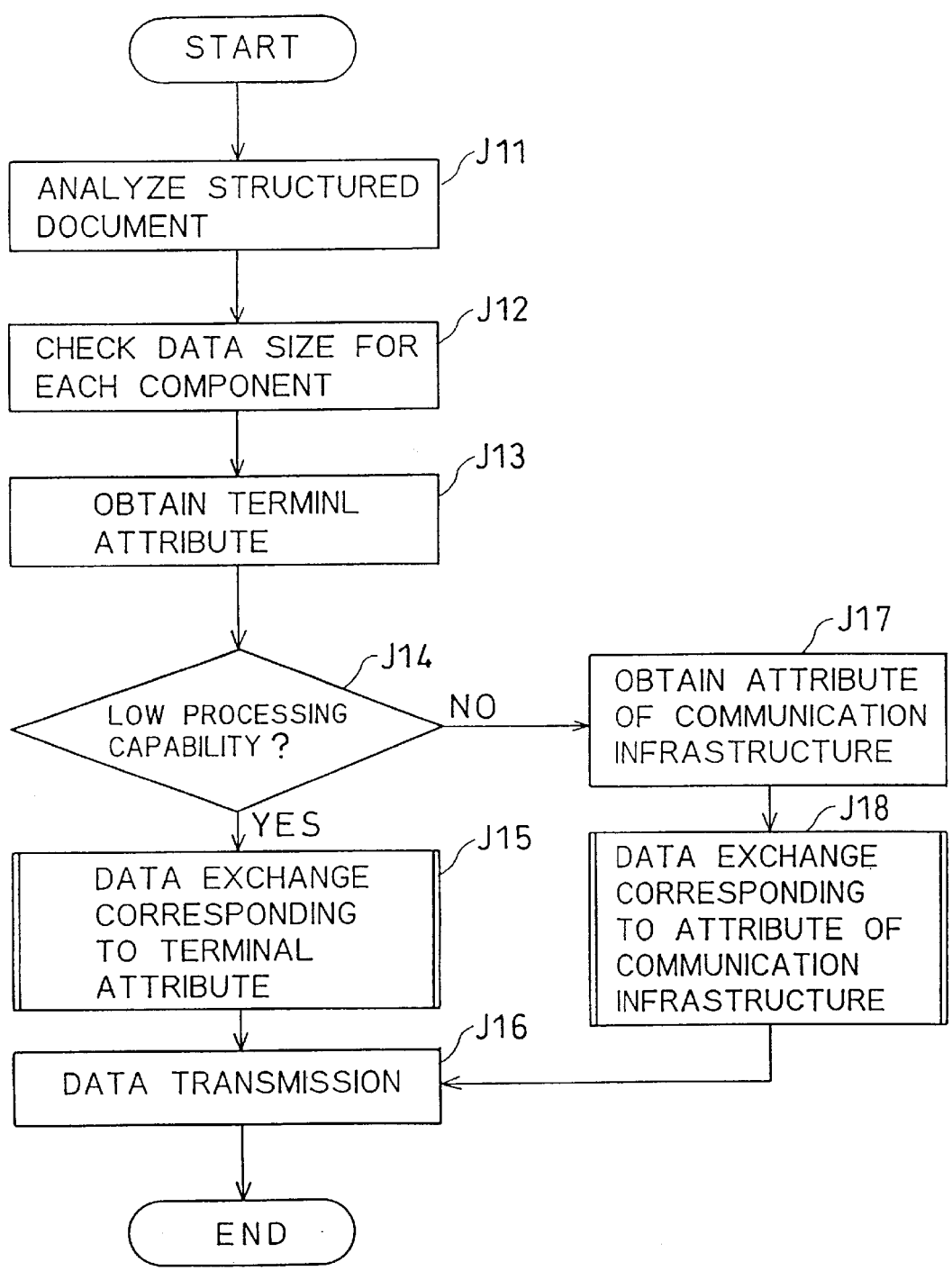
FIG. 19 is a flow chart showing a processing operation corresponding to the terminal attribute and the communication infrastructure attribute in use of the structured document.

FIG. 19 is a flow chart showing a processing operation corresponding to the terminal attribute and the communication infrastructure attribute in use of the structured document. In FIG. 1, the application service section 20 in the server 1 manages service data described in a structured document format. When a document request instruction (service request instruction) is output from a terminal to the server 1, the service data described in the structured document format is transferred from the application service section 20 to the data exchange unit 10. The data exchange unit 10 executes the data exchange process to be described below.

The data exchange unit 10 analyzes the structured document constituting the service data (step J11). In this case, each component of the structured document is defined by a syntax represented by tag data. The data exchange unit 10 checks the types and data sizes of the components constituting the document on the basis of the tag data (step J12). More specifically, the quantity and place of image data or a program are checked.

A series of processing operations including analysis, retrieval, extraction, and data exchange (to be described later) of each component in document analysis are performed by the data exchange executing section 113 (FIG. 2) in the data exchange process section 11.

After analysis of the structured document, the data exchange unit 10 obtains the attribute data of the terminal as the communication partner from the terminal data management section 12 and checks the processing capability (step J13). If it is determined that the terminal has a low processing capability and no capability of displaying the structured document (Yes in step J14), the data exchange unit 10 converts each component data of the structured document into a format that the terminal can display (step J15) and transmits the converted service data through the communication network connected to the terminal (step J16).

If it is determined that the terminal has a high processing capability and the capability of displaying the structured document (No in step J14), the data exchange unit 10 obtains the attribute data of the communication infrastructure connected to the terminal as the communication partner from the communication infrastructure data management section 15 (step J17). The data exchange unit 10 performs the data exchange process corresponding to the communication capability of the communication infrastructure on the basis of the attribute data (step J18) and transmits the converted service data through the communication network connected to the terminal (step J16).

As described above, even when service data described in the structured document format is to be provided, the service can be converted in correspondence with the terminal attribute or communication infrastructure attribute, so that the service can be provided in correspondence with the processing capability of the terminal or the communication capability of the communication infrastructure.

Instead of referring to the terminal attribute or communication infrastructure attribute, a user interface data management section 13 shown in FIG. 1 can be used to perform the data exchange process based on user interface data representing the operation method unique to the terminal. Alternatively, a user data management section 14 can be used to perform the data exchange process based on user data representing the operation method unique to the user.

Furthermore, data enciphering or data compression can be performed. When an I/O unit such as a FAX is used, the data exchange process corresponding to the I/O unit can be performed. That is, all of the above-described methods can be applied to provide service data described in the structured document format.

In the above description, service data which has been described in the structured document in advance is provided. The present invention is not limited to this. This technique can also be applied to service data described in a format (binary data) different from the structured document format. The processing operation at this time is shown in FIG. 20.

FIG. 20 is a flow chart showing a processing operation for service data other than the structured document format. A data exchange process corresponding to the terminal attribute will be described below. This description also applies to the data exchange process based on the communication infrastructure attribute, user interface data, or user data.

This processing is different from that in FIG. 17 in that structured document converting process in steps K11 and K12 is added. In this processing, data in, e.g., a binary format is converted into a structured document format such as HTML. This structured document converting process is also performed by the data exchange executing section 113 (FIG. 2) in the data exchange process section 11. In this case, the application service section 20 in the server 1 shown in FIG. 1 manages service data described in a non-structured document format, and this service data is converted into a structured document format.

When a document request instruction (service request instruction) is output from a terminal to the server 1, the service data described in the format different from the structured document format is transferred from the application service section 20 to the data exchange unit 10. The data exchange unit 10 executes the data exchange process to be described below.

The data exchange unit 10 extracts components constituting the service data (step K11). For binary document data, the text, font, format, and other attributes (e.g., date and writer name) are managed with tokens. Therefore, each component can be extracted by checking the token. After extraction of the components, the data exchange unit 10 prepares a structured document in which the components are expressed in a structuring language such as HTML (step K12).

Figure 23:
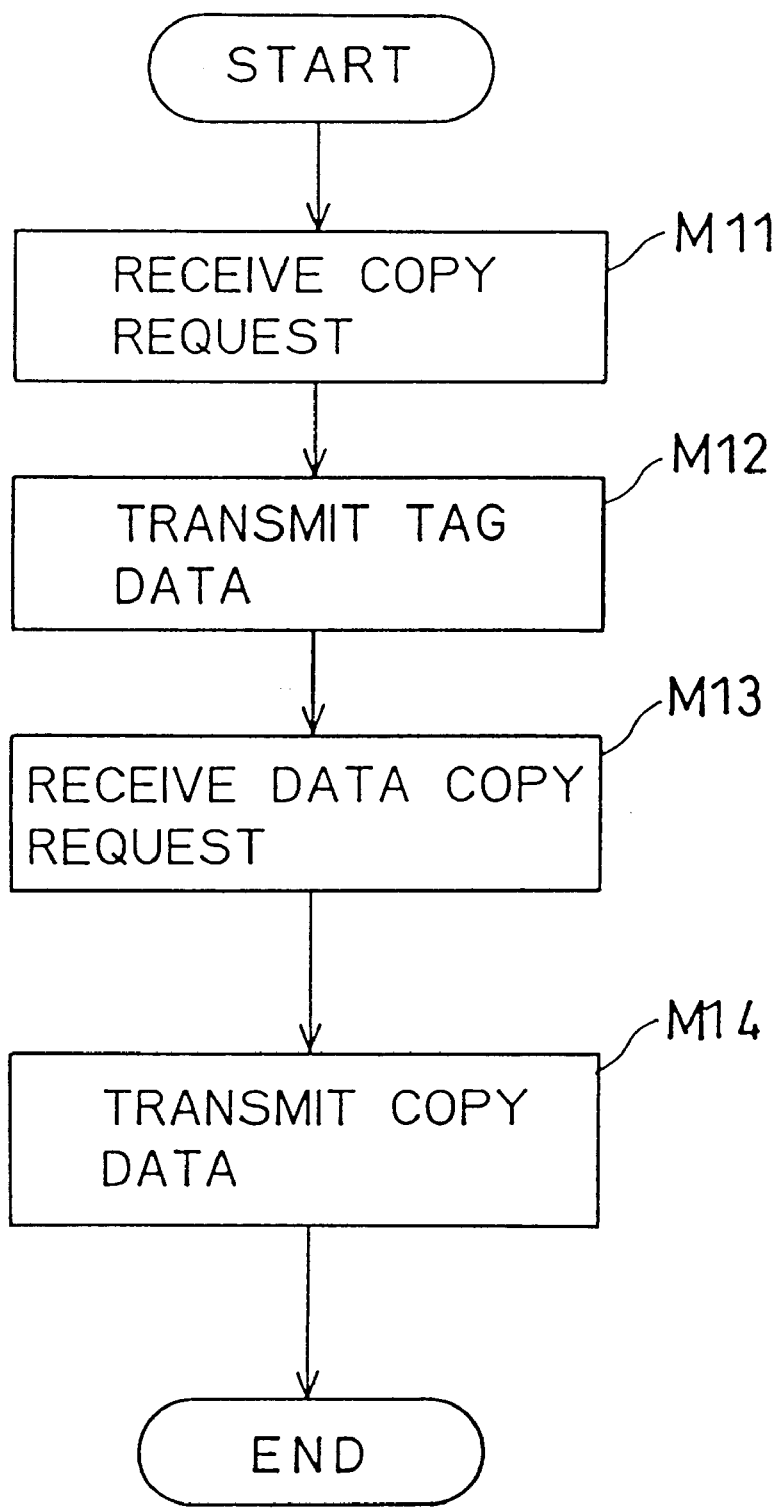
FIG. 23 is a flowchart showing a process of requesting for and receiving a copy of data.
Figure 24:
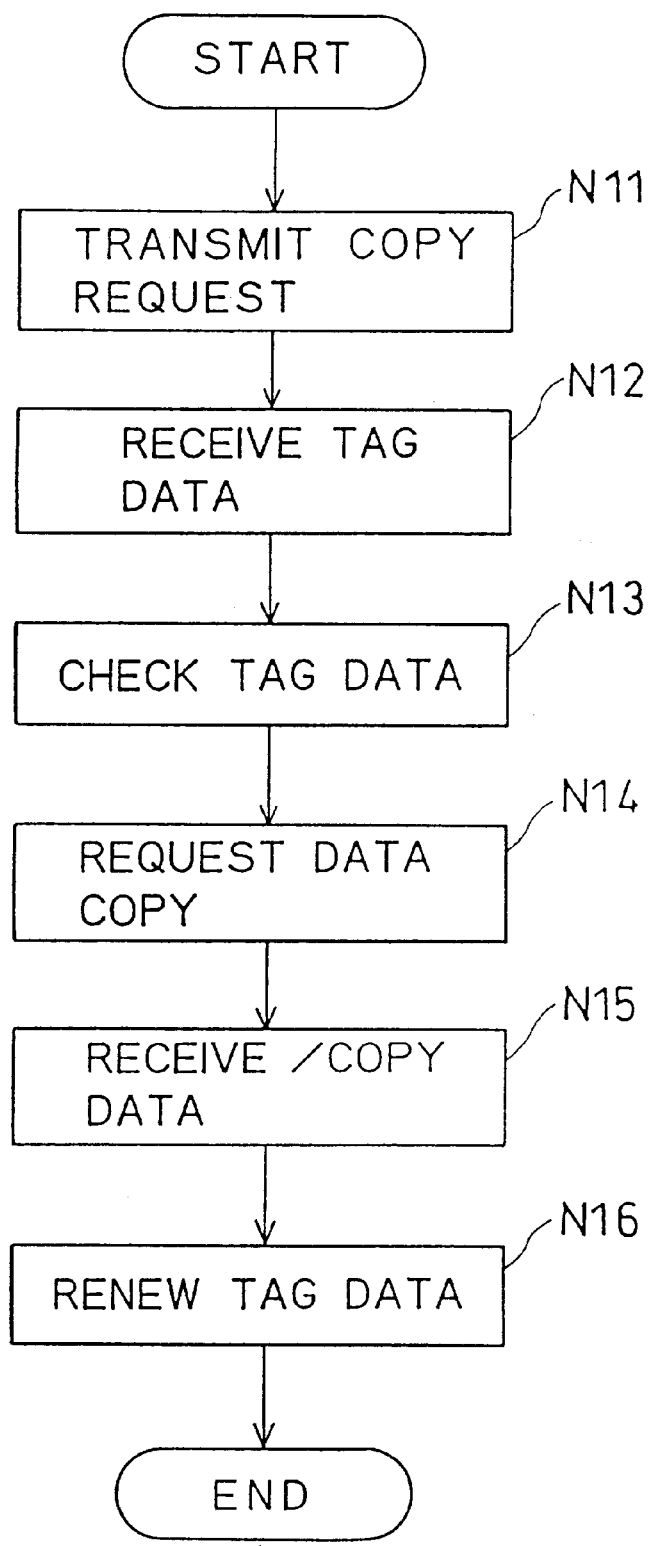
FIG. 24 is a flowchart showing a process for data copying on terminal equipment.

After preparation of the structured document, the structured document is subjected to processing described in FIG. 23. The data exchange unit 10 analyzes the structured document (step K13) and checks the types and data sizes of the components constituting the document (step K14). The data exchange unit 10 obtains the attribute data of the terminal as the communication partner from the terminal data management section 12 (step K15) and converts each component data on the basis of the attribute data (step K16). The data exchange unit 10 transmits the converted service data through the communication network connected to the terminal (step K17).

As described above, even the service data described in the non-structured document format can be converted into the structured document format, and the same effect as described above can be obtained. In the meantime, FIG. 21 shows the result outputted by the above data exchange device corresponding to the structured document shown in FIG. 16.

In the above description, a structured document such as HTML has been exemplified. However, the present invention can be applied to any document constituted by component data, including OLE (Object Linking and Embedding).

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation controlled by the program, thereby executing the above described processing.

Hereinafter, the case that the data transmission process such as document data which are stored by means of the structured language in the server 1 are redacted such as correction, deletion and addition and are transmitted by a circuit of the low data transmitting capacity to the terminal, will be explained.

Here, it is assumed that the above mentioned data, which are not yet redacted, are copied and stored in a large volume on the side of terminal, while the terminal is connected to a high-speed LAN in the office where the server is installed. Furthermore, the document data/user data, which are stored in the server, are redacted such as correction, deletion and addition, a data change management section 1102 is arranged so that version-tag data as the information of the version-up to indicate that the data was redacted, are automatically inserted and/or renewed.

Figure 22:
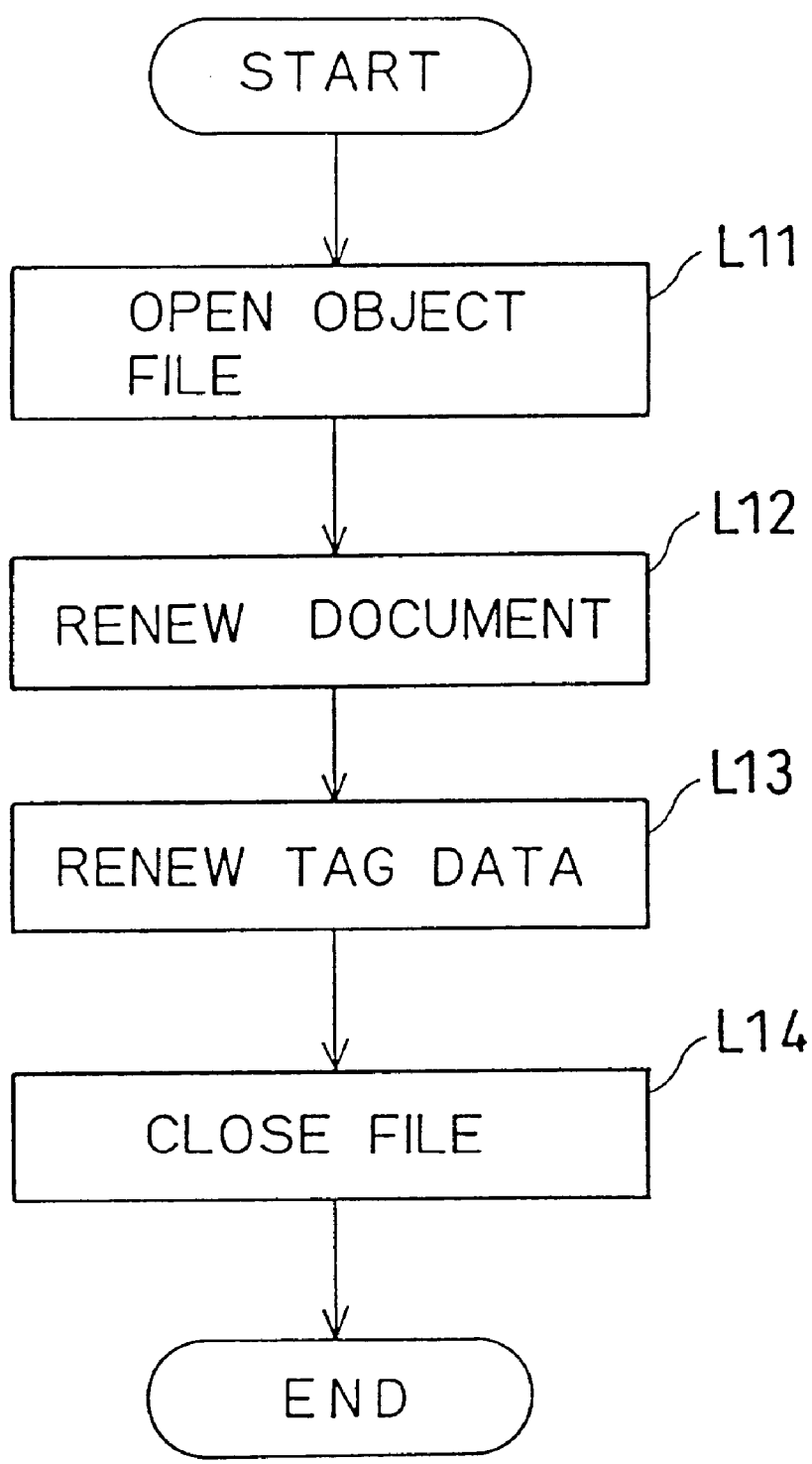
FIG. 22 is a flowchart showing a data renewal processing operation on server.

Then, the redacting process such as correction, deletion and addition of the document data/user data stored by means of the structured language will be explained according to FIG. 22 showing the flow of data changing on the server 1.

The user opens the file to be renewed which is stored in the server 1 (Step L11). When the desired file is opened, the user executes the redacting work such a as correction, deletion and addition and renews the document data and image data etc. (Step L12). When the renewal is finished, a data change management section 1102 renews or adds version tag-data automatically to every revised portion as the information of the version-up/renewal (Step L13). When the renewal is finished, the opened file is closed and the file is stored in the specified memory position (Step L14). Meantime, for the tag for the common document, additional data can be added for the respective users at the user data management section 14.

The renewal of document data as renewed in the above will be explained by referring to FIG. 23 as an example showing the flow of data coping on the terminal (flowchart mainly showing the movements on the side of the terminal).

When a transmission of data copy of the specified file is requested from the side of terminal (Step N11), the server accepts this request (Step M11) and opens the specified file. Then, when the file is opened, the tag data including the portions of correction, deletion and addition are transmitted from the server 1 to the side of the terminal (step M12).

On the side of the terminal, tag data is received (Step N12) and the difference between the server 1 data and the terminal data is verified (step N13) and the request for just the difference, i.e., the request for the data copy for the portions of the version tag data which were renewed is returned to the server 1 (step N14).

The server 1 accepts the returned request (Step M13) and transmits the necessary portion to the terminal (Step M14). In this case the data may be returned after the data exchange or data compression is made. The terminal receives the data sent by the server 1 and renews the portion in question (Step N15) and renews the version tag data (Step N16). Thus it becomes possible to copy just the necessary portion (data of different version only) rapidly and with high accuracy.

The above mentioned method as described in the form of an embodiment can be applied for various equipment as a program that can be carried out by a computer, while the method is written in a memory module such as magnetic disks (floppy disks, hard disks, etc.), opto-electronic disks (CD-ROMs, DVDs etc.), semiconductor memories as well as can be transmitted through communication line and can be applied to various equipment. To realize this process, the computer (server 1) executes the above mentioned process, while reading in the program stored in a memory module and having the operation controlled by the program.

Figure 25:
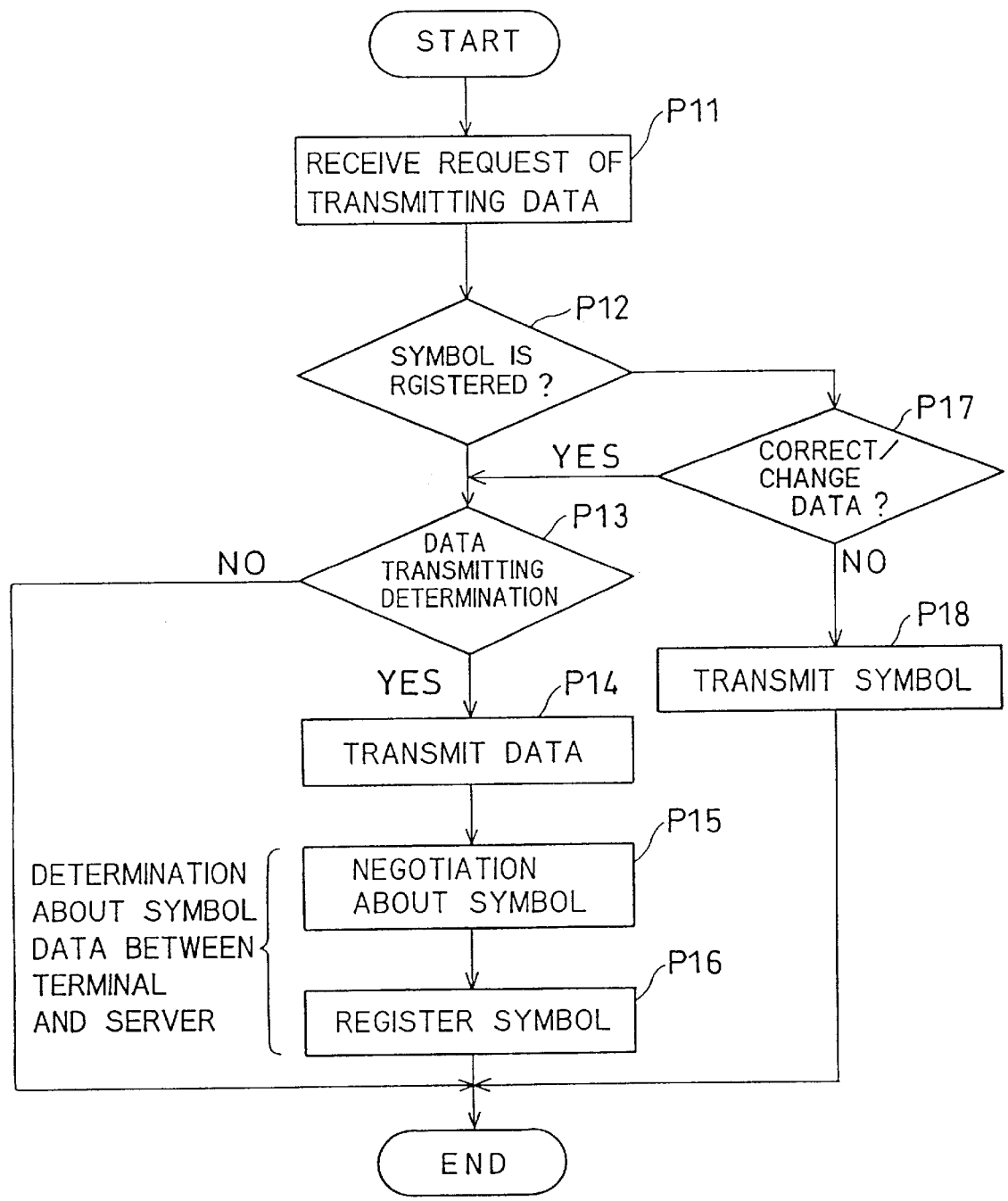
FIG. 25 is a flowchart showing a process for transmitting a symbol data.

Then, the data transmission processing of the data of relatively large size such as animation data, static pictures, or speech data, multimedia data etc. which have never been transmitted in the past but will be retransmitted in future (for example, icon, speech message) will be explained by referring to FIG. 25. It is so arranged that the above-mentioned large data are allocated with symbol data of a small size (executed by the data exchange execution section 113), the said symbol data are transmitted from the server 1 from now on and the original data, which corresponds to the said symbol data, are indicated on the side of terminal equipment, when the symbol data are received.

When the server 1 receives the request for a document data, which involves multimedia data, from the side of the terminal of a low processing capacity (Step P11), the server opens the desired file and determines whether or not the symbol corresponding to the multimedia data is registered (Step P12).

In case that the symbol is not registered (None at Step P12), a check is made as to whether data transmission is necessary or not (Step P13). When the data transmission is not performed (No at Step 13), the process is ended.

On the other hand, when the data transmission is performed (Yes at Step P13), the data transmission including the version tag data mentioned in the above is executed and at the same time, the symbol negotiation (allocation of symbol) is made at the server 1 and the terminal side (Step P15), and the registration of the symbol is made (Step P16). This process is made at the intra server user data management section 114.

Also, when the symbol corresponding to the multimedia is registered at the above Step P12 (Yes at Step P12), the verification of the correction and change is performed (Step P17). In case that there is any correction or change of the data (Yen at Step P17), the process is forwarded to Step P13. In the meantime, when there is no correction or change in data (No at Step P17), the symbol data corresponding to the multimedia is transmitted (Step P18).

As mentioned above, by utilizing this data transmission process that the data are copied in a large volume in the office through a high-speed LAN and the difference only is automatically copied thereafter out of the office, the time for data transmission can be shorten, the communication charge can be reduced and the data can be transmitted without fail.

Figure 26:
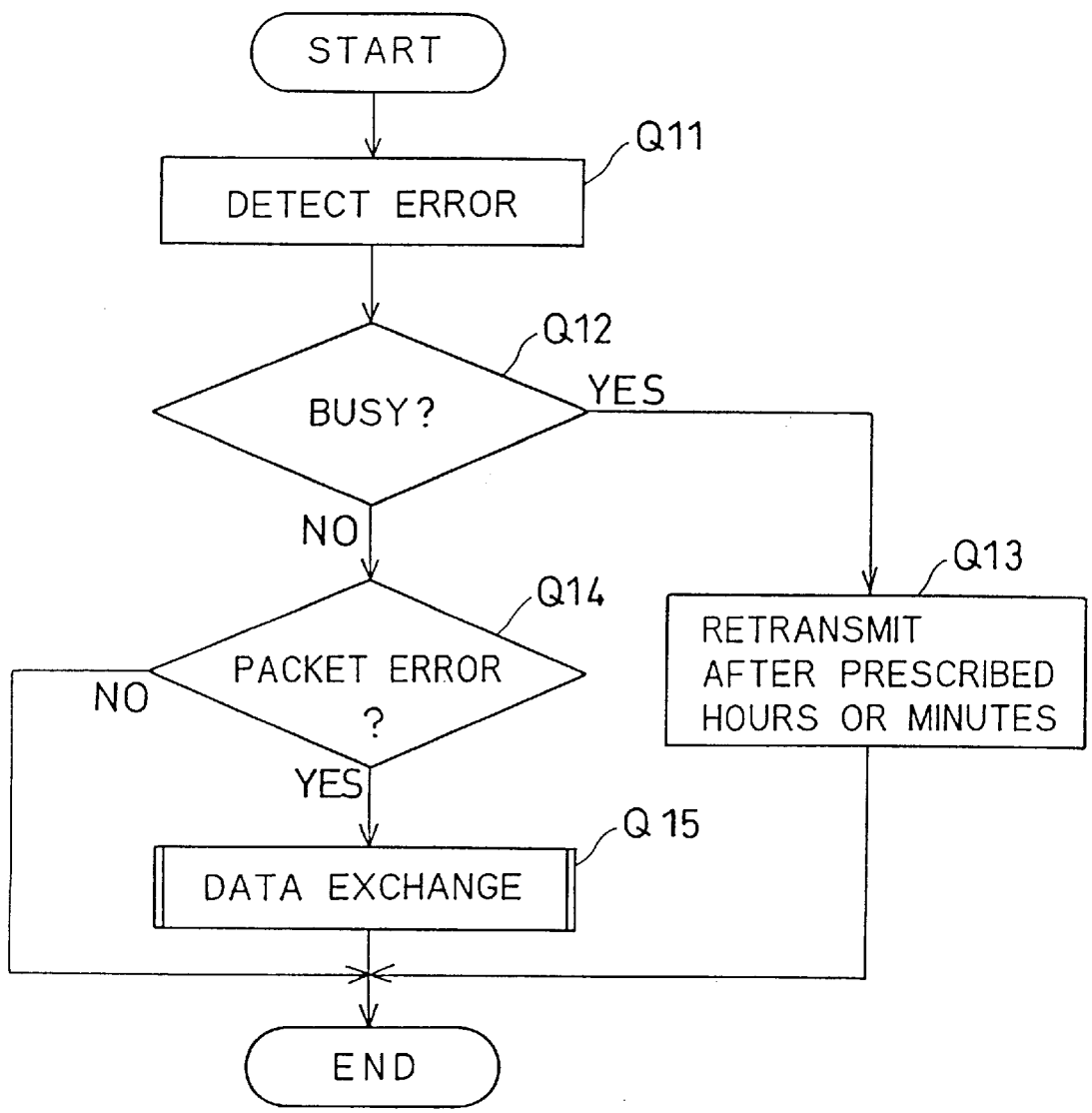
FIG. 26 is a flowchart showing a process for data re-transmitting of a data.

The retransmission process in the case that circuit error takes place as in the case that the circuit error is caused by the packet collision on the circuit of wired LAN, or the case that the terminal of the receiver is busy or the case that the current source of the terminal of the receiver is cut off, though the data was transmitted, will be explained by referring to FIG. 26. Thereby, the circuit error becomes clear through the operation software/communication control software.

When the error of the data transmission is detected at the retransmission/disconnection treatment management section 153 (Step Q11), the information of said error is transmitted to the retransmission control section 1103 and a determination is made as to how the circuit error has been derived, that is, whether the the terminal of the receiver is busy or whether the current source of the terminal of the receiver is cut off (Step Q12).

In the case of the circuit error, that the terminal of the receiver is busy or that the current source of the terminal of the receiver is cut off (Yes at Step Q12), the data retransmission is performed after a certain time specified at the retransmission/disconnection treatment management section 153 (Step Q13). And then, the data transmission is performed without fail, the data retransmission process is performed repeatedly after the specified time interval. Here, the specified time interval may be arranged so as to be set voluntarily.

On the other hand, in the case of the circuit error, neither that the terminal of the receiver is busy nor that the current source of the terminal of the receiver is cut off (No at Step Q12), a determination that there is error in the communication network of the low transmission capacity, that may cause many packet errors (Step Q14).

In the case that is not error as mentioned in the above (No at Step Q14), the process is ended without executing retransmission. In such a case, it is better to arrange that a message informing of the transmission error will be sent to the terminal later on. In the meantime, in the case of error due to the packet failure (Yes at Step Q14), the data is retransmitted, while the data size is compressed by data exchange (reworking)/data compression under the control of a data exchange execution section 113 and/or a compression/enciphering processing section 115 (Step Q15).

Thus, as the data size is reduced, the time required for transmission can be shorten and the data transmission is performed without fail and efficiently. Meantime, data exchange/retransmission timing is controlled just before the transmission by considering the communication network according to the network information from the above OS/communication control software.

The above mentioned method as described in the form of an embodiment can be applied for various equipment as a program that can be carried out by a computer, while the method is written in a memory module such as magnetic disks (floppy disks, hard disks, etc.), opto-electronic disks (CD-ROMs, DVDs etc.), semiconductor memories as well as can be transmitted through communication line and can be applied to various equipment. To realize this process, the computer (server 1) executes the above mentioned process, while reading in the program stored in a memory module and having the operation controlled by the program.

Then, the transmission control of the data of high priority such as an urgent information in the system as described in the above will be explained, by taking the case of electric mail system as an example by referring to FIG. 27 and FIG. 28.

Figure 27:
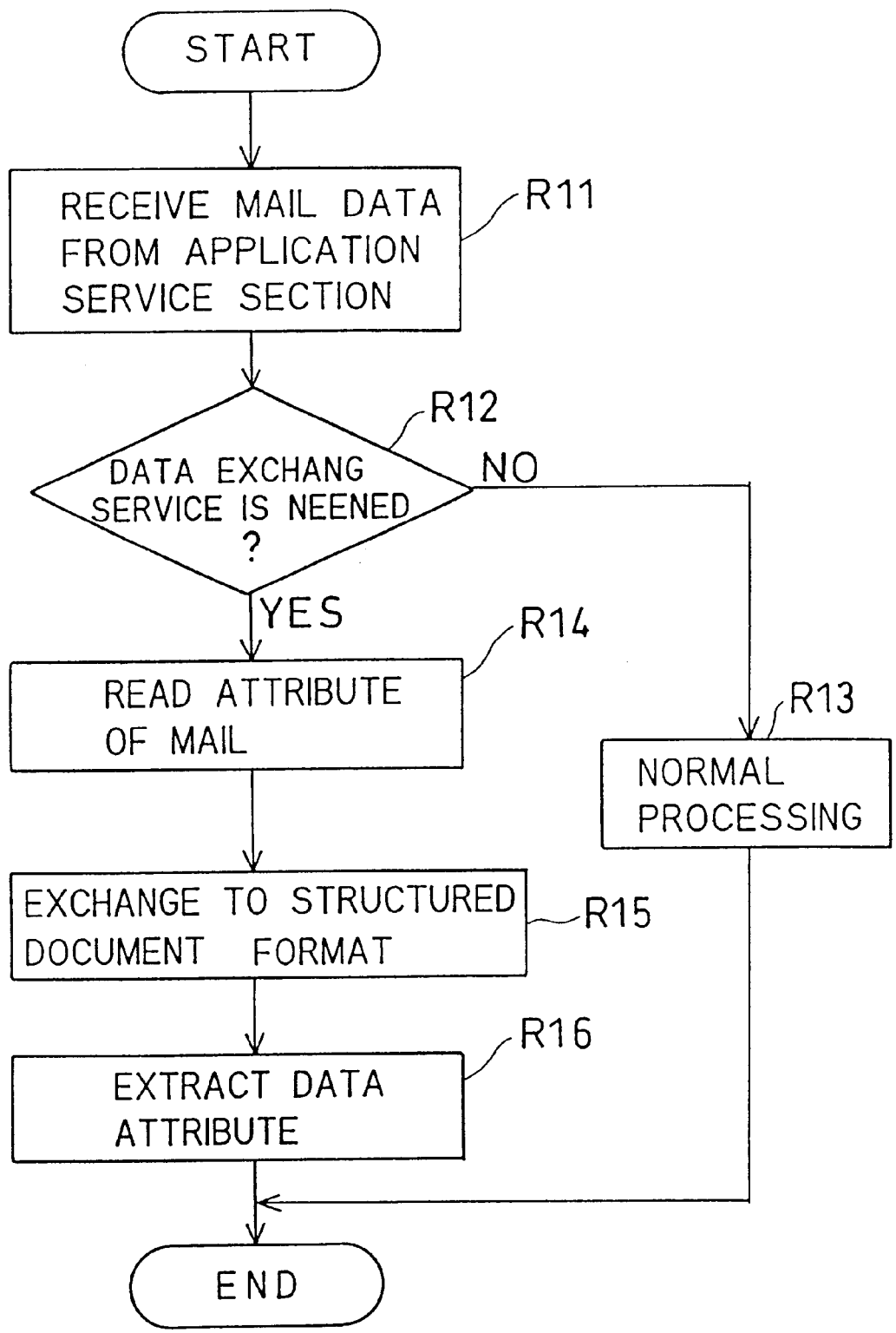
FIG. 27 is a flowchart showing a process for extracting attribute data of received mail.
Figure 28:
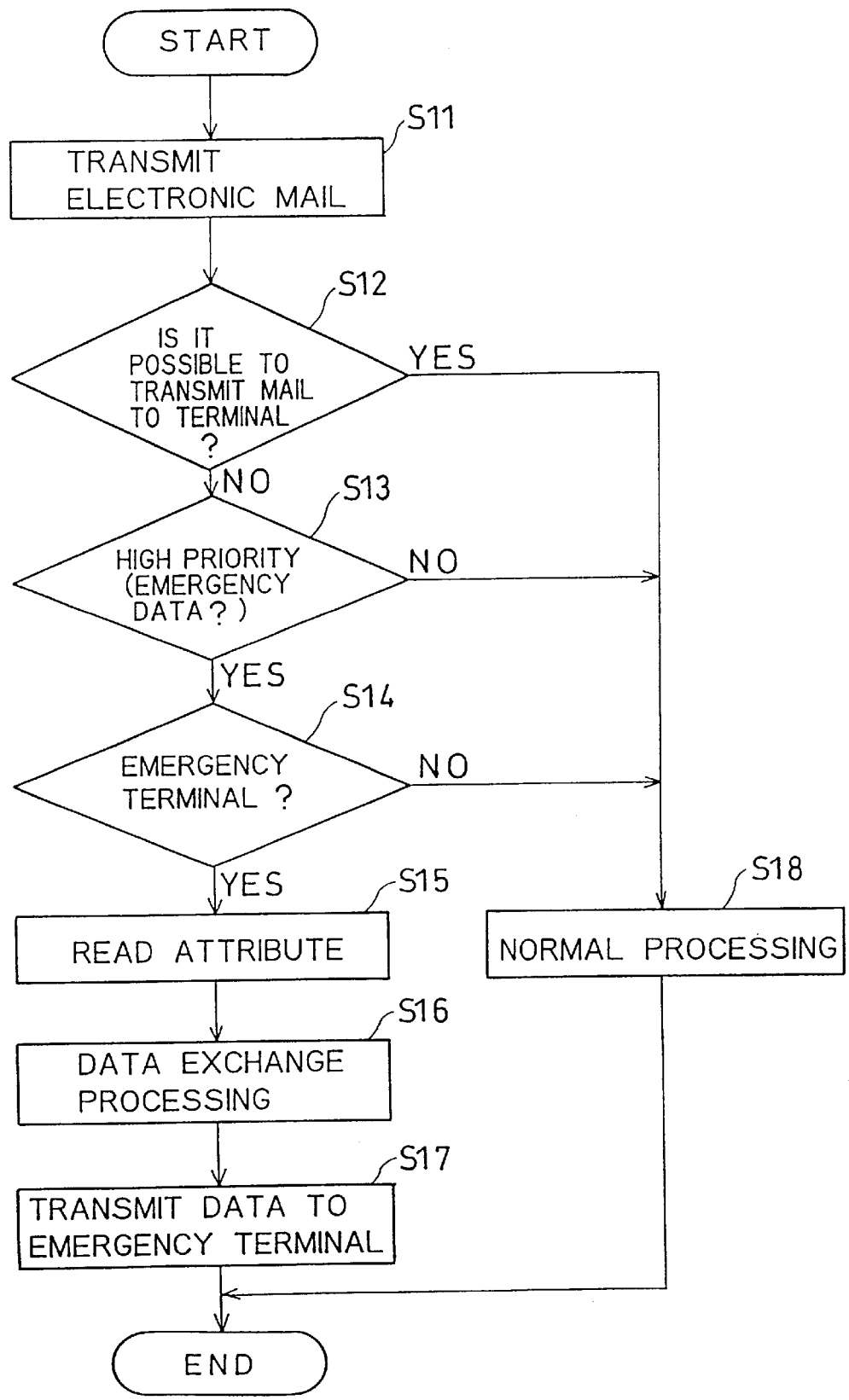
FIG. 28 is a flowchart showing a process for exchanging data with a portable personal telephone.

FIG. 27 is a drawing showing the flow of mail data produced by electronic mail system to the structured document, the data exchange unit receives the urgent information by the said operation. Furthermore, FIG. 28 is a drawing showing the flow of the transmission of the urgent message, which was obtained through the above operation.

The data exchange unit 10 receives the mail data, which was prepared and sent by the electronic mail system as an application service (Step R11) Then, it is determined, whether data exchange service is necessary for the mail data or not (Step R12). Here, the case in which the data exchange operation is not required, corresponds to the case that the server provided with a data exchange device performs merely the transmission operation of the electronic mail. When it is determined that the data exchange operation is not utilized (No at Step R12), a normal electronic mail processing is performed (Step R13).

On the other hand, in the case that the data exchange operation is performed, the attribute of the received electronic mail is read out, that is, the attitude is judged (Step R14). The attribute of the electronic mail is specifically as follows:

date of the electronic mail,
name of the writer,
position of the writer,
subject,
the attribute of the text of the electronic mail, which was sent such as text data, multimedia data etc.,
priority rate (Rate of urgency, etc.

These data are stored in the work file of the intra server user data management section 114 and are different from the mail text. And then, when the sender of the electronic mail wants to communicate with the receiver urgently, the data showing the priority rate is separated from the other attribute by this process. Furthermore, the data exchange unit 10 converts the respective parts to the form of structured document (Step R15), Then, with which priority rate the accepted electronic mail was transmitted actually, as the verification of the data attribute, is grasped by the priority management section 1104 (Step R16). In this case, not only the case that the priority rate is specified in the envelope of electronic mail, but also the case that word-data such as urgent is put on in front of the subject, are handled as the one of high priority. By executing the processes in the above, the data exchange unit 10 can control the electronic mail and grasp its priority rate.

The process thereafter will be explained by referring FIG. 28. FIG. 28 shows the flow of the urgent data exchange/transmission for the user of portable personal telephone. In this explanation, the case that the attribute of the electronic mail is scanned and transmitted urgently, will be explained.

At first, it is tried to send the electronic mail data to the address (Step S11). However, the electric source of the terminal of the receiver is cut off or the circuit is broken. Or, the terminal is connected to the telephone circuit, that is, the circuit is busy (No at Step S12). In such cases, the priority rate of the electronic mail to be dispatched is determined (Step S13).

If the priority is very high as the urgency is required (yes at Step S14), and in the case that the receiver possesses a portable personal telephone 32 or pager 33 (Yes at Step S14), the transmission is tried to the portable personal telephone 32 or pager 33. In this connection as to whether or not the receiver possesses a portable personal telephone, it will be clear by inquiring at a terminal data management section 14. When the receiver possesses a portable personal telephone (Yen at Step 14), the urgent information such as the subject and the first sentence of the text as well as the attribute are read out (Step S15) and data exchange process is performed under consideration of speech synthesis system (Step S16). Thereafter, this data is dispatched to the receiver, namely, a call is made to the portable personal telephone. (Step S17). Meantime, in such a case, it may be so arranged that the sender will be informed of the conversion by data exchange/urgent information. Also after the transmission is made, the data can be stored, as the case may be. Thus the information of high priority rate can be transmitted rapidly, it is covenient and the utility of the data exchange of the invention is increased. Also, the accumulation of the mail can be minimized at the server and the information can be transmitted at the soonest possible.

The above mentioned method as described in the form of an embodiment can be applied for various equipment as a program that can be carried out by a computer, while the method is written in a memory module such as magnetic disks (floppy disks, hard disks, etc.), opto-electronic disks (CD-ROMs, DVDs etc.), semiconductor memories as well as can be transmitted through communication line and can be applied to various equipment. To realize this process, the computer (server 1) executes the above mentioned process, while reading in the program stored in a memory module and having the operation controlled by the program.

In the meantime, in the system of the invention as described in the above, it happens to become impossible to receive the application service, by any incidental accident on the side of the terminal. In other words, the data exchange unit 10 manages the various attributes statically. however, the attribute within the system can change dynamically. For example, as in the case of the wireless LAN, though the communication infrastructure is of high speed and of the stable quality, it can happen that the normal process may not be performed as the client of the application service on the side of the terminal is not in a position to hold the memory. Also it may happen that application service may not be performed within the permissible time, because the load for CPU of other servers on the side of the terminal is high. A data exchange process which is capable to meet such dynamic causes is necessary. Hereinafter, as an example, the case that the request for the output (request for printing) from the server 1 cannot be performed on the side of the client, as the printing paper of the portable printer is exhausted on the side of the terminal, will be explained by referring to FIG. 29.

Figure 29:
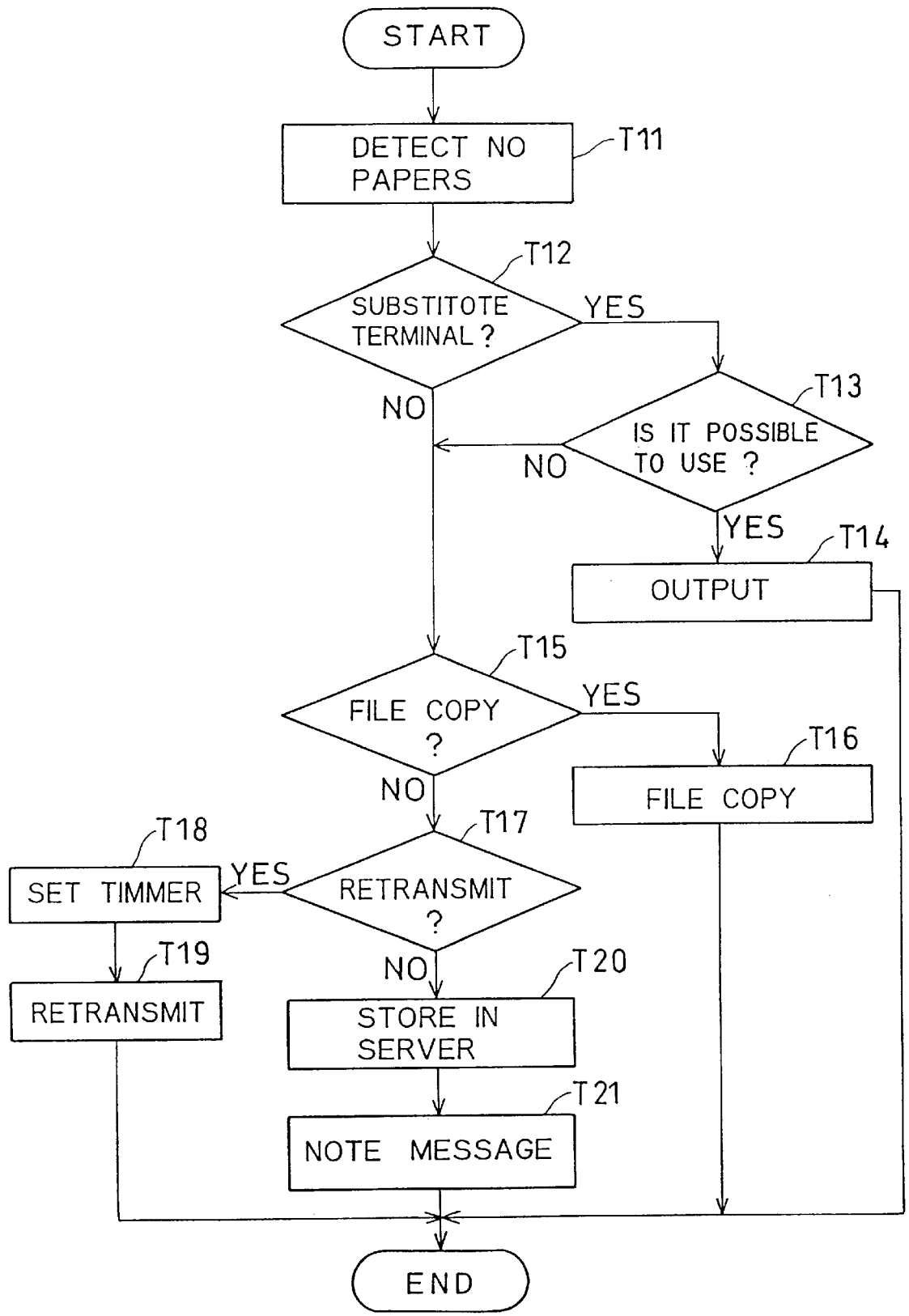
FIG. 29 is a flowchart showing a process of the server, when printing paper is not available.

FIG. 29 is a drawing showing the processing operation of the server 1, when the printing paper is exhausted. For example, the status that the printer 42 is printing out while receiving the service which data was exchanged, is controlled and supervised by the terminal control section 1105.

If the printing paper is exhausted and the output from the printer is interrupted, the terminal control section 1105 detects the status (Step T11). The server 1 determines whether or not substitutable output device is available other than the printer 42, from the information from the intra server user data management section 114 and the user data table management section 142 (Step T12).

In case that a substitutable output device is available (Yes at Step T12), the terminal control section 1105 determines whether or not it is possible to utilize the said output device (Step T13). When it is possible (Yen at Step T13), the substituted device performs the output of the interrupted service at the printer (Step T14). In this case the output is executed after the data is exchanged to meet the attribute of the substituted device. If the substitutive device cannot be used (No at Step T13), the process is forced to be ended. In such a case, it may be so arranged that the effect will be conveyed to the user later on.

On the other hand, in case that no substitutable device is available (No at Step T12), it will be determined, whether the data file, service for which is interrupted, shall be transmitted or copied to the PC 41 connected to the printer 42.

When the terminal control section 1105 detects the instruction input of file copy (Yens at Step T15), the transmission/copying process of the file is executed (Step T16). In this case, the file is transmitted or copied after the data exchange process is performed as the case may be. If the file shall not be copied (No at Step T15), it is determined whether or not the data shall be retransmitted. (Step T17). This determination is made by referring to the intra server user data management section 114 and/or the user data table management section 142 or depending on the instruction input from the user.

In case the data shall be retransmitted (Yes at Step T17), time for the transmission is preset at the timer by referring to the intra server user data management section 114 and/or the user data table management section 142 or depending on the instruction input from the user (Step T18), and the retransmission is performed (Step T19). In case that the retransmission is not to be performed (No at Step T17), the above service which was interrupted is held within the server 1. And a message of this effect is conveyed to the user (Step T21). At this moment the data may be stored after the data is exchanged as the case may be.

It is very convenient that the service can be continued by supervising the status of the terminal from the side of the server, as described in the above, even if any trouble arises on the terminal.

The above mentioned method as described in the form of an embodiment can be applied for various equipment as a program that can be carried out by a computer, while the method is written in a memory module such as magnetic disks (floppy disks, hard disks, etc.), opto electronic disks (CD-ROMs, DVDs etc.), semiconductor memories as well as can be transmitted through communication line and can be applied to various equipment. To realize this process, the computer (server 1) executes the above mentioned process, while reading in the program stored in a memory module and having the operation controlled by the program.

In the meantime, in the network computing circumstances, there will be a case that one server controls the original data and another server controls the copies of the original data within a network. Also, there is a case often that the user makes copy of the data at the server onto the terminal and utilizes the copied data on the terminal. In such a case, when the original data on the server is renewed, it is necessary to inform the other server or the terminal of the renewal at the soonest possible. However, when the other server is under maintenance or when the current source of the terminal is cut off, either information on the data change or transmission of the data cannot be performed. Also, in the case that the transmission capacity is low as in the case of mobile communication network and the communication quality is worse than of the wired LAN, there is possibility that the data copying cannot be finished as the circuit is broken during the transmission of the data, even if the communication with the receiver is possible tentatively.

Figure 32:
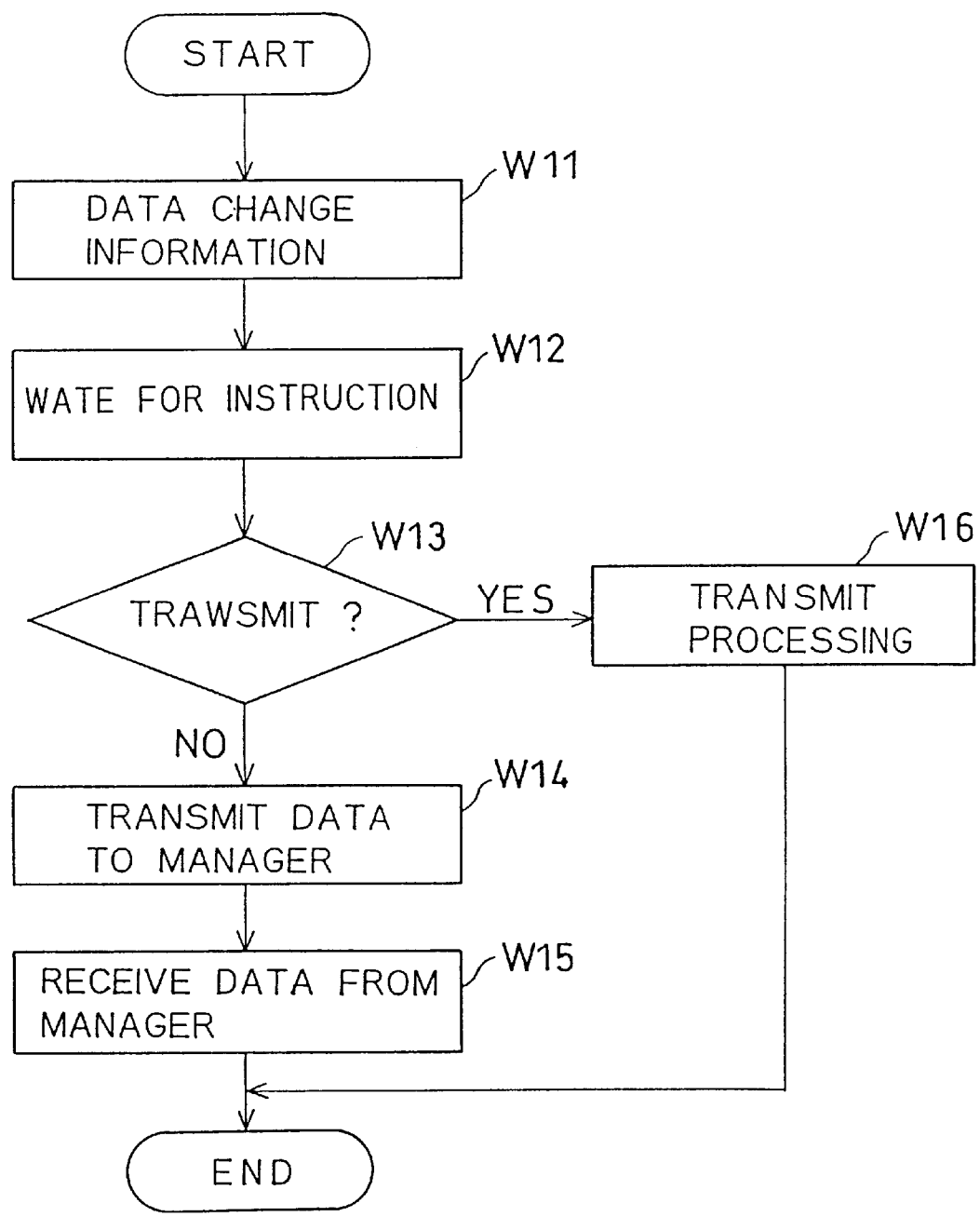
FIG. 32 is a flowchart showing a process for transmission of a notice of data change in relation to FIG. 31.

Therefore, according to the embodiment of the invention, the system is of the construction capable to meet such problems. By referring to FIGS. 30–32, the transmission of the renewed data/transmission of the data will be explained.

Figure 30:
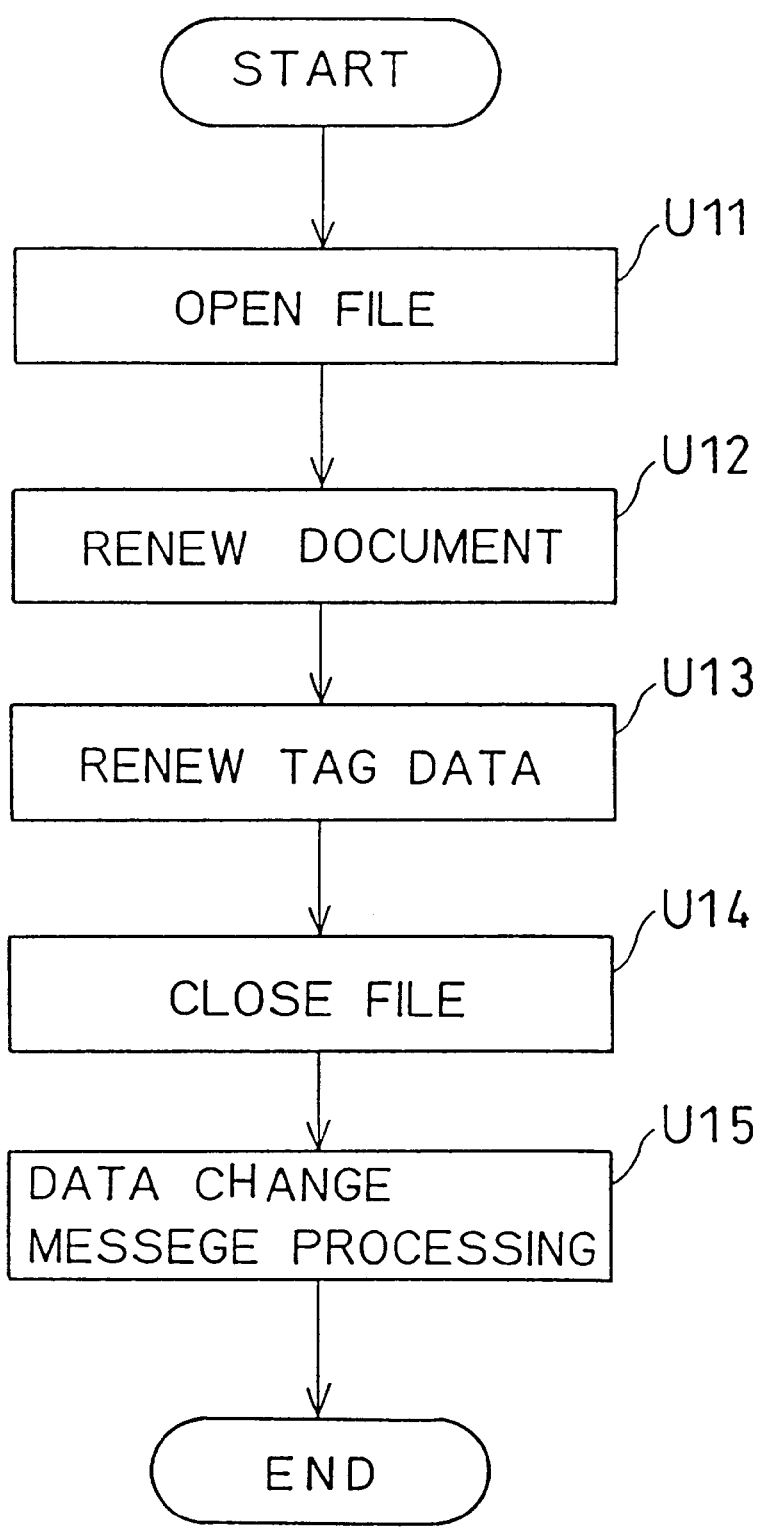
FIG. 30 is a flowchart showing a process for changing an original data.
Figure 31:
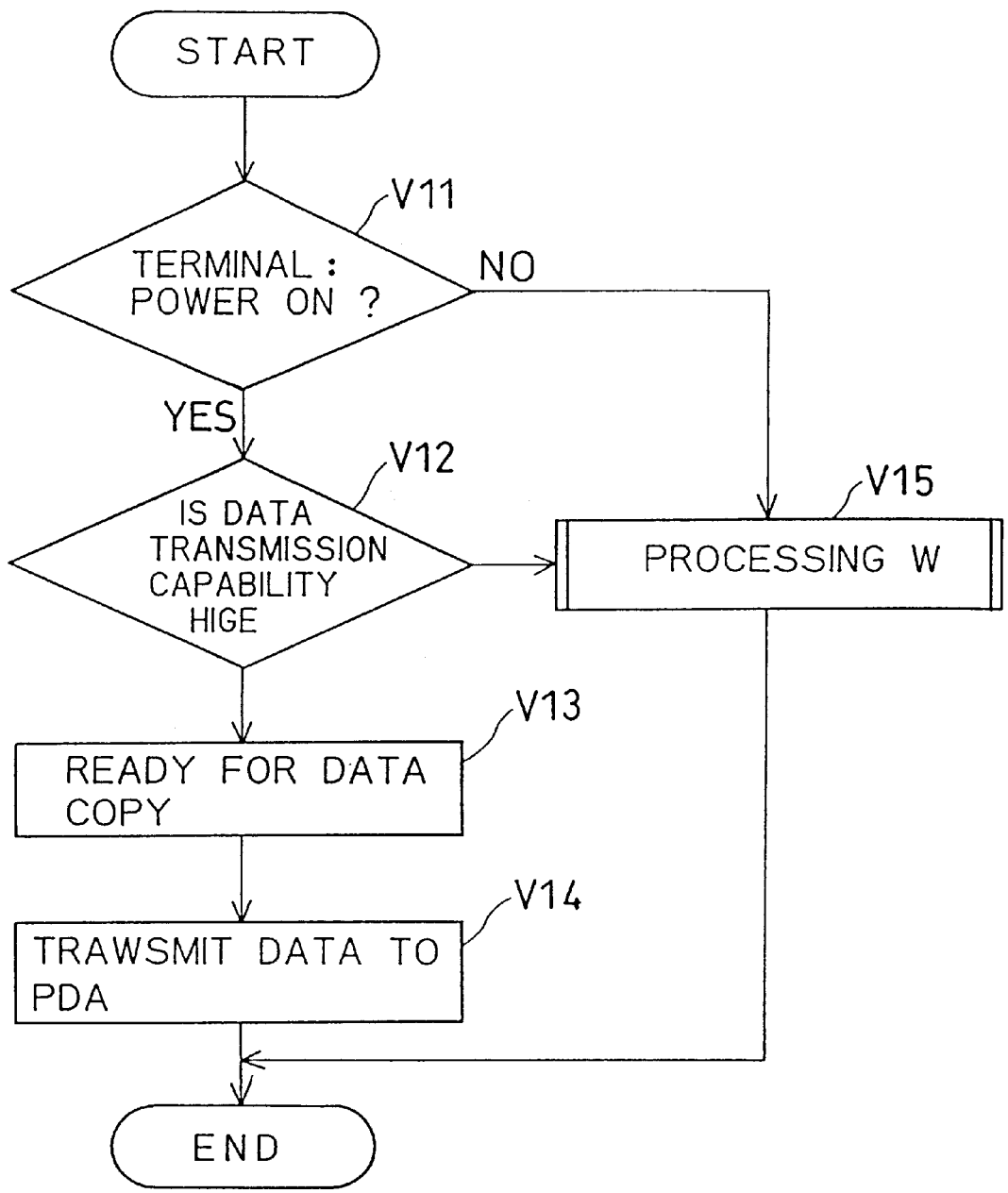
FIG. 31 is a flowchart showing a process for transmission of a notice of data change.

At first, explanation is made according to FIG. 30 showing a flowchart, that the original data stored in the server 1 is changed. In this case, at the time of the data renewal, a data renewal management section 1102 is started to inform of the renewal of the data parts, after the tag data, which controls the document parts in the server 1, is renewed. In short, the file to be renewed is opened (Step U11) and document is changed (Step U12 and at the same time the tag data is changed (Step U13). When the renewal of the file is ended, the file is closed (Step U14) and the information of the data change is started (Step U15).

When the data change is performed as in the above, a routine for the information of the data change is established. The flow of the process will be explained according to FIG. 31. At first, the status of the current source ON/OFF or the circuit breakage is investigated under the control of the data change control section 1101 (Step V11). If, for example, the current source of the terminal is ON (Yes at Step V11), transmission capacity of the circuit is checked (Step V12). If the circuit is reliably of high transmission capacity (Yes at Step V12), a preparation for the data transmission and the data exchange processing operation is performed as the case may be and the data is transmitted (Steps V13 and V14. On the other hand, if the current source of the terminal is OFF (No at Step V12) or if the transmission capacity of the communication circuit is low (No at Step V12), it moves to the process shown in FIG. 32 (Step V15).

In other words, the user on the side of the receiver is informed of the data change (Step W11) and the instruction is awaited from the user (Step W12). If the instruction from the user is the one to execute information/transmission (Yes at Step W13), the information transmission of the renewed data is performed. If the instruction from the user is not to execute the information/transmission, or no reply is given, or if the information is impossible (No at Step W13), the effect is conveyed to the controller of the server 1 (Step W14), the instruction for the countermeasure is awaited from the controller (Step W15), and the process is performed according to this instruction.

The above mentioned method as described in the form of an embodiment can be applied for various equipment as a program that can be carried out by a computer, while the method is written in a memory module such as magnetic disks (floppy disks 182, hard disks, etc.), opto-electronic disks (CD-ROMs 183, DVDs etc.), semiconductor memories as well as can be transmitted through communication line and can be applied to various equipment. To realize this process, the computer (server 1) executes the above mentioned process, while reading in the program stored in a memory module and having the operation controlled by the program.

In the meantime, under the circumstances of network computing, substantial security functions are necessary. As to the security of the data, the research and development of the enciphering technology has been performed so far. However, when we consider network computing circumstances, to which terminals such as portable PCs (client) are connected, it is necessary to provide countermeasures for peculiar network computing circumstances such as for the case that said PC is carelessly mislaid, or, for the case that said PC is stolen. As to the data of high secrecy for business, which are utilized in the system presupposing such circumstances, there are the case that such data exist on the side of the server and the case that such data exist on the side of the terminal. For the case that the user lost the terminal, it is necessary to prevent the data for business which exist on the side of the terminal from leakage or from unjustified use.

Therefore, in the form for utilization of the terminal in the embodiment of the invention, the material resource which relates to the business of the terminal, is made available, only when the terminal is connected to the network. In this case either the server or the terminal can access to the resources of the material (data and programs) when the portable terminal is connected to the network, and when the connection of terminal is cut off from the network, a security mechanism is provided to prevent the material for business held in the terminal from the access when the connection of the terminal is cut off from the network. In other words, according to the security functions of the embodiment of the invention, either the server or the terminal can access to the business materials of the high secrecy, when the terminal is connected to the network and the business material held in the terminal is enciphered when the terminal is disconnected from the network, so that the access (decipherment) is made impossible.

Figure 33:
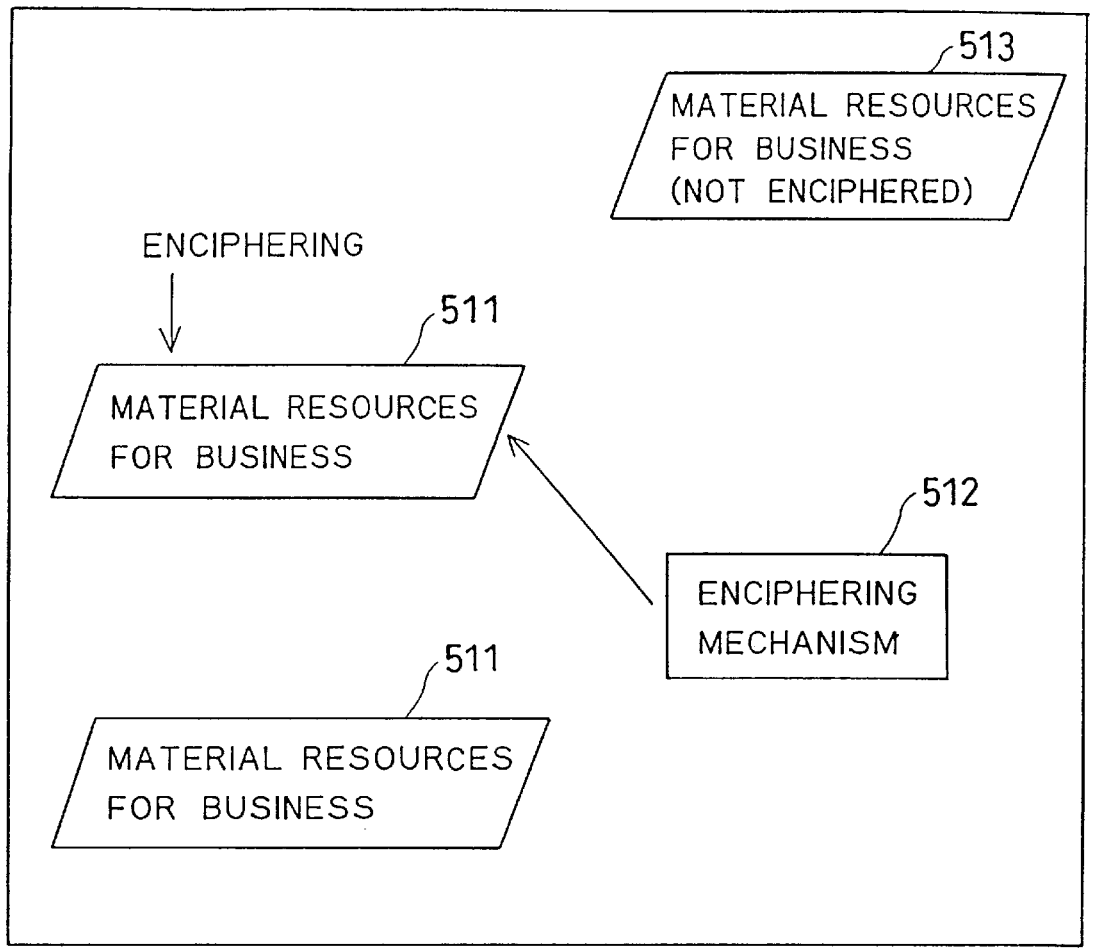
FIG. 33 is a drawing showing the outline of structure of resources on terminal equipment side.
Figure 34:
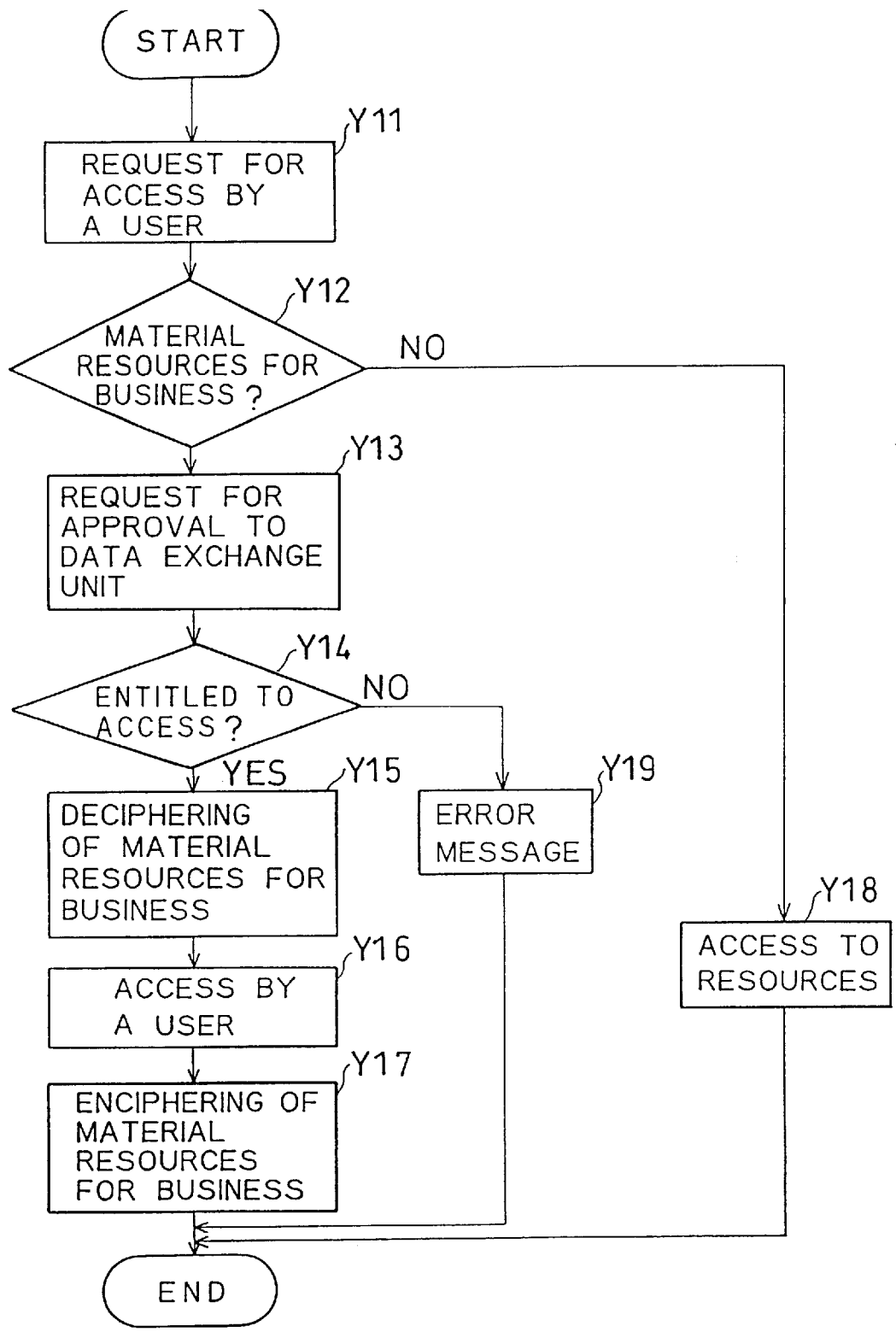
FIG. 34 is a flowchart showing a security function.

FIG. 33 is a drawing showing the outline of structure of material resources on the terminal side and FIG. 34 is a flowchart showing security functions. In other words, assuming, for example, that a portable PC 51 is used as the terminal, this portable PC 51 is equipped with material resource for business of the high secrecy 511 and the corresponding enciphering mechanism section 512 as FIG. 33 shows. The material resources for business 511 is enciphered normally.

The enciphering mechanism section 512 requests an approval from the data exchange unit 10 (Step Y13), when the user accesses to the material resources for business (Step Y11 and Yes at Step Y12). The data exchange unit 10 sends a deciphering key to the portable PC 51 , when the user determines that the user is entitled to access to the material resources by referring to the terminal data management section 14, the user interface data management section 13 and/or the terminal data management section 12. The portable PC 51 deciphers the material resources for business, which are enciphered (Step Y15), with this key sent and enables the user to access (Step Y16) to the material resources for business which are deciphered (Step Y17). The above determination is made through the communication between the enciphering mechanism section 512 and the data exchange unit 10. In short, when a request for the access to the material resources for business is raised by a user (Step Y11 of FIG. 34), the enciphering mechanism section 512 addresses an enquiry to the data exchange unit 10 through the network for an approval for the access (Step Y14). The data exchange unit 10 is equipped with the terminal data management section 14 and is in a position to execute the approval for the user. By utilizing such a mechanism it is possible to provide the material resources, which can be accessed by specified users, and the material resources, which cannot be accessed by specified users, in case there are a plurality of material resources in the terminal.

Figure 35:
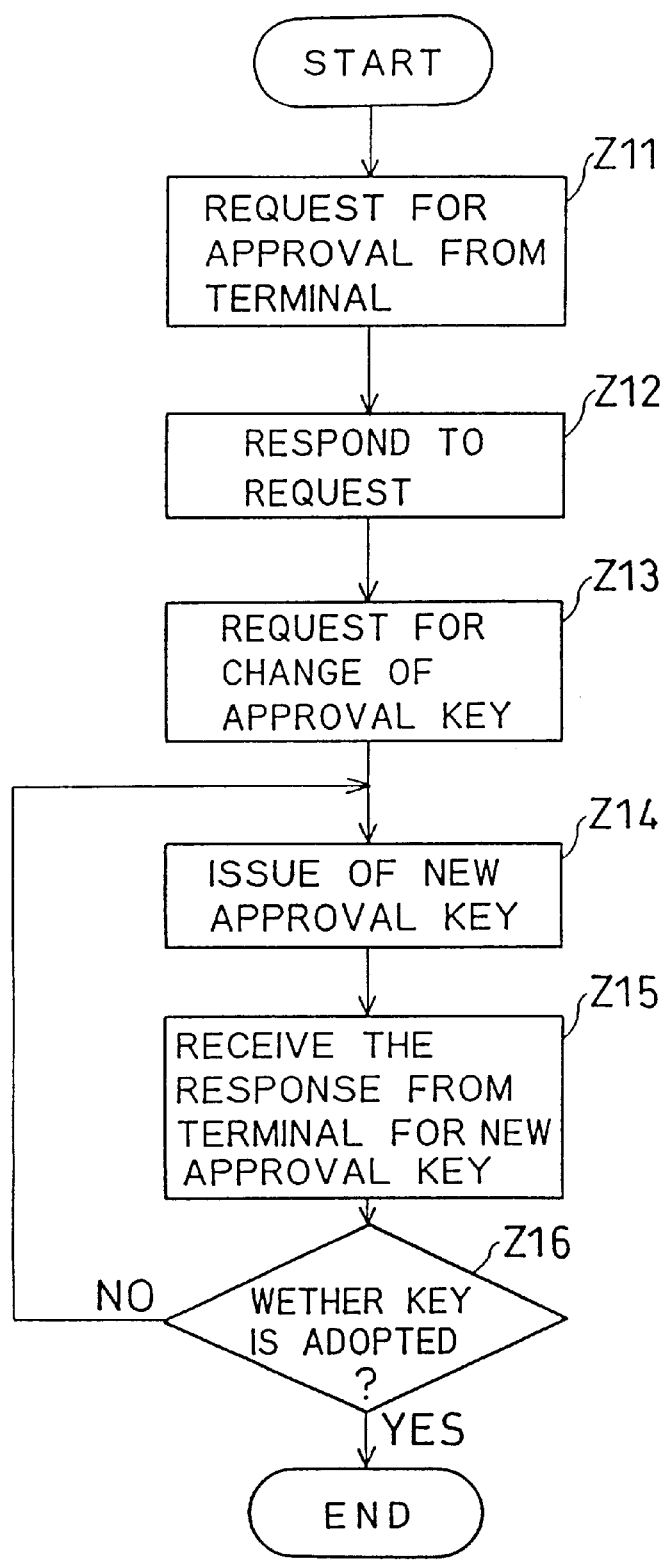
FIG. 35 is a flowchart showing change of an verification key on the side of data exchange unit.

Also, in the data exchange process section 11 of the data exchange unit 10, there is the compression/enciphering processing section 115. Therefore, the key for approvals can be changed (every time when the network is disconnected) in accordance with necessity. FIG. 35 shows this flowchart. When the request for the approval is raised by a terminal, for example by a portable PC 51 (Step Z11) and the data exchange unit responds to the request (Step Z12), the deciphering process as mentioned in the above is performed. When the communication with the data exchange unit is going to finish, after the deciphering process is finished and a certain business is executed. A request for the change of the approval key is raised by the terminal portable PC 51 to the data exchange unit 10. Upon this request, the data exchange unit 10 issues a new approval key to the portable PC 51 (Step Z14). When the portable PC 51 receives the new approval key, the portable PC 51 responds to the data exchange unit 10 to the effect that the new approval key is received (Step Z15). When the said key is adopted as the approval key (Yes at Step Z16), the process for the change of the approval key is finished. Meantime, for the change of the approval key, a time stamping function can be applied.

Meantime, as a matter of course, the above mentioned various processing methods as described in the form of an embodiment may be arranged so that the programming data in which such processing method is written, is stored in the memory module such as a hard disk device (HDD) 185 or floppy disk device (FDD) 181 or CD-ROM device 183 and then the server may execute the above mentioned process basing upon the stored programming data. The safety of the material resources of secrecy can be improved by utilizing such mechanism, as the approval key is revised in the course of time, for example, by connection to the network or disconnection, even if the approval key was stolen.

In the meantime, a plurality of server or data exchange unit which is provided with security functions as mentioned in the above can exist in a network system. In the case of the distributed servers or data exchange units as described in the above, the server which lies nearest to the terminal may execute a key approval. In other words, this function can be realized, for example, by utilizing the server, which responds at first, when the terminal issues a control message for seeking the server, which may issue an approval. In the case that the data of approvals for the users exist in such a distributed circumstances, there is a possibility that the data of respective servers do not coincide with each other. Such circumstances can be solved as follows.

Figure 36:
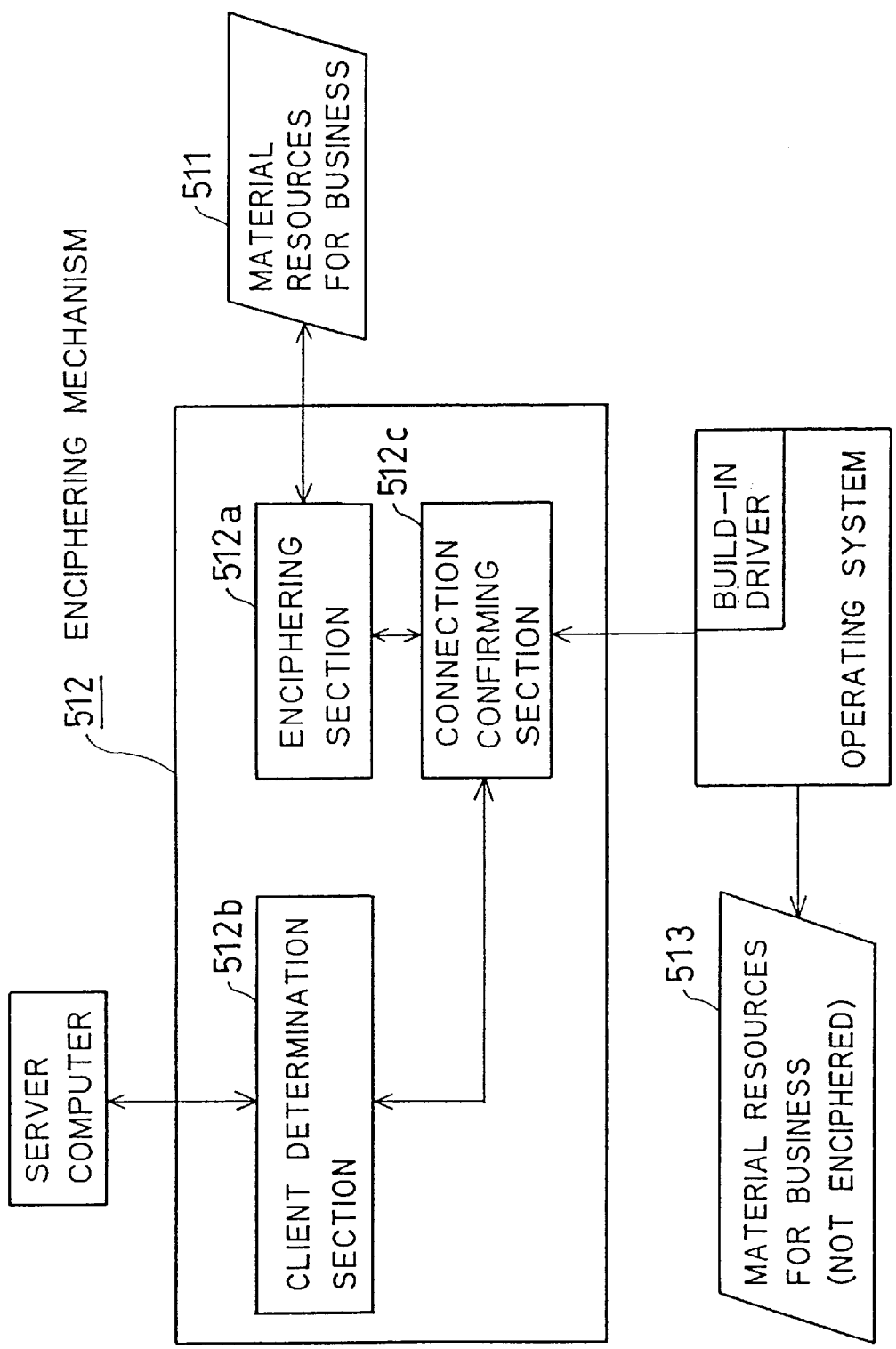
FIG. 36 is a drawing for explaining the enciphering system.

Here we explain an enciphering mechanism section 512 by referring to FIG. 36. The enciphering mechanism section comprises an enciphering section 512a, a client determination section 512b and a connection verifying section 512c. The enciphering section 512a executes the control of enciphering mechanism 512 and is provided with an actual enciphering process, a management of the material resources to be enciphered, a timer to control the time for the execution of enciphering and deciphering. The client determination 512b realizes, for example, the function of the terminal side for processing the approval in combination with approval server or terminal data management section 14. The connection verifying section 512c is to confirm, whether the client and the server are connected through the network, basing upon the result of approval process. Meantime, the enciphering section 512a determines whether the enciphering/deciphering process shall be executed for the special material resources basing upon the above result, and also execute the enciphering/deciphering process.

Figure 37:
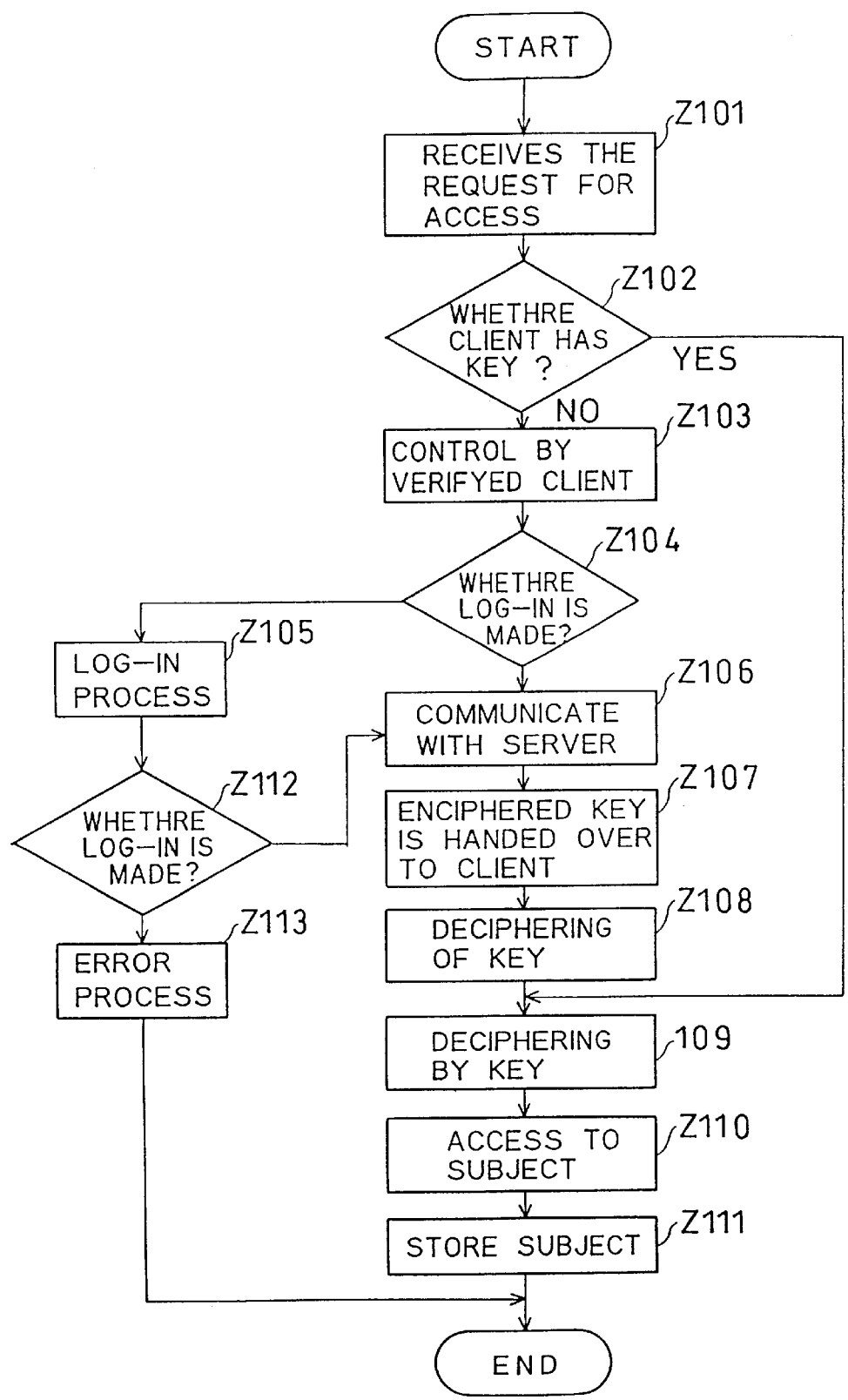
FIG. 37 is a flowchart showing a decoding process.

To the next, the flow of the deciphering will be explained by referring FIG. 37. At first, when the connection verifying section 512c receives the request for the access to the subject material resources from the driver involved in the operating system (Step Z101), the connection verifying section 521c determines whether the approved client has the key to be used for deciphering (Step Z102). Meantime, the acceptance of the request for the access to the material resources can be realized by realizing the mechanism that mediates the request from the basic software, without changing the application.

If the client has no key (Yes at Step Z102), the control is transferred to the client verification Z103 (Step 103). At this point, when the client verification section 512a determines that the access is justified, the user is requested to log in the server (Step Z105).

Also in the case that the user has not the key though the log-in is made, the approving server and an approved client communicate with each other to execute a verification of the user (Step Z106). When the verification is finished normally, the key is enciphered and handed over to the client (Step Z107) On the side of the terminal, the key is deciphered (Step Z108) and the decipherment of the subject is executed with this key (Step Z109 and Z110) and the decipherment of the subject is stored (Z111). Meantime, the encipherment of the material is automatically executed at the time of writing in of the data and the level of the security can be improved by storing which data was enciphered, without informing the user of the same. Also when the network is cut off, the key is controlled by the client for a certain time (The key is maintained by the approved client). This is to prevent the failure of the access to the subject (material) by an incidental breakage of circuit. In the meantime at the step Z102, when it is determined by the connection verification section 512a that the approved client has a key to be used for deciphering, the process is transferred to Steps Z109–Z111.

Also at the step Z105, where the user is requested to log in the server, the process Z106 to execute the verification of the user is transferred to the step Z106, which performs the processes of the steps Z107–Z111, when the log-in is inputted (Yes at Step Z112).

Figure 38:
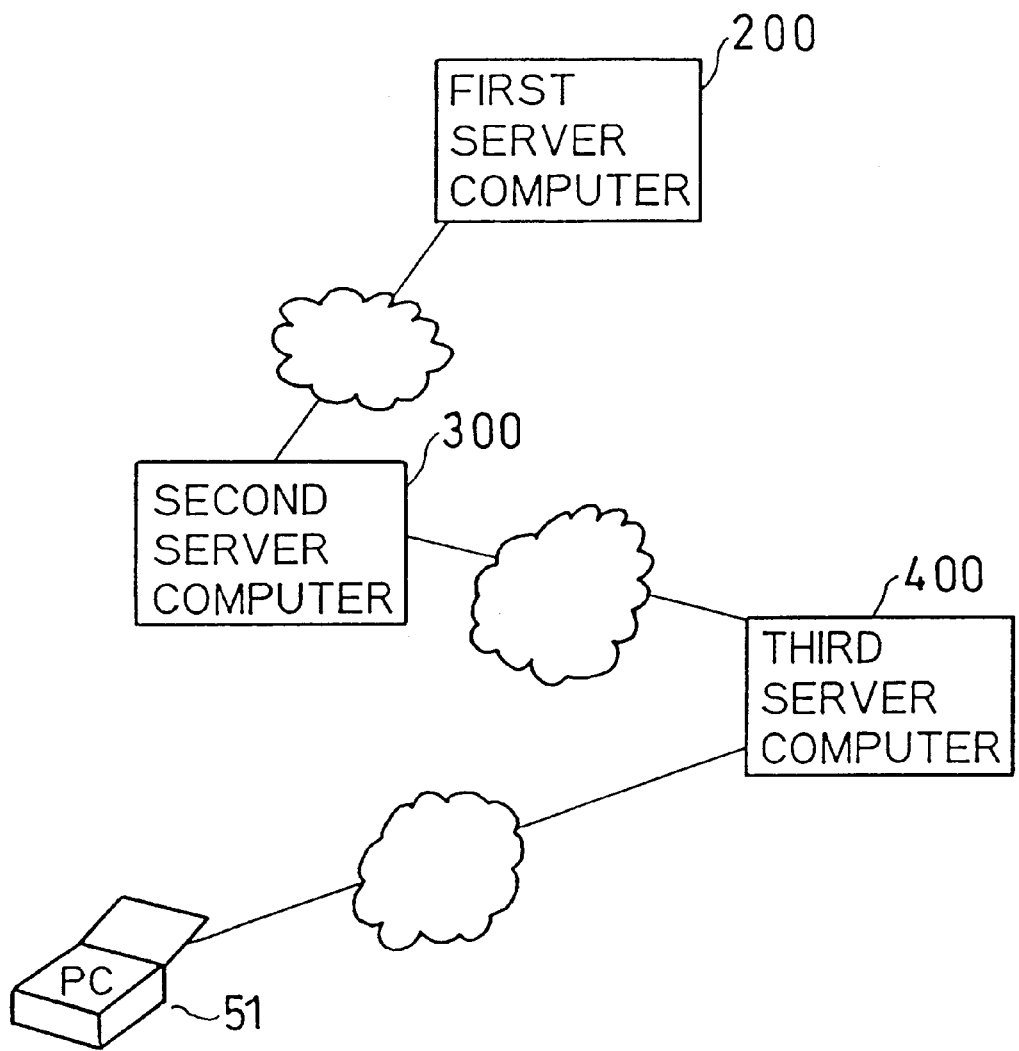
FIG. 38 is a drawing showing a structure of a system of the servers with distributed data exchange function, which are connected through networks.

FIG. 38 shows an arrangement that a plurality of servers with the functions of the data exchange unit are connected in a network system. In this case, there are the first server 200 which possesses the original data in the variable data of users data at terminal portable PC 51, and the second server 300 which possesses a copy of the original data of the first server and which is equivalent to the first server, and the third server 400 which is equivalent to the first server. When the variable data depending upon the terminal and/or the user such as user data owned by the server 200 are changed, the data of the first server 200 must be changed.

If various requests are issued from the terminal PC 51, the nearest third server 400 starts the negotiation (communication) with the PC 51. At this time, when an disagreement arises between the PC 51 and the third server 400, the third server 400 executes an enquiry to the first server 200. In this case, if there is the second server 300 between the first server 200 and the third server 400, the variable data at the second server 300 can be changed automatically as an optional function. This accounts for the fact that the system functions efficiently by communicating with the second server 300, in case that the third server 400 which is the communication partner of the PC 51 is failed to communicate with the PC 51, or because the up-to-date variable data are available at the second server 300 rather than the third server 400 because of the processing capacity etc. Furthermore, the third server 400 may again communicate with the PC 51 basing upon the up-to-date data.

In this case it is advisable to arrange, so that the variable data at the second server 300 can be deleted optionally, when the variable data arrive at the third server 400. This can be executed, when it is determined that it is not desirable that the data of the security such as user verification data are distributed in the network.

Now the second embodiment of the present invention will be explained. Though we explained that the data exchange unit is provided within the server computer, which execute the services, in the previous form of the embodiment, we explain the case that the functions necessary for data change are provided separately in another server computer as the second embodiment.

Figure 39:
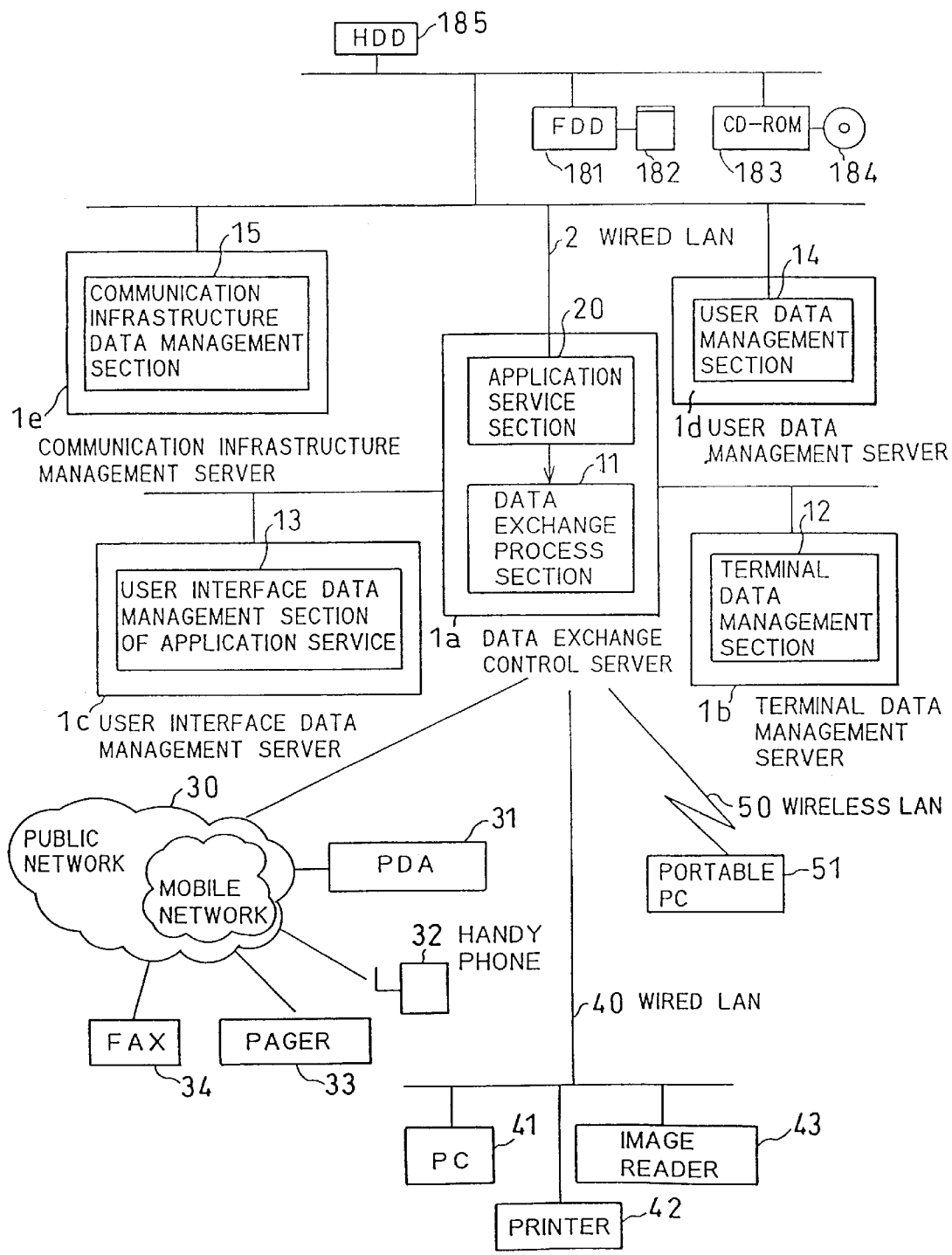
FIG. 39 is a block diagram showing the structure of a distributed network computing system according to the second embodiment of the present invention.

FIG. 39 is a block diagram showing the structure of a distributed network computing system according to the second embodiment of the present invention. The same reference numerals as in FIG. 1 denote the same parts in FIG. 15, and a detailed description thereof will be omitted. FIG. 39 is different from FIG. 1 in that a plurality of servers 1a to 1e exist on a network. In this embodiment, the servers 1a to 1e are connected to each other via a wired LAN 2 in an office.

The server 1a is a main server computer for providing a service and has an application service section 20. The server 1 has a data exchange process section 11 and operates as a data exchange control server for controlling the entire data exchange process.

The servers 1b to 1e are sub-server computers. The server 1b has a terminal data management section 12 for managing terminal attribute data and operates as a terminal data management server under the control of the server 1a. The server 1c has a user interface data management section 13 for managing user interface data and operates as a user interface data management server under the control of the server 1a. The server 1d has a user data management section 14 and operates as a user data management server under the control of the server 1a. The server 1e has a communication infrastructure data management section 15 and operates as a communication infrastructure data management server under the control of the server 1a.

These servers 1a to 1e are connected various terminals (e.g., a PDA 31, a PC 41, and a portable PC 51) through various communication networks (e.g., a public network 30, a wired LAN 40, and a wireless LAN 50).

In the second embodiment, the terminal data management section 12, the user interface data management section 13, the user data management section 14, and the communication infrastructure data management section 15 are arranged in the servers 1b to 1e, respectively, thereby constituting the distributed processing system. Since the server 1a having the data exchange process section 11 controls various processing operations, an integrated data exchange process function is realized.

A communication interface 111 for inside of data exchange unit shown in FIG. 2 controls communication between the servers. A communication interface 116 for outside of data exchange unit controls communication with the application service or various terminals.

In FIG. 39, functions necessary for the data exchange process are distributed to the servers 1b to 1e. One server may have two or more functions, or a plurality of servers may have the same function. The operation of the second embodiment will be described below.

Figure 40:
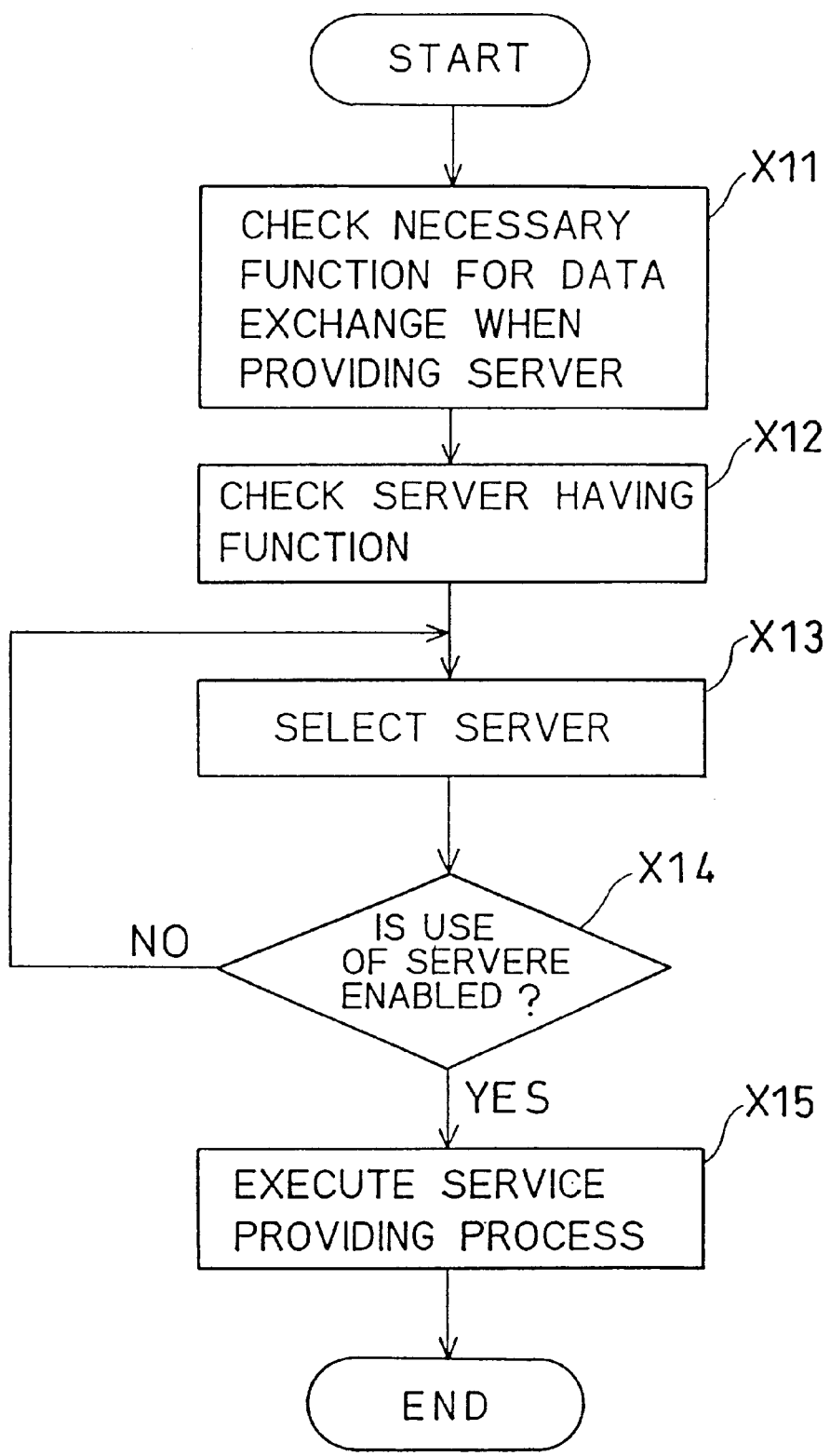
FIG. 40 is a flow chart showing a service providing process operation by distributed processing in the second embodiment shown in FIG. 39.

FIG. 40 is a flow chart showing a service providing process operation by distributed processing in the second embodiment. In providing the application service to a terminal, the server 1a checks the necessary function for the data exchange process first (step X11). In this case, the necessary function for the data exchange process is a function of managing the terminal attribute data or communication infrastructure data or a function of managing user interface data or user data.

When the data exchange process is to be performed in correspondence with the terminal attribute, the terminal attribute data management function is necessary. The server 1a accesses the servers 1b to 1e to check the server having this management function (step X12). In some cases, a plurality of servers have the same function. Therefore, the server 1a confirms each of the corresponding servers and selects a usable server with the desired function (steps X13 and X14).

In the example shown in FIG. 39, the server 1b corresponds to the usable server. In this case, since only the server 1b has the terminal attribute data management function, the server 1a establishes contact with the server 1b and waits for a use permission from the server 1b.

When the use permission is received from the server 1b (Yes in step X14), the server 1a obtains the terminal attribute data of the terminal as a communication partner from the terminal data management section 12 in the server 1b, thereby executing the service providing process by the data exchange process as described in the first embodiment (step X15).

More specifically, the server 1a converts the service data to be provided as an application service into a specific format on the basis of the terminal attribute data by the data exchange process section 11, and transmits the converted service data through the communication network connected to the terminal. In this case, the data exchange process means processing of converting the format of certain data in correspondence with the processing capability of the terminal as the communication partner.

The data exchange process corresponding to the terminal attribute has been described above. When the data exchange process is to be performed in correspondence with the attribute of a communication infrastructure, the servers 1b to 1e are accessed to check the server having the communication infrastructure data management function. The server 1a obtains the communication infrastructure data corresponding to the terminal as the communication partner from the communication infrastructure data management section 15 in the server 1e, thereby executing the service providing process by the data exchange process as described in the first embodiment. In this case, the data exchange process means processing of converting the format of certain data in correspondence with the communication capability of the communication network connected to the terminal as the communication partner.

When the data exchange process is to be performed in correspondence with the attribute of the user interface, the servers 1b to 1e are accessed to check the server having the user interface data management function. The server 1a obtains the user interface data corresponding to the terminal as the communication partner from the user interface data management section 13 in the server 1c, thereby executing the service providing process by the data exchange process as described in the first embodiment. In this case, the data exchange process means processing of converting the format of certain data in correspondence with the operation method (operation method of receiving the application service using an icon, a button, or a command) of the terminal as the communication partner.

When the data exchange process is to be performed in correspondence with the attribute of the user, the servers 1b to 1e are accessed to check the server having the user data management function. The server 1a obtains the user data corresponding to the terminal as the communication partner from the user data management section 14 in the server 1d, thereby executing the service providing process by the data exchange process as described in the first embodiment. In this case, the data exchange process means processing of converting the format of certain data in correspondence with the operation method (operation method of the user's preference for, e.g., screen display) of the user of the terminal as the communication partner.

As described above, even when various functions of the data exchange unit are distributed, the same effect as in the first embodiment can be obtained. By distributing the functions, a plurality of servers each having a relatively low processing capability can be combined to realize an advanced data exchange process function. In this case, since the processing load on the server (server 1a in FIG. 39) for providing the service is reduced, even a compact computer can cope with the processing. In addition, the data exchange process system realized by combining the plurality of servers can more flexibly cope with a system failure than a centralized system.

In the second embodiment, the functions are distributed to the plurality of servers commonly connected to the wired LAN 2 in the office. However, the functions maybe distributed to a plurality of servers connected to various communication networks including the public network 30.

In the second embodiment, each server is accessed to find a server with a desired function. However, the present invention is not limited to this, and the corresponding server may be found with reference to a table representing the functions of the respective servers.

The data enciphering function or data compression function may be distributed to other servers. For data enciphering, a server having the data enciphering function determines on the basis of the terminal attribute data or communication infrastructure data whether data enciphering is enabled. If data enciphering is enabled, the service data provided as the application service is enciphered. The server for providing the application service receives the enciphered service data and transmits the data to the terminal as the communication partner.

For data compression, a server having the data compression function determines on the basis of the terminal attribute data or communication infrastructure data whether data compression is enabled. If data compression is enabled, the service data provided as the application service is compressed. The server for providing the application service receives the compressed service data and transmits the data to the terminal as the communication partner.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

The third embodiment of the present invention will be described next. In the third embodiment, a data exchange apparatus is realized on an exchange system.

Figure 41:
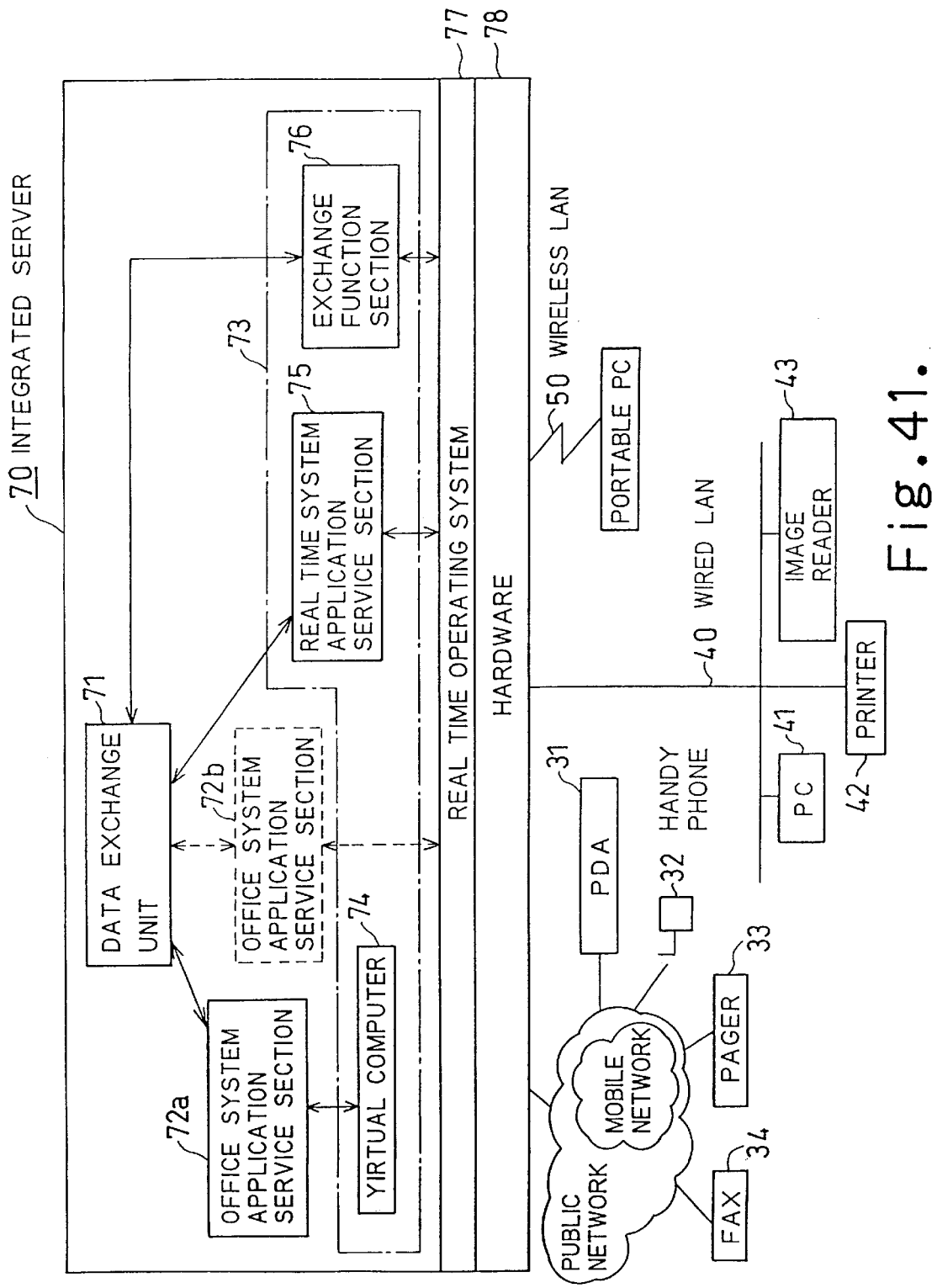
FIG. 41 is a block diagram showing the structure of an integrated server in case wherein a data exchange apparatus according to the third embodiment of the present invention is realized on an exchange system.

FIG. 41 is a block diagram showing the structure of an integrated server 60 when a data exchange apparatus according to the third embodiment is realized on an exchange system. In this embodiment, a unit in which a line exchange system and a server computer are integrated will be referred to as an integrated server.

As shown in FIG. 41, the integrated server 70 has a data exchange unit 71. The data exchange unit 71 performs the data exchange process in correspondence with the attribute of a terminal or a communication infrastructure. The detailed structure of the data exchange unit 71 is the same as that of the data exchange unit 10 shown in FIG. 1, and a detailed description thereof will be omitted.

The integrated server 70 also has an office system application service section 72a as a server computer. The office system application service section 72a performs various office system application services (application software) such as an inventory control service. Currently, since the office system application service section 62a cannot be directlymountedon a real time operating system (to be referred to as a real time OS hereinafter) 77 without modification, a virtual computer 74 is interposed. The real time OS 77 is an OS for a real time processing application and places prominence on the response speed, unlike a general OS (e.g., UNIX or MS-DOS).

An office system application service section 72b which can start on the real time OS 77 can be directly mounted on the real time OS 77 without interposing the virtual computer 74. The virtual computer 74 is a virtually formed computer and has the same function as that of a computer (real computer). One OS can run on one virtual computer. In this embodiment, the virtual computer 64 is incorporated in a line exchange system 73.

Figure 42:
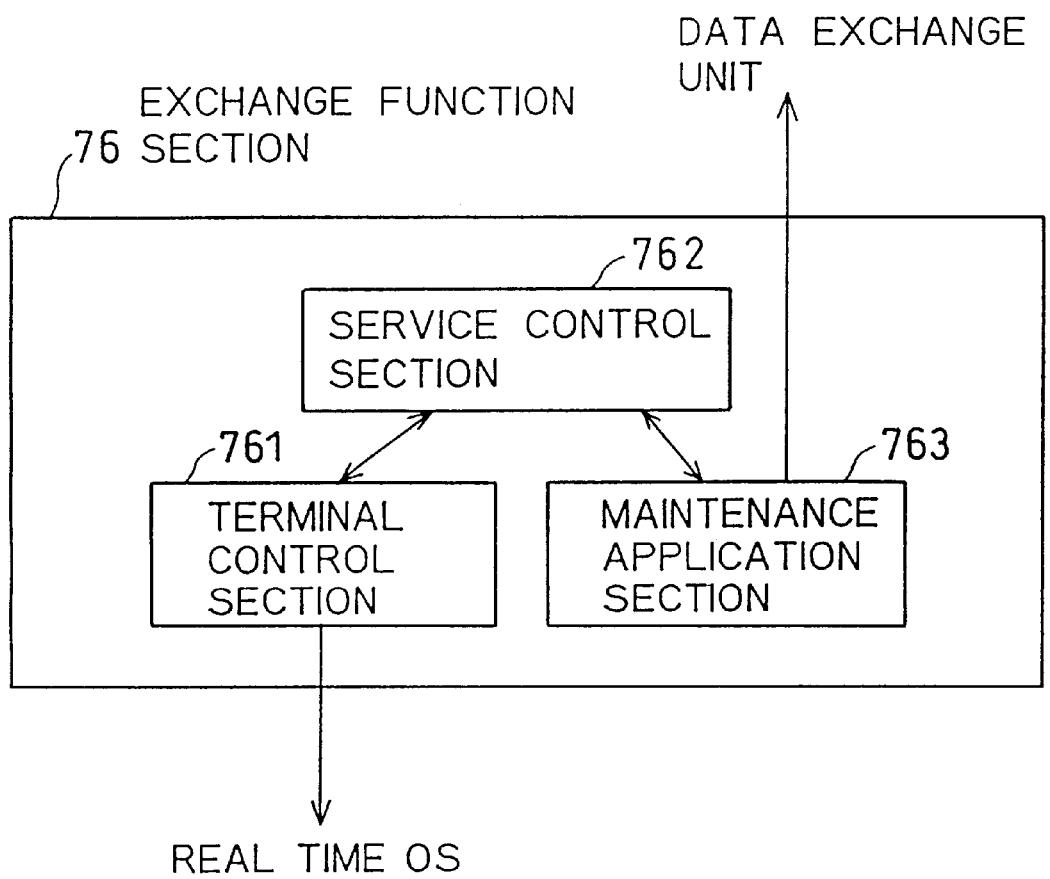
FIG. 42 is a block diagram showing the structure of an exchange function section of a line exchange system in the third embodiment shown in FIG. 41.

The line exchange system 73 is constituted by the virtual computer 74, a real time system application service section 65, and an exchange function section 76. The real time system application service section 75 performs general telephone system services such as delayed delivery (answering service) or message transfer (pager). The exchange function section 66 has the function of an exchange system, e.g., line connection or telephone number management. FIG. 42 shows the structure of the exchange function section 76.

As shown in FIG. 42, the exchange function section 76 is constituted by a terminal control section 761, a service control section 762, and a maintenance application section 763. The terminal control section 761 performs control for receiving a signal from a terminal and transferring the signal to another terminal. The service control section 762 determines a service to be provided in accordance with a signal. The maintenance application section 763 manages not only line error data but also telephone number data.

Hardware 68 represents a physical circuit portion such as a CPU and a line circuit. With this structure, an apparatus serving as a line exchange system and a data exchange unit on a telephone network can be realized. In this case, by practicing the integrated server, data can be converted into a final format near the user terminal. More specifically, when a network is constituted by sub-networks, data can be converted into a format suitable for the sub-network.

Data is stored in the end integrated server. Finally, the integrated server is used as a cache. Only simplified data transmission is performed for the terminal as the communication partner, i.e., the terminal is informed of registration of data in the cache. With this processing, the loss in data volume can be minimized, and the characteristics of each sub-network can be compensated for.

When an exchange function is added, the system can also be used as an office server. In many cases, a number of exchange systems are arranged on the network. For this reason, the distributed processing as described in the second embodiment can be effectively performed.

In the example shown in FIGS. 41, 42 the data exchange unit is incorporated in the integrated server in which the server computer and the exchange system are integrated. The present invention is not limited to this. For example, the data exchange unit may be arranged independently of the integrated server (server computer+exchange system), and the application service provided from the integrated server may be converted into a predetermined format by the data exchange unit. Alternatively, various functions of the data exchange unit may be distributed to a plurality of exchange systems. That is, various changes and modifications can be made within the spirit and scope of the present invention. A case wherein the data exchange unit is arranged in the exchange system will be described below.

Figure 43:
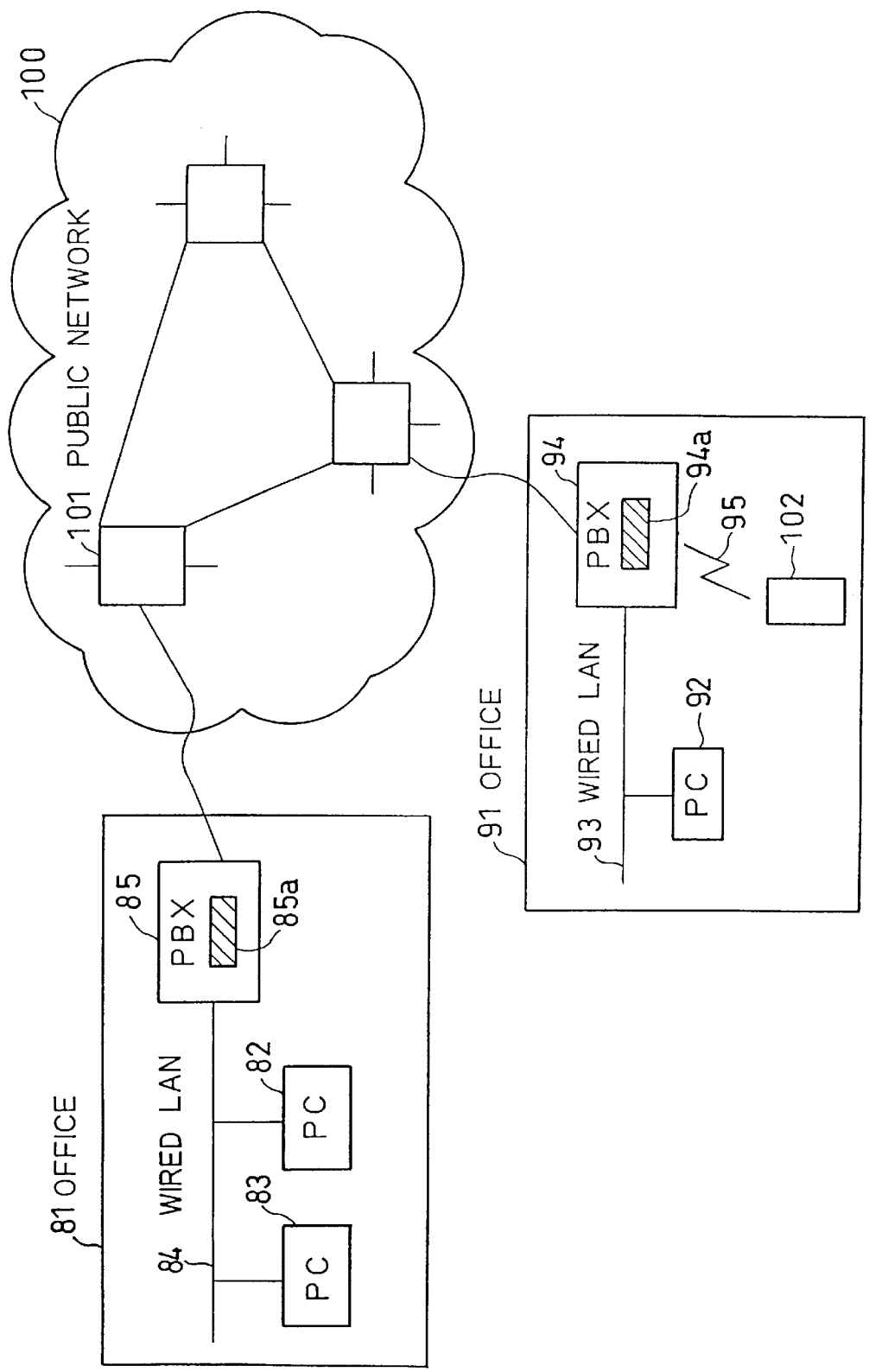
FIG. 43 is a block diagram showing the structure of a distributed network computing system according to the third embodiment of the present invention.
Figure 44A:
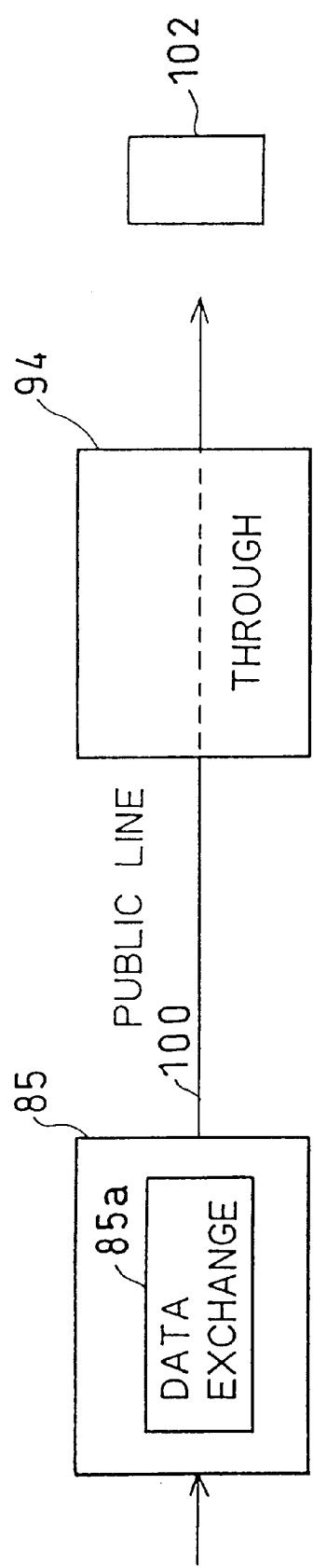
FIGS. 44A and 44B are block diagrams for explaining processing operations performed when a PBX in the third embodiment has a data exchange function.
Figure 44B:
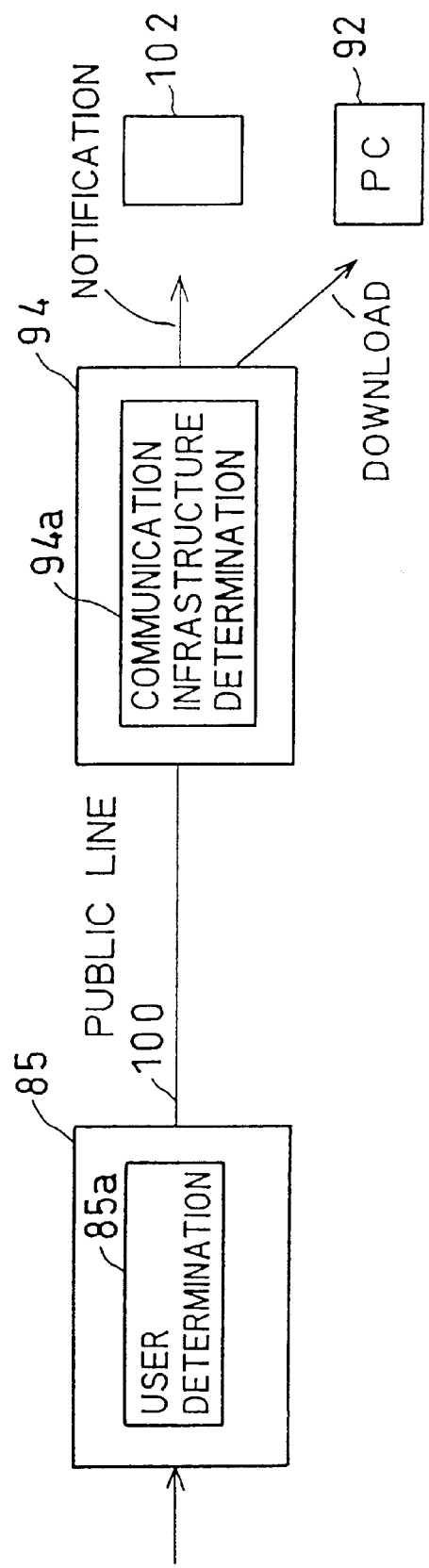

FIG. 43 is a block diagram showing the structure of a distributed network computing system according to the third embodiment. FIGS. 44A and 44B are diagrams explaining a flow of processing of the embodiment shown in FIG. 43. Assume that a PC 82, a PC 83, and an integrated server 85 connected to the PCs 82 and 83 via a wired LAN 84 are arranged in an office 81. The integrated server 85 is a computer in which a server computer and a PBX (private branch exchange) are integrated. The integrated server 85 operates as an exchange system and also provides an application service as a server computer. On the other hand, assume that a PC 92 and an integrated server 94 connected to the PC 92 via a wired LAN 93 are arranged in an office 91. The integrated server 94 is a computer in which a server computer and a PBX (private branch exchange) are integrated, like the integrated server 85.

Reference numeral 100 denotes a public network; 101, a private exchange system 101 present on the public network; and 102, a portable terminal 102 which receives a service. The portable terminal 102 is connected to the integrated server 94 via a private radio system 95 in the office 91. With this structure, the application service provided from the private radio system 95 in the office 81 can be used at the terminals (the PC 82 and the PC 83) set in the same office and also be used at the terminals (the PC 92 and the portable terminal 102) set in the other office 91.

When a PBX 85a in the integrated server 85 has a data exchange function, the service data provided from the integrated server 85 is sent to the integrated server 94 through the PBX 85a and the public network 100, as shown in FIG. 20A. If, at this time, the user is using the portable terminal 102, the user receives the service data from the integrated server 94 through the private radio system 95. However, when the portable terminal 102 cannot receive the service data because of the excessive data volume, the service data must be converted by the PBX 85a in the integrated server 85 and then retransmitted.

The data exchange function may be distributed to the PBX 85a in the integrated server 85 and a PBX 94a in the integrated server 94. In this case, the PBX 85a determines only the user terminal, and the service data can be directly transmitted to the end integrated server 94, as shown in FIG. 20B. The service data is transmitted to the integrated server 94 through the PBX 85a and the public network 100. The PBX 94a in the integrated server 94 determines the communication infrastructure corresponding to the user terminal. The PBX 94a converts the service data in correspondence with the data transmission capability of the communication infrastructure and transmits the data.

If the service data volume is large, and the user is using the portable terminal 102, the portable terminal 102 is only informed of service providing, and the service data is directly downloaded to the PC 92. In this case, when the user directly makes reference to the PC 92, or when the portable terminal 102 is connected to the wired LAN 93, the service can be provided without re-transmitting the service data from the integrated server 85. That is, the end integrated server connected to the terminal which receives the service can be used as a cache. Consequently, the time can be saved, and the charge for the line can also be saved.

As described above, when the line exchange system has a data exchange function, the data can be converted into a final format near the user terminal. More specifically, when a network is constituted by sub-networks, the data can be converted into a format suitable for the sub-network.

In the third embodiment, the line exchange system has been described. The present invention is not limited to this, and a router for connecting LANs to each other may be used. In a network connection apparatus for connecting networks (public networks for a line exchange system, and LANs for a router) to each other, the same effect as described above can be obtained by mounting the data exchange unit in the network connection apparatus. In the above embodiment, the terminal which receives the service may operate as a server computer.

The method described in the above embodiment can be written in a recording medium such as a magnetic disk (e.g., a floppy disk or a hard disk), an optical disk (e.g., a CD-ROM or a DVD), or a semiconductor memory as a program which can be executed by the computer, and applied to various apparatuses, or transmitted through a communication medium and applied to various apparatuses. The computer (server 1) for realizing this apparatus loads the program recorded on the recording medium and is operation-controlled by the program, thereby executing the above-described processing.

According to the invention as stated in the above, a distributed network computing system, which enables to offer the application services to meet the processing capacity of respective terminal equipment in the network circumstances where various terminal equipment exist and furthermore enables to supply the application service to meet the communication infrastructure, even if the a plurality of the communication infrastructures are mixed in the network circumstances, and a data exchange unit provided with a security system which can be used for the said system, the method of the data exchange with a security function to be used for the said system as well as the memory module in which the said method is stored, can be presented.

Also according to the invention, a data exchange processing functions of high level can be realized by distributing the respective functions as the data exchange unit and by combining a plurality of server of the relatively low processing capacity. It becomes possible to supply application service corresponding to the processing capacity of the terminals without using any server computer of a large capacity in the network circumstances where various terminal equipment exist, and furthermore it becomes also possible to provide application services corresponding to the communication capacities for the communication infrastructures, even if a plurality of the communication infrastructures are mixed.

Furthermore, according to the invention, such problems that the server fails because the functions are concentrated locally as in the past, or that the whole system cannot be used, once the communication network can not be used, can be solved, and the application service that is tolerant to obstacles can be provided.

Also according to the invention, in the case that there are a plurality of kind of terminal equipment, by sending the data after exchanging data in the form corresponding to the processing capacity of the terminal equipment, it is possible to build a distributed network computing system by utilizing the terminal equipment such as PDA, which are excellent in view of the portability but are relatively inferior in respect to data processing capacity, display and capability providing user interface in comparison with other types of terminal equipment such PC and it is possible to receive almost same service on the side of the terminals as in the case of other equipment, though the data format is different.

Furthermore, in the case there are a plurality of kind of communication networks, it is possible to absorb the relative differences in respect to transmission speed, volume quality etc. by sending service information provided as application service after converting the said information in the format corresponding to the capability of the respective communication networks, and on the other hand, it becomes possible to receive same services on the side of the terminal as in the case of other types of terminal equipment. Especially, it becomes possible to convert the data in the final format near by the terminal equipment of the user, by providing the circuit exchange and/or the router with such data exchange functions. In other words, when a network is composed of various sub-networks, data can be exchanged in the formats suitable to respective sub-networks.

Furthermore, the data can be used for cache memory. For example, by sending merely the simplified data to the terminal of the receiver, in other words, by informing that data is registered in cache memory, the loss of data volume can be networks can be compensated.

Furthermore, by distributing the data exchange functions to every exchange and every router, the load for the each equipment can be reduced.

Also, according to the invention, the security functions can be filled up and the safety for the practical use can be improved.

What is claimed is:

1. A distributed network computing system comprising:
 a data processing unit for providing an application service of various application software;
 a terminal for receiving the application service from said data processing unit;
 a communication network which connects said data processing unit and said terminal;
 a network connecting means for connecting networks each other; and
 a data exchange unit provided at the network connecting means;
 said data exchange unit further comprising:
  a terminal attribute data management means for managing terminal attribute data representing a processing capability of said terminal;
  a conversion means for acquiring the terminal attribute data of said terminal as a communication partner from said terminal attribute data management means and converting service data provided as the application service into a specific format on the basis of the terminal attribute data;
  a communication means for transmitting through said communication network the service data converted by said communication means, and
  a controlling means for enabling the terminal equipment to decipher said specific data, when said data exchange unit is connected with said terminal through said network and said terminal equipment requests an access to specific data by satisfying the specified conditions.

2. A distributed network computing system comprising:

a data processing unit for providing an application service of various application software;

a terminal for receiving the application service from said data processing unit;

a communication network which connects said data processing unit and said terminal, a network connecting means for connecting networks each other and a data exchange unit provided at the network connecting means;

said data exchange unit further comprising:

a communication infrastructure data management means for managing communication infrastructure data representing a communication capability of said communication network;

a conversion means for acquiring the communication infrastructure data of said communication network connected to said terminal as a communication partner from said communication infrastructure data management means and converting service data provided as the application service into a specific format on the basis of the communication infrastructure data, and a communication means for transmitting through said communication network the service data converted by said communication means, and a controlling means for enabling the terminal equipment to decipher said specific data, when said data exchange unit is connected with said terminal through said network and said terminal equipment requests an access to specific data by satisfying the specified conditions.

3. A distributed network computing system comprising:

a data processing unit for providing an application service of various application software;

a terminal for receiving the application service from said data processing unit;

a communication network which connects said data processing unit and said terminal;

a network connecting means for connecting networks each other and a data exchange unit provided at the network connecting means;

said data exchange unit further comprising:

a terminal attribute data management means for managing terminal attribute data representing a processing capability of said terminal;

a communication infrastructure data management means for managing communication infrastructure data representing a communication capability of said communication network;

a conversion means for acquiring the terminal attribute data of said terminal as a communication partner from said terminal attribute data management means and the communication infrastructure data of said communication network connected to said terminal from said communication infrastructure data management means, and for converting service data provided as the application service into a specific format on the basis of the terminal attribute data and the communication infrastructure data;

a communication means for transmitting through said communication network the service data converted by said communication means, and a controlling means for enabling the terminal equipment to decipher said specific data, when said data exchange unit is connected with said terminal through said network and said terminal equipment requests an access to specific data by satisfying the specified conditions.

4. A distributed network computing system comprising:

a first data processing unit for providing an application service of various application software;

a terminal for receiving the application service from said first data processing unit;

a communication network which connects said first data processing unit and said terminal, and a second data processing unit connected to said communication network independently of said first data processing unit and having terminal attribute data management means for managing terminal attribute data representing a processing capability of said terminal, wherein said first data processing unit further comprises:

retrieval means for retrieving said second data processing unit having said terminal attribute data management means;

conversion means for acquiring the terminal attribute data of said terminal as a communication partner from said terminal attribute data management means and converting service data provided as the application service into a specific format on the basis of the terminal attribute data in said second data processing unit retrieved by said retrieval means;

a communication means for transmitting through said communication network the service data converted by said conversion means, and a controlling means for enabling the terminal equipment to decipher said specific data, when said data exchange unit is connected with said terminal through said network and said terminal equipment requests an access to specific data by satisfying the specified conditions.

5. A distributed network computing system comprising:

a first data processing unit for providing an application service of various application software;

a terminal for receiving the application service from said first data processing unit;

a communication network which connects said first data processing unit and said terminal, and a second data processing unit connected to said communication network independently of said first data processing unit and having communication infrastructure data management means for managing communication infrastructure data representing a communication capability of said communication network, wherein said first data processing unit further comprises:

a retrieval means for retrieving said second data processing unit having said communication infrastructure data management means;

a conversion means for acquiring the communication infrastructure data corresponding to said terminal as a communication partner from said communication infrastructure data management means and converting service data provided as the application service into a specific format on the basis of the communication infrastructure data in said second data processing unit retrieved by said retrieval means;

a communication means for transmitting through said communication network the service data converted by said conversion means, and a controlling means for enabling the terminal equipment to decipher said specific data, when said data exchange unit is connected with said terminal through said network and said terminal equipment requests an access to specific data by satisfying the specified conditions.

6. A distributed network computing system comprising:

a first data processing unit for providing an application service of various application software;

a terminal for receiving the application service from said first data processing unit;

a communication network which connects said first data processing unit and said terminal, and a second data processing unit connected to said communication network independently of said first data processing unit and having terminal attribute data management means for managing terminal attribute data representing a processing capability of said terminal and communication infrastructure data management means for managing communication infrastructure data representing a communication capability of said communication network, wherein said first data processing unit comprises:

a retrieval means for retrieving said second data processing unit having said terminal attribute data management means and said communication infrastructure data management means;

a conversion means for acquiring the terminal attribute data of said terminal as a communication partner from said terminal attribute data management means and simultaneously acquiring the communication infrastructure data corresponding to said terminal as the communication partner from said communication infrastructure data management means, and converting service data provided as the application service into a specific format on the basis of the terminal attribute data and the communication infrastructure data in said second data processing unit retrieved by said retrieval means;

a communication means for transmitting through said communication network the service data converted by said conversion means, and a controlling means for enabling the terminal equipment to decipher said specific data, when said data exchange unit is connected with said terminal through said network and said terminal equipment requests an access to specific data by satisfying the specified conditions.

7. A system according to any one of claims 1, 2, 3, 4, 5 and 6, wherein said terminal comprises a plurality of terminals present on a network.

8. A system according to any one of claims 1, 2, 3, 4, 5 and 6, wherein said communication network comprises a plurality of communication networks present on a network.

9. A system according to any one of claims 1, 2, 3, 4, 5 and 6, wherein said terminal and said communication network respectively comprise a plurality of terminals and a plurality of communication networks present on a network.

10. A system according to any one of claims 1, 2, 3, 4, 5 and 6, wherein said terminal also functions as a server computer.

11. A system according to any one of claims 1, 2, and 3, wherein said network connection means comprises a plurality of network connection means present on said network, and functions of said data exchange unit are distributed to said plurality of network connection means.

12. A system according to any one of claims 1, 2, and 3, wherein said network connection means is integrally arranged in said data processing unit to constitute an integrated server together with said data processing unit.

13. A system according to any one of claims 1, 2, and 3, wherein said data exchange unit is arranged on said network independently of said data processing unit and said network connection means.

14. A system according to any one of claims 1, 2, and 3, wherein said data exchange unit comprises user interface data management means for managing user interface data representing an operation method unique to each terminal, and said conversion means obtains user interface data corresponding to said terminal as the communication partner from said user interface data management means and converts the service data provided as the application service into a specific format on the basis of the user interface data.

15. A system according to any one of claims 1, 2, and 3, wherein said data exchange unit comprises user data management means for managing user data representing an operation method unique to each user, and said conversion means obtains user data corresponding to said terminal as the communication partner from said user data management means and converts the service data provided as the application service into a specific format on the basis of the user data.

16. A system according to claim 1, wherein said data exchange unit comprises enciphering determination means for determining on the basis of the terminal attribute data whether data enciphering is enabled, and enciphering means for enciphering the service data provided as the application service when said enciphering determination means determines that data enciphering is enabled.

17. A system according to any one of claims 4, 5, and 6, wherein said second data processing unit comprises user interface data management means for managing user interface data representing an operation method unique to each terminal, said retrieval means retrieves said second data processing unit having said user interface data management means, and said conversion means obtains user interface data corresponding to said terminal as the communication partner from said user interface data management means and converts the service data provided as the application service into a specific format on the basis of the user interface data in said second data processing unit retrieved by said retrieval means.

18. A system according to any one of claims 4, 5, and 6, wherein said second data processing unit comprises user data management means for managing user data representing an operation method unique to each user, said retrieval means retrieves said second data processing unit having said user data management means, and said conversion means obtains user data corresponding to said terminal as the communication partner from said user data management means and converts the service data provided as the application service into a specific format on the basis of the user data in said second data processing unit retrieved by said retrieval means.

19. A system according to claim 4, wherein said second data processing unit comprises:
   enciphering determination means for determining on the basis of the terminal attribute data whether data enciphering is enabled, and
   enciphering means for enciphering the service data provided as the application service when said enciphering determination means determines that data enciphering is enabled.

20. A system according to claim 16 or 19, wherein said enciphering means changes an enciphering level in correspondence with the processing capability of said terminal.

21. A system according to claim 2, wherein said data exchange unit comprises:
   enciphering determination means for determining on the basis of the communication infrastructure data whether data enciphering is enabled, and
   enciphering means for enciphering the service data provided as the application service when said enciphering determination means determines that data enciphering is enabled.

22. A system according to claim 5, wherein said second data processing unit comprises:
   enciphering determination means for determining on the basis of the communication infrastructure data whether data enciphering is enabled, and
   enciphering means for enciphering the service data provided as the application service when said enciphering determination means determines that data enciphering is enabled.

23. A system according to claim 22, wherein said enciphering means changes an enciphering level in correspondence with the communication capability of said communication network.

24. A system according to claim 3, wherein said data exchange unit comprises:
   enciphering determination means for determining on the basis of the terminal attribute data and the communication infrastructure data whether data enciphering is enabled, and
   enciphering means for enciphering the service data provided as the application service when said enciphering determination means determines that data enciphering is enabled.

25. A system according to claim 4, wherein said second data processing unit comprises:
   enciphering determination means for determining on the basis of the terminal attribute data and the communication infrastructure data whether data enciphering is enabled, and
   enciphering means for enciphering the service data provided as the application service when said enciphering determination means determines that data enciphering is enabled.

26. A system according to claim 24 or 25, wherein said enciphering means changes an enciphering level in correspondence with the processing capability of said terminal and the communication capability of said communication network.

27. A system according to claim 1, wherein said data exchange unit comprises:
   compression determination means for determining on the basis of the terminal attribute data whether data compression is enabled, and
   compression means for compressing the service data provided as the application service when said compression determination means determines that data compression is enabled.

28. A system according to claim 4, wherein said second data processing unit comprises:
   compression determination means for determining on the basis of the terminal attribute data whether data compression is enabled, and
   compression means for compressing the service data provided as the application service when said compression determination means determines that data compression is enabled.

29. A system according to claim 27 or 28, wherein said compression means changes a compression level in correspondence with the processing capability of said terminal.

30. A system according to claim 2, wherein said data exchange unit comprises:
   compression determination means for determining on the basis of the communication infrastructure data whether data compression is enabled, and
   compression means for compressing the service data provided as the application service when said compression determination means determines that data compression is enabled.

31. A system according to claim 5, wherein said second data processing unit comprises:
   compression determination means for determining on the basis of the communication infrastructure data whether data compression is enabled, and
   compression means for compressing the service data provided as the application service when said compression determination means determines that data compression is enabled.

32. A system according to claim 30 or 31, wherein said compression means changes a compression level in correspondence with the communication capability of said communication network.

33. A system according to claim 3, wherein said data exchange unit comprises:
   compression determination means for determining on the basis of the terminal attribute data and the communication infrastructure data whether data compression is enabled, and
   compression means for compressing the service data provided as the application service when said compression determination means determines that data compression is enabled.

34. A system according to claim 6, wherein said second data processing unit comprises:
   compression determination means for determining on the basis of the terminal attribute data and the communication infrastructure data whether data compression is enabled, and
   compression means for compressing the service data provided as the application service when said compression determination means determines that data compression is enabled.

35. A system according to claim 33 or 34, wherein said compression means changes a compression level in correspondence with the processing capability of said terminal and the communication capability of said communication network.

36. A data exchange method comprising the steps of:
   arranging a data exchange function in a network connection unit for connecting networks to each other;
   determining a processing capability of said terminal on a side of said network connection unit, when service data provided as an application service from a data processing unit to a terminal;

converting the service data into a specific format in correspondence with the processing capability of said terminal, and controlling the terminal equipment to enable to decipher said specific data, when said data exchange unit is connected with said terminal through said network and said terminal equipment requests an access to specific data by satisfying the specified conditions.

37. A data exchange method comprising the steps of:

arranging a data exchange function in a network connection unit for connecting networks to each other;

determining a communication capability of a communication network connected to said terminal on a side of said network connection unit, when service data provided as an application service from a data processing unit to a terminal;

converting the service data into a specific format in correspondence with the communication capability of said communication network, and controlling the terminal equipment to enable to decipher said specific data, when said data exchange unit is connected with said terminal through said network and said terminal equipment requests an access to specific data by satisfying the specified conditions.

38. A data exchange method comprising the steps of:

arranging a data exchange function in a network connection unit for connecting networks to each other;

determining a processing capability of said terminal and a communication capability of a communication network connected to said terminal on a side of said network connection unit, when service data provided as an application service from a data processing unit to a terminal;

converting the service data into a specific format in correspondence with the processing capability of said terminal and the communication capability of said communication network, and controlling the terminal equipment to enable to decipher said specific data, when said data exchange unit is connected with said terminal through said network and said terminal equipment requests an access to specific data by satisfying the specified conditions.

39. A data exchange method in a distributed network computing system including a communication network, a terminal connected to said communication network, a first data processing unit for providing an application service to said terminal, and a second data processing unit connected to said communication network and having a terminal attribute data management section, comprising the computer steps of:

registering terminal attribute data representing a processing capability of said terminal in said terminal attribute data management section;

retrieving said second data processing unit having said terminal attribute data management section;

acquiring the terminal attribute data of said terminal as a communication partner from said terminal attribute data management section in said second data processing unit;

converting service data provided as the application service into a specific format on the basis of the terminal attribute data;

transmitting the converted service data through said communication network, and controlling the terminal equipment to enable to decipher said specific data, when said data exchange unit is connected with said terminal through said network and said terminal equipment requests an access to specific data by satisfying the specified conditions.

40. A data exchange method in a distributed network computing system including a communication network, a terminal connected to said communication network, a first data processing unit for providing an application service to said terminal, and a second data processing unit connected to said communication network and having a communication infrastructure data management section, comprising the computer steps of:

registering communication infrastructure data representing a communication capability of said communication network in said communication infrastructure data management section;

retrieving said second data processing unit having said communication infrastructure data management section;

acquiring the communication infrastructure data of said communication network connected to said terminal as a communication partner from said communication infrastructure data management section in said second data processing unit;

converting service data provided as the application service into a specific format on the basis of the communication infrastructure data;

transmitting the converted service data through said communication network, and controlling the terminal equipment to enable to decipher said specific data, when said data exchange unit is connected with said terminal through said network and said terminal equipment requests an access to specific data by satisfying the specified conditions.

41. A data exchange method in a distributed network computing system including a communication network, a terminal connected to said communication network, a first data processing unit for providing an application service to said terminal, and a second data processing unit connected to said communication network and having a terminal attribute data management section and a communication infrastructure data management section, comprising the computer steps of:

registering terminal attribute data representing a processing capability of said terminal in said terminal attribute data management section and registering communication infrastructure data representing a communication capability of said communication network in said communication infrastructure data management section;

retrieving said second data processing unit having said terminal attribute data management section and said communication infrastructure data management section;

acquiring the terminal attribute data of said terminal as a communication partner from said terminal attribute data management section and simultaneously acquiring the communication infrastructure data of said communication network connected to said terminal in said second data processing unit;

converting service data provided as the application service into a specific format on the basis of the terminal attribute data and the communication infrastructure data;

transmitting the converted service data through said communication network, and controlling the terminal equipment to enable to decipher said specific data, when said data exchange unit is connected with said terminal through said network and said terminal equipment requests an access to specific data by satisfying the specified conditions.

42. A memory media for storing the program information used in a data exchange method claimed in claim 37, 38, 39, 40 or 41 and for reading the stored information by a computer, wherein the memory media is installed to operate in a information processing unit.

43. A data exchange apparatus arranged in a data processing apparatus for providing an application service to a terminal connected through a communication network, comprising:
   a terminal attribute data management means for managing terminal attribute data representing a processing capability of said terminal which receive the application service from the data processing apparatus;
   a conversion means for a acquiring the terminal attribute data of said terminal as a communication partner from said terminal attribute data management means and converting service data provided as the application service into a specific format on the basis of the terminal attribute data,
   a communication means for transmitting through said communication network the service data converted by said communication means, and
   a controlling means for enabling the terminal equipment to decipher said specific data, when said data exchange unit is connected with said terminal through said network and said terminal equipment requests an access to specific data by satisfying the specified conditions.

44. A data exchange apparatus arranged in a data processing apparatus for providing an application service to a terminal connected through a communication network, comprising:
   a communication infrastructure data management means for managing communication infrastructure data representing a communication capability of said communication network;
   a conversion means for acquiring the communication infrastructure data of said communication network connected to said terminal as a communication partner from said communication infrastructure data management means and converting service data provided as the application service into a specific format on the basis of the communication infrastructure data;
   a communication means for transmitting through said communication network the service data converted by said communication means, and
   a controlling means for enabling the terminal equipment to decipher said specific data, when said data exchange unit is connected with said terminal through said network and said terminal equipment requests an access to specific data by satisfying the specified conditions.

45. A data exchange apparatus arranged in a data processing apparatus for providing an application service to a terminal connected through a communication network, comprising:
   a terminal attribute data management means for managing terminal attribute data representing a processing capability of said terminal;
   a communication infrastructure data management means for managing communication infrastructure data representing a communication capability of said communication network;
   a conversion means for acquiring the terminal attribute data of said terminal as a communication partner from said terminal attribute data management means and simultaneously acquiring the communication infrastructure data of said communication network connected to said terminal from said communication infrastructure data management means, and converting service data provided as the application service into a specific format on the basis of the terminal attribute data and the communication infrastructure data;
   a communication means for transmitting through said communication network the service data converted by said communication means, and
   a controlling means for enabling the terminal equipment to decipher said specific data, when said data exchange unit is connected with said terminal through said network and said terminal equipment requests an access to specific data by satisfying the specified conditions.

46. A data exchange apparatus according to any one of claims 43, 44, and 45, wherein said data exchange unit comprises user interface data management means for managing user interface data representing an operation method unique to each terminal, and
   said conversion means obtains user interface data corresponding to said terminal as the communication partner from said user interface data management means and converts the service data provided as the application service into a specific format on the basis of the user interface data.

47. A data exchange apparatus according to any one of claims 43, 44, and 45, wherein said data exchange unit comprises user data management means for managing user data representing an operation method unique to each user, and
   said conversion means obtains user data corresponding to said terminal as the communication partner from said user data management means and converts the service data provided as the application service into a specific format on the basis of the user data.

48. A data exchange apparatus according to claim 43, wherein said data exchange unit comprises:
   a enciphering determination means for determining on the basis of the terminal attribute data whether data enciphering is enabled, and
   an enciphering means for enciphering the service data provided as the application service when said enciphering determination means determines that data enciphering is enabled.

49. A data exchange apparatus according to claim 48, wherein said enciphering means changes an enciphering level in correspondence with the processing capability of said terminal.

50. A data exchange apparatus according to claim 44, wherein said data exchange unit comprises
   an enciphering determination means for determining on the basis of the communication infrastructure data whether data enciphering is enabled, and
   an enciphering means for enciphering the service data provided as the application service when said enciphering determination means determines that data enciphering is enabled.

51. A data exchange apparatus according to claim 50, wherein said enciphering means changes an enciphering level in correspondence with the communication capability of said communication network.

52. A data exchange apparatus according to claim 45, wherein said data exchange unit comprises:

an enciphering determination means for determining on the basis of the terminal attribute data and the communication infrastructure data whether data enciphering is enabled, and an enciphering means for enciphering the service data provided as the application service when said enciphering determination means determines that data enciphering is enabled.

53. A data exchange apparatus according to claim 43, wherein said data exchange unit comprises:

a compression determination means for determining on the basis of the terminal attribute data whether data compression is enabled, and a compression means for compressing the service data provided as the application service when said compression determination means determines that data compression is enabled.

54. A data exchange apparatus according to claim 53, wherein said compression means changes a compression level in correspondence with the processing capability of said terminal.

55. A data exchange apparatus according to claim 44 wherein said data exchange unit comprises:

a compression determination means for determining on the basis of the communication infrastructure data whether data compression is enabled, and a compression means for compressing the service data provided as the application service when said compression determination means determines that data compression is enabled.

56. A data exchange apparatus according to claim 55, wherein said compression means changes a compression level in correspondence with the communication capability of said communication network.

57. A data exchange apparatus according to claim 56, wherein said data exchange unit comprises:

a compression determination means for determining on the basis of the terminal attribute data and the communication infrastructure data whether data compression is enabled, and a compression means for compressing the service data provided as the application service when said compression determination means determines that data compression is enabled.

58. A data exchange apparatus according to claim 57, wherein said compression means changes a compression level in correspondence with the processing capability of said terminal and the communication capability of said communication network.

59. A data exchange method in a data processing apparatus for providing an application service to a terminal connected through a communication network, comprising the steps of:

registering terminal attribute data representing a processing capability of said terminal in a terminal attribute data management section;

analyzing service data described in a structured document format as a component data format;

acquiring the terminal attribute data of said terminal as a communication partner from said terminal attribute data management section;

converting the analyzed service data into a specific format on the basis of the terminal attribute data; and controlling the terminal equipment to enable to decipher said specific data, when said data exchange unit is connected with said terminal through said network and said terminal equipment requests an access to specific data by satisfying the specified conditions, in advance of transmitting the converted service data through said communication network after converting the service data provided as an application service into a specific format on the basis of the terminal attribute data.

60. A data exchange method in a data processing apparatus for providing an application service to a terminal connected through a communication network, comprising the steps of:

registering communication infrastructure data representing a communication capability of said communication network in a communication infrastructure data management section;

analyzing service data described in a structured document format as a component data format;

acquiring the communication infrastructure data of said communication network connected to said terminal as a communication partner from said communication infrastructure data management section;

converting the analyzed service data into a specific format on the basis of the communication infrastructure data; and controlling the terminal equipment to enable to decipher said specific data, when said data exchange unit is connected with said terminal through said network and said terminal equipment requests an access to specific data by satisfying the specified conditions in advance of transmitting the converted service data through said communication network.

61. A data exchange method in a data processing apparatus for providing an application service to a terminal connected through a communication network, comprising the steps of:

registering terminal attribute data representing a processing capability of said terminal in a terminal attribute data management section;

registering communication infrastructure data representing a communication capability of said communication network in a communication infrastructure data management section;

analyzing service data described in a structured document format as a component data format;

acquiring the terminal attribute data of said terminal as a communication partner from said terminal attribute data management section and simultaneously acquiring the communication infrastructure data of said communication network connected to said terminal from said communication infrastructure data management section;

converting the analyzed service data into a specific format on the basis of the terminal attribute data and the communication infrastructure data; and controlling the terminal equipment to enable to decipher said specific data, when said data exchange unit is connected with said terminal through said network and said terminal equipment requests an access to specific data by satisfying the specified conditions in advance of transmitting the converted service data through said communication network.

62. A method according to any one of claims 59, 60, or 61, further comprising converting service data described in a non-component data format into the component data format, analyzing the service data described in the component data format, and performing data exchange.

63. A memory media for storing the program information used in a data exchange method claimed in claim 59, 60, 61, or 62 and for reading the stored information by a computer, wherein the memory media is installed to operate in a information processing unit.

* * * * *